United States Patent
Lee et al.

(10) Patent No.: US 10,326,298 B2
(45) Date of Patent: Jun. 18, 2019

(54) METHOD AND APPARATUS FOR WIRELESS CHARGING

(71) Applicant: Samsung Electronics Co., Ltd., Suwon-si, Gyeonggi-do (KR)

(72) Inventors: Wooram Lee, Hwaseong-si (KR); Seho Park, Yongin-si (KR); Kihyun Kim, Suwon-si (KR); Jihye Kim, Suwon-si (KR); Yunjeong Noh, Suwon-si (KR); Kumjong Sun, Suwon-si (KR); Mincheol Ha, Suwon-si (KR); Sangmoo Hwangbo, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 30 days.

(21) Appl. No.: 15/066,589

(22) Filed: Mar. 10, 2016

(65) Prior Publication Data
US 2016/0268833 A1  Sep. 15, 2016

(30) Foreign Application Priority Data

Mar. 10, 2015 (KR) .................. 10-2015-0032939
Aug. 12, 2015 (KR) .................. 10-2015-0113989

(51) Int. Cl.
*H02J 7/02* (2016.01)
*H02J 7/04* (2006.01)
*H02J 50/80* (2016.01)

(52) U.S. Cl.
CPC ............ *H02J 7/025* (2013.01); *H02J 7/045* (2013.01); *H02J 50/80* (2016.02)

(58) Field of Classification Search
CPC ............ H02J 50/80; H02J 7/025; H02J 7/045
See application file for complete search history.

(56) References Cited

U.S. PATENT DOCUMENTS 9,728,999 B2 *  8/2017  Chao .................. H02J 7/025
2006/0284593 A1  12/2006  Nagy et al.
(Continued)

FOREIGN PATENT DOCUMENTS

EP         2 290 499 A1 *  2/2011  ............... G06F 1/16
KR     10-2007-0092398 A     9/2007
WO       2015/009096 A1    1/2015

OTHER PUBLICATIONS

European Office Action dated Oct. 26, 2018; European Appln. No. 16 159 603.6-1202.

*Primary Examiner* — Vuthe Siek
(74) *Attorney, Agent, or Firm* — Jefferson IP Law, LLP

(57) ABSTRACT

An electronic device and a method thereof, which supports fast wireless charging, are provided. The electronic device includes a wireless power circuit, and one or more processors which are functionally connected with the wireless power circuit, wherein the one or more processors are configured to execute detecting an external electronic device through the wireless power circuit, determining wireless power information corresponding to the external electronic device, determining whether the external electronic device supports a first charging power or a second charging power, at least partially based on the wireless power information, providing the first charging power to the external electronic device through the wireless power circuit, at least partially based on the determination that the external electronic device supports the first charging power, and providing the second charging power to the external electronic device through the wireless power circuit, at least partially based on the determination that the external electronic device supports the second charging power.

28 Claims, 18 Drawing Sheets

(56) References Cited

U.S. PATENT DOCUMENTS

| | | | |
|---|---|---|---|
| 2007/0228273 A1 | 10/2007 | Sun et al. | |
| 2012/0293119 A1* | 11/2012 | Park | H02J 7/025 |
| | | | 320/108 |
| 2013/0234661 A1* | 9/2013 | Yang | H02J 7/025 |
| | | | 320/108 |
| 2013/0307473 A1* | 11/2013 | Han | H02J 7/04 |
| | | | 320/108 |
| 2014/0292269 A1* | 10/2014 | Keating | H02J 7/02 |
| | | | 320/108 |
| 2014/0306646 A1 | 10/2014 | Liu et al. | |
| 2014/0340033 A1 | 11/2014 | Kim et al. | |
| 2015/0022145 A1 | 1/2015 | Kim et al. | |

* cited by examiner

METHOD AND APPARATUS FOR WIRELESS CHARGING

CROSS-REFERENCE TO RELATED APPLICATION(S)

This application claims the benefit under 35 U.S.C. § 119(a) of a Korean patent application filed on Mar. 10, 2015 in the Korean Intellectual Property Office and assigned Serial No. 10-2015-0032939, and of a Korean patent application filed on Aug. 12, 2015 in the Korean Intellectual Property Office and assigned Serial No. 10-2015-0113989, the entire disclosure of each of which is hereby incorporated by reference.

TECHNICAL FIELD

The present disclosure relates to an electronic device and a method thereof, which supports wireless charging.

BACKGROUND

Recently, as digital technologies have developed, various types of electronic devices are widely utilized, such as a smart phone, a tablet personal computer (PC), a personal digital assistant (PDA), an electronic organizer, a notebook, a wearable device, or the like. The electronic devices have reached the level of mobile convergence that includes the functions of other devices. For example, an electronic device may provide a call function such as a voice call, a video call or the like, a message transmit/receive function such as a short message service (SMS)/multimedia message service (MMS), an e-mail, or the like, an electronic organizer function, a photographing function, a broadcasting program reproduction function, a video reproduction function, a music reproduction function, an Internet function, a messenger function, a game function, a social networking service (SNS) function, or the like.

Generally, an electronic device uses a battery for portability. The battery of the electronic device requires charging, and a battery charging method is currently classified into wired charging and wireless charging. For example, a contact charging scheme that charges a battery through electrical contact, and a non-contact charging scheme that charges a battery using magnetic coupling are used for charging an electronic device.

The above information is presented as background information only to assist with an understanding of the present disclosure. No determination has been made, and no assertion is made, as to whether any of the above might be applicable as prior art with regard to the present disclosure.

SUMMARY

In a wireless charging system, a charging power for wireless charging of a wireless power reception device may be expressed as a product of a charging voltage and a charging current. The charging voltage in the current wireless charging system may be fixedly used. Therefore, a charging time required for wireless charging of the wireless power reception device may also be fixed.

Aspects of the present disclosure are to address at least the above-mentioned problems and/or disadvantages and to provide at least the advantages described below. Accordingly, an aspect of the present disclosure is to provide an electronic device and a method thereof, which supports fast wireless charging using a fast charging technology (e.g., adaptive fast charging (AFC) technology).

Another aspect of the present disclosure is to provide an electronic device and a method thereof, which adjusts a charging power based on a state of a wireless power reception device in a wireless charging system, and improves a wireless charging speed of the wireless power reception device.

Another aspect of the present disclosure is to provide an electronic device and a method thereof, which adaptively changes an output power of a wireless power supply device to correspond to a charging power that a wireless power reception device requests, adaptively increases the charging power of the wireless power reception device, and provides fast charging and the stability of a circuit.

In accordance with an aspect of the present disclosure, an electronic device is provided. The electronic device includes a wireless power circuit and one or more processors which are functionally connected with the wireless power circuit, wherein the one or more processors are configured to execute detecting an external electronic device through the wireless power circuit, determining wireless power information corresponding to the external electronic device, determining whether the external electronic device supports a first charging power or a second charging power, at least partially based on the wireless power information, providing the first charging power to the external electronic device through the wireless power circuit, at least partially based on the determination that the external electronic device supports the first charging power, and providing the second charging power to the external electronic device through the wireless power circuit, at least partially based on the determination that the external electronic device supports the second charging power.

In accordance with another aspect of the present disclosure, an electronic device is provided. The electronic device includes a wireless power circuit and one or more processors which are functionally connected with the wireless power circuit, wherein the one or more processors are configured to execute determining a supportable charging power, requesting the charging power from an external electronic device, determining whether the external electronic device supports the charging power, when the external electronic device supports the charging power, receiving the charging power from the external electronic device, and executing charging, and when the external electronic device does not support the charging power, receiving another charging power which is different from the charging power and executing charging based on the other charging power.

In accordance with another aspect of the present disclosure, an electronic device is provided. The electronic device includes a wireless power circuit and one or more processors which are functionally connected with the wireless power circuit, wherein the one or more processors are configured to execute detecting a provision of a supply voltage from the external electronic device, determining whether the supply voltage provided from the external electronic device is within a designated range, executing charging based on the supply voltage when the supply voltage is within the designated range, and executing charging based on another voltage provided from the external electronic device when the supply voltage is out of the designated range.

In accordance with another aspect of the present disclosure, a method of an electronic device is provided. The method includes detecting an external electronic device, determining wireless power information corresponding to the external electronic device, determining whether the external electronic device supports a first charging power or a second charging power, at least partially based on the wireless power information, providing the first charging power to the external electronic device at least partially based on the determination that the external electronic device supports the first charging power, and providing the second charging power to the external electronic device at least partially based on the determination that the external electronic device supports the second charging power.

In accordance with another aspect of the present disclosure, a method of an electronic device is provided. The method includes determining a supportable charging power, determining whether the electronic device supports a first charging power or a second charging power based on a result of the determination, providing wireless power information corresponding to the first charging power to an external electronic device, at least partially based on the determination that the first charging power is supported, and providing wireless power information corresponding to the second charging power to the external electronic device, at least partially based on the determination that the second charging power is supported.

In accordance with another aspect of the present disclosure, a method of an electronic device is provided. The method includes detecting a provision of a supply voltage from the external electronic device, determining whether the supply voltage provided from the external electronic device is within a designated range, executing charging based on the supply voltage when the supply voltage is within the designated range, and executing charging based on another voltage provided from the external electronic device when the supply voltage is out of the designated range.

In accordance with another aspect of the present disclosure, a computer readable recording medium in which programs for executing the method in a processor are recorded is provided.

In accordance with another aspect of the present disclosure, a computer-readable recording medium, which stores a program for implementing an operation of determining information associated with a charging mode that is supportable by a wireless power supply device and a wireless power reception device that support a plurality of charging modes an operation of determining a charging mode based on the information, and an operation of executing charging based on the determined charging mode is provided.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
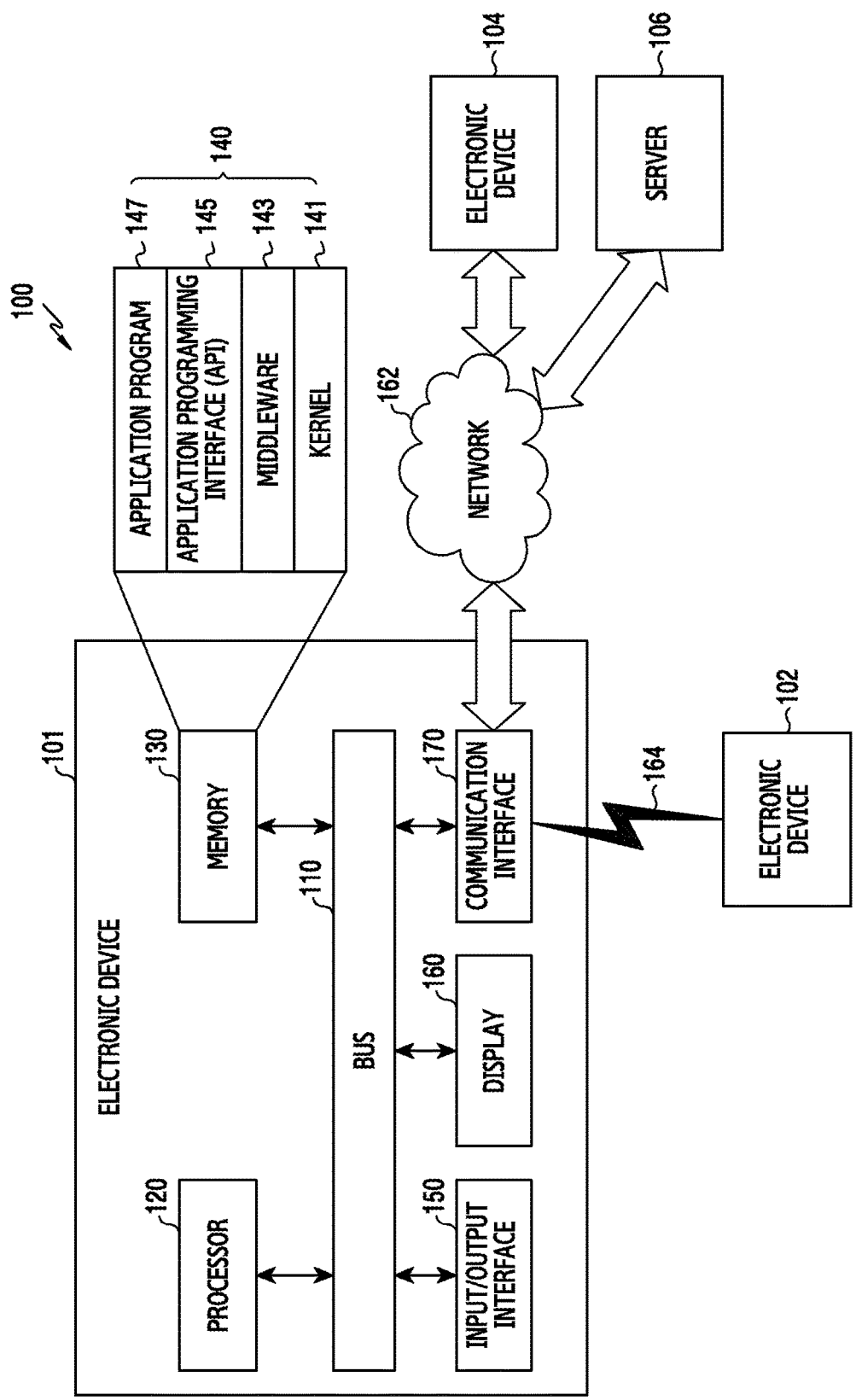
FIG. 1 illustrates a network environment including an electronic device according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

As used herein, the expression "have", "may have", "include", or "may include" refers to the existence of a corresponding feature (e.g., numeral, function, operation, or constituent element such as component), and does not exclude one or more additional features.

In the present disclosure, the expression "A or B", "at least one of A or/and B", or "one or more of A or/and B" may include all possible combinations of the items listed. For example, the expression "A or B", "at least one of A and B", or "at least one of A or B" refers to all of (1) including at least one A, (2) including at least one B, or (3) including all of at least one A and at least one B.

The expression "a first", "a second", "the first", or "the second" used in various embodiments of the present disclosure may modify various components regardless of the order and/or the importance but does not limit the corresponding components. For example, a first user device and a second user device indicate different user devices although both of them are user devices. For example, a first element may be termed a second element, and similarly, a second element may be termed a first element without departing from the scope of the present disclosure.

It should be understood that when an element (e.g., first element) is referred to as being (operatively or communicatively) "connected," or "coupled," to another element (e.g., second element), it may be directly connected or coupled directly to the other element or any other element (e.g., third element) may be interposer between them. In contrast, it may be understood that when an element (e.g., first element) is referred to as being "directly connected," or "directly coupled" to another element (second element), there are no element (e.g., third element) interposed between them.

The expression "configured to" used in the present disclosure may be exchanged with, for example, "suitable for", "having the capacity to", "designed to", "adapted to", "made to", or "capable of" according to the situation. The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may mean a dedicated processor (e.g. embedded processor) only for performing the corresponding operations or a generic-purpose processor (e.g., central processing unit (CPU) or application processor (AP)) that can perform the corresponding operations by executing one or more software programs stored in a memory device.

Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of art, and are not to be interpreted to have ideal or excessively formal meanings unless clearly defined in the present disclosure. In some cases, even the term defined in the present disclosure should not be interpreted to exclude embodiments of the present disclosure.

An electronic device according to various embodiments of the present disclosure may include at least one of, for example, a smart phone, a tablet personal computer (PC), a mobile phone, a video phone, an electronic book reader (e-book reader), a desktop PC, a laptop PC, a netbook computer, a workstation, a server, a personal digital assistant (PDA), a portable multimedia player (PMP), a Moving Picture Experts Group phase 1 or phase 2 (MPEG-1 or MPEG-2) audio layer-3 (MP3) player, a mobile medical device, a camera, and a wearable device. According to various embodiments, the wearable device may include at least one of an accessory type (e.g., a watch, a ring, a bracelet, an anklet, a necklace, a glasses, a contact lens, or a head-mounted device (HMD)), a fabric or clothing integrated type (e.g., an electronic clothing), a body-mounted type (e.g., a skin pad, or tattoo), and a bio-implantable type (e.g., an implantable circuit).

According to some embodiments, the electronic device may be a home appliance. The home appliance may include at least one of, for example, a television, a digital video disk (DVD) player, an audio, a refrigerator, an air conditioner, a vacuum cleaner, an oven, a microwave oven, a washing machine, an air cleaner, a set-top box, a home automation control panel, a security control panel, a television (TV) box (e.g., Samsung HomeSync™, Apple TV™, or Google TV™), a game console (e.g., Xbox™ and PlayStation™), an electronic dictionary, an electronic key, a camcorder, and an electronic photo frame.

According to another embodiment, the electronic device may include at least one of various medical devices (e.g., various portable medical measuring devices (a blood glucose monitoring device, a heart rate monitoring device, a blood pressure measuring device, a body temperature measuring device, etc.), a magnetic resonance angiography (MRA), a magnetic resonance imaging (MRI), a computed tomography (CT) machine, and an ultrasonic machine), a navigation device, a global positioning system (GPS) receiver, an event data recorder (EDR), a flight data recorder (FDR), a vehicle infotainment devices, an electronic devices for a ship (e.g., a navigation device for a ship, and a gyro-compass), avionics, security devices, an automotive head unit, a robot for home or industry, an automatic teller's machine (ATM) in banks, points of sale (POSs) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.).

According to some embodiments, the electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device according to various embodiments of the present disclosure may be a combination of one or more of the aforementioned various devices. The electronic device according to some embodiments of the present disclosure may be a flexible device. Further, the electronic device according to an embodiment of the present disclosure is not limited to the aforementioned devices, and may include a new electronic device according to the development of technology.

Hereinafter, an electronic device according to various embodiments will be described with reference to the accompanying drawings. As used herein, the term "user" may indicate a person who uses an electronic device or a device (e.g., an artificial intelligence electronic device) that uses an electronic device.

FIG. 1 illustrates a network environment including an electronic device according to various embodiments of the present disclosure.

Referring to FIG. 1, an electronic device 101 within a network environment 100, according to various embodiments, may include a bus 110, a processor 120, a memory 130, an input/output interface 150, a display 160, and a communication interface 170. According to an embodiment of the present disclosure, the electronic device 101 may omit at least one of the above components or may further include other components.

The bus 110 may include, for example, a circuit which interconnects the components 110 to 170 and delivers a communication (e.g., a control message and/or data) between the components 110 to 170.

The processor 120 may include one or more of a CPU, an AP, and a communication processor (CP). The processor 120 may carry out, for example, calculation or data processing relating to control and/or communication of at least one other component of the electronic device 101.

The memory 130 may include a volatile memory and/or a non-volatile memory. The memory 130 may store, for example, commands or data relevant to at least one other component of the electronic device 101. According to an embodiment of the present disclosure, the memory 130 may store software and/or a program 140. The program 140 may include, for example, a kernel 141, middleware 143, an application programming interface (API) 145, and/or application programs (or "applications") 147. At least some of the kernel 141, the middleware 143, and the API 145 may be referred to as an operating system (OS).

The kernel 141 may control or manage system resources (e.g., the bus 110, the processor 120, or the memory 130) used for performing an operation or function implemented in the other programs (e.g., the middleware 143, the API 145, or the application programs 147). Furthermore, the kernel 141 may provide an interface through which the middleware 143, the API 145, or the application programs 147 may access the individual components of the electronic device 101 to control or manage the system resources.

The middleware 143, for example, may serve as an intermediary for allowing the API 145 or the application programs 147 to communicate with the kernel 141 to exchange data.

Also, the middleware 143 may process one or more task requests received from the application programs 147 according to priorities thereof. For example, the middleware 143 may assign priorities for using the system resources (e.g., the bus 110, the processor 120, the memory 130, or the like) of the electronic device 101, to at least one of the application programs 147. For example, the middleware 143 may perform scheduling or loading balancing on the one or more task requests by processing the one or more task requests according to the priorities assigned thereto.

The API 145 is an interface through which the applications 147 control functions provided from the kernel 141 or the middleware 143, and may include, for example, at least one interface or function (e.g., instruction) for file control, window control, image processing, character control, and the like.

The input/output interface 150, for example, may function as an interface that may transfer commands or data input from a user or another external device to the other element(s) of the electronic device 101. Furthermore, the input/output interface 150 may output the commands or data received from the other element(s) of the electronic device 101 to the user or another external device.

Examples of the display 160 may include a liquid crystal display (LCD), a light-emitting diode (LED) display, an organic LED (OLED) display, a microelectromechanical Systems (MEMS) display, and an electronic paper display. The display 160 may display, for example, various types of contents (e.g., text, images, videos, icons, or symbols) to users. The display 160 may include a touch screen, and may receive, for example, a touch, gesture, proximity, or hovering input using an electronic pen or a user's body part.

The communication interface 170 may establish communication, for example, between the electronic device 101 and an external device (e.g., a first external electronic device 102, a second external electronic device 104, or a server 106). For example, the communication interface 170 may be connected to a network 162 through wireless or wired communication, and may communicate with an external device (e.g., the second external electronic device 104 or the server 106).

The wireless communication may use at least one of, for example, long term evolution (LTE), LTE-advanced (LTE-A), code division multiple access (CDMA), wideband CDMA (WCDMA), universal mobile telecommunications system (UMTS), wireless broadband (WiBro), and global system for mobile communications (GSM), as a cellular communication protocol. In addition, the wireless communication may include, for example, short range communication 164. The short-range communication 164 may include at least one of, for example, Wi-Fi, Bluetooth (BT), near field communication (NFC), and global navigation satellite system (GNSS). GNSS may include, for example, at least one of GPS, global navigation satellite system (Glonass), Beidou navigation satellite system (Beidou) or Galileo, and the European global satellite-based navigation system, based on a location, a bandwidth, or the like. Hereinafter, in the present disclosure, the "GPS" may be interchangeably used with the "GNSS". The wired communication may include, for example, at least one of a universal serial bus (USB), a high definition multimedia interface (HDMI), recommended standard 232 (RS-232), and a plain old telephone service (POTS). The network 162 may include at least one of a telecommunication network such as a computer network (e.g., a local area network (LAN) or a wide area network (WAN)), the Internet, and a telephone network.

Each of the first and second external electronic devices 102 and 104 may be of a type identical to or different from that of the electronic device 101. According to an embodiment of the present disclosure, the server 106 may include a group of one or more servers. According to various embodiments of the present disclosure, all or some of the operations performed in the electronic device 101 may be executed in another electronic device or a plurality of electronic devices (e.g., the electronic devices 102 and 104 or the server 106). According to an embodiment of the present disclosure, when the electronic device 101 has to perform some functions or services automatically or in response to a request, the electronic device 101 may request another device (e.g., the electronic device 102 or 104 or the server 106) to execute at least some functions relating thereto instead of or in addition to autonomously performing the functions or services. Another electronic device (e.g., the electronic device 102 or 104, or the server 106) may execute the requested functions or the additional functions, and may deliver a result of the execution to the electronic device 101. The electronic device 101 may process the received result as it is or additionally, and may provide the requested functions or services. To this end, for example, cloud computing, distributed computing, or client-server computing technologies may be used.

Figure 2:
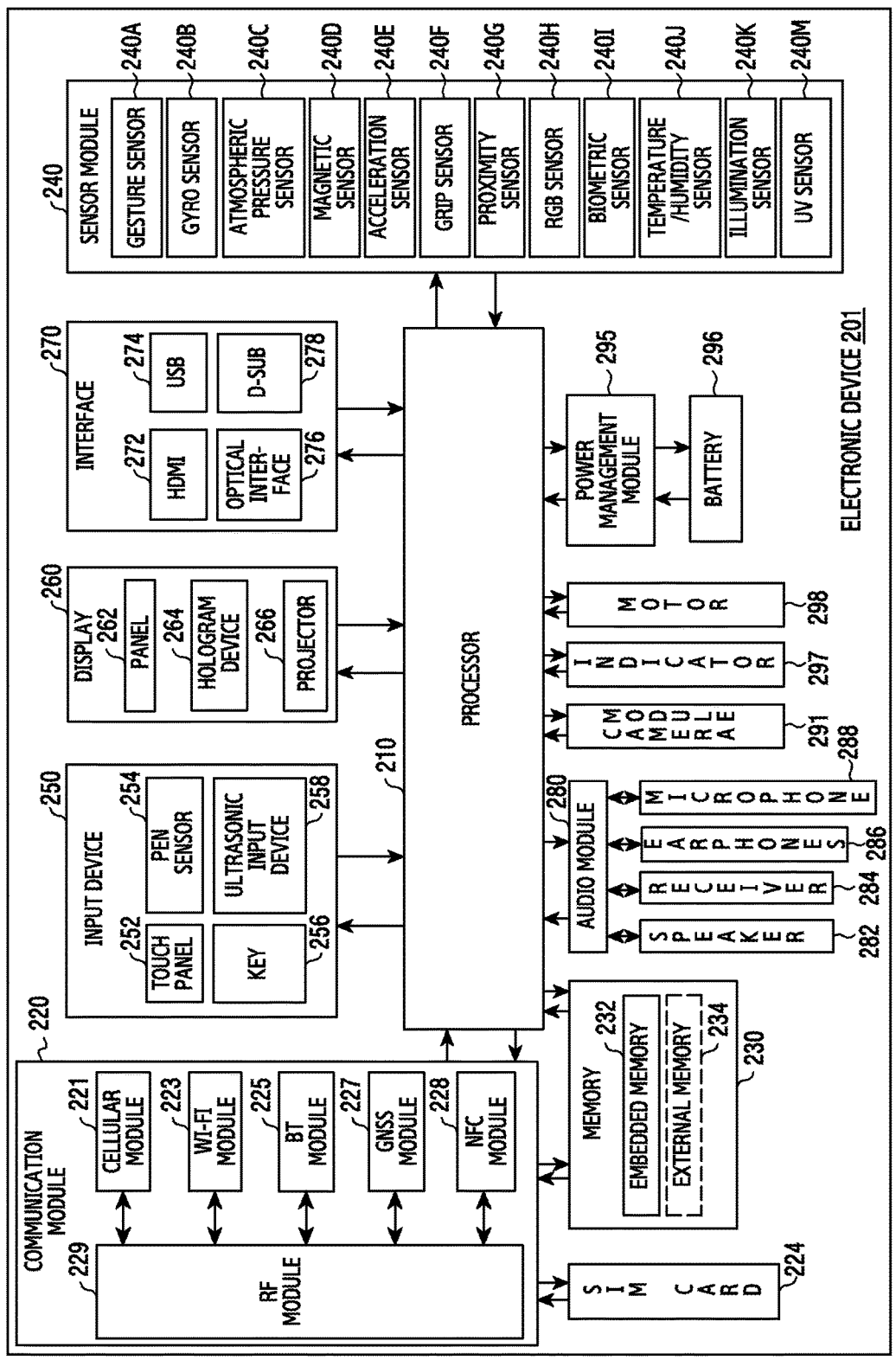
FIG. 2 is a block diagram of an electronic device according to various embodiments of the present disclosure.

FIG. 2 is a block diagram of an electronic device according to various embodiments of the present disclosure.

Referring to FIG. 2, the electronic device 201 may include, for example, all or a part of the electronic device 101 shown in FIG. 1. The electronic device 201 may include one or more processors 210 (e.g., AP), a communication module 220, a subscriber identification module (SIM) 224, a memory 230, a sensor module 240, an input device 250, a display 260, an interface 270, an audio module 280, a camera module 291, a power management module 295, a battery 296, an indicator 297, and a motor 298.

The processor 210 may control a plurality of hardware or software components connected to the processor 210 by driving an OS or an application program, and perform processing of various pieces of data and calculations. The processor 210 may be embodied as, for example, a system on chip (SoC). According to an embodiment of the present disclosure, the processor 210 may further include a graphics processing unit (GPU) and/or an image signal processor (ISP). The processor 210 may include at least some (for example, a cellular module 221) of the other components illustrated in FIG. 2. The processor 210 may load, into a volatile memory, commands or data received from at least one (e.g., a non-volatile memory) of the other components and may process the loaded commands or data, and may store various data in a non-volatile memory.

The communication module 220 may have a configuration equal or similar to that of the communication interface 170 of FIG. 1. The communication module 220 may include, for example, the cellular module 221, a Wi-Fi module 223, a BT module 225, a GNSS module 227 (e.g., a GPS module 227, a Glonass module, a Beidou module, or a Galileo module), an NFC module 228, and a radio frequency (RF) module 229.

The cellular module 221, for example, may provide a voice call, a video call, a text message service, or an Internet service through a communication network. According to an embodiment of the present disclosure, the cellular module 221 may distinguish and authenticate the electronic device 201 in a communication network using the SIM 224 (for example, the SIM card). According to an embodiment of the present disclosure, the cellular module 221 may perform at least some of the functions that the AP 210 may provide. According to an embodiment of the present disclosure, the cellular module 221 may include a CP.

For example, each of the Wi-Fi module 223, the BT module 225, the GNSS module 227, and the NFC module 228 may include a processor for processing data transmitted/received through a corresponding module. According to an embodiment of the present disclosure, at least some (e.g., two or more) of the cellular module 221, the Wi-Fi module 223, the BT module 225, the GNSS module 227, and the NFC module 228 may be included in one integrated chip (IC) or IC package.

The RF module 229, for example, may transmit/receive a communication signal (e.g., an RF signal). The RF module 229 may include, for example, a transceiver, a power amplifier module (PAM), a frequency filter, a low noise amplifier (LNA), and an antenna. According to another embodiment of the present disclosure, at least one of the cellular module 221, the Wi-Fi module 223, the BT module 225, the GNSS module 227, and the NFC module 228 may transmit/receive an RF signal through a separate RF module.

The SIM 224 may include, for example, a card including a subscriber identity module and/or an embedded SIM, and may contain unique identification information (e.g., an integrated circuit card identifier (ICCID)) or subscriber information (e.g., an international mobile subscriber identity (IMSI)).

The memory 230 (e.g., the memory 130) may include, for example, an embedded memory 232 or an external memory 234. The embedded memory 232 may include at least one of a volatile memory (e.g., a dynamic random access memory (DRAM), a static RAM (SRAM), a synchronous dynamic RAM (SDRAM), and the like) and a non-volatile memory (e.g., a one time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory or a NOR flash memory), a hard disk drive, a solid state drive (SSD), and the like).

The external memory 234 may further include a flash drive, for example, a compact flash (CF), a secure digital (SD), a micro-SD, a mini-SD, an eXtreme digital (xD), a multimediacard (MMC), a memory stick, or the like. The external memory 234 may be functionally and/or physically connected to the electronic device 201 through various interfaces.

The sensor module 240, for example, may measure a physical quantity or detect an operation state of the electronic device 201, and may convert the measured or detected information into an electrical signal. The sensor module 240 may include, for example, at least one of a gesture sensor 240A, a gyro sensor 240B, an atmospheric pressure sensor (barometer) 240C, a magnetic sensor 240D, an acceleration sensor 240E, a grip sensor 240F, a proximity sensor 240G, a color sensor 240H (e.g., red, green, and blue (RGB) sensor), a biometric sensor (medical sensor) 240I, a temperature/humidity sensor 240J, an illuminance sensor 240K, and a ultraviolet (UV) sensor 240M. Additionally or alternatively, the sensor module 240 may include, for example, an E-nose sensor, an electromyography (EMG) sensor, an electroencephalogram (EEG) sensor, an electrocardiogram (ECG) sensor, an infrared (IR) sensor, an iris scan sensor, and/or a finger scan sensor. The sensor module 240 may further include a control circuit for controlling one or more sensors included therein. According to an embodiment of the present disclosure, the electronic device 201 may further include a processor configured to control the sensor module 240, as a part of the processor 210 or separately from the processor 210, and may control the sensor module 240 while the processor 210 is in a sleep state.

The input device 250 may include, for example, a touch panel 252, a (digital) pen sensor 254, a key 256, or an ultrasonic input device 258. The touch panel 252 may use, for example, at least one of a capacitive type, a resistive type, an infrared type, and an ultrasonic type. The touch panel 252 may further include a control circuit. The touch panel 252 may further include a tactile layer, and provide a tactile reaction to the user.

The (digital) pen sensor 254 may include, for example, a recognition sheet which is a part of the touch panel or is separated from the touch panel. The key 256 may include, for example, a physical button, an optical key or a keypad. The ultrasonic input device 258 may detect, through a microphone (e.g., a microphone 288), ultrasonic waves generated by an input tool, and identify data corresponding to the detected ultrasonic waves.

The display 260 (e.g., the display 160) may include a panel 262, a hologram device 264, or a projector 266. The panel 262 may include a configuration identical or similar to the display 160 illustrated in FIG. 1. The panel 262 may be implemented to be, for example, flexible, transparent, or wearable. The panel 262 may be embodied as a single module with the touch panel 252. The hologram device 264 may show a three dimensional (3D) image in the air by using an interference of light. The projector 266 may project light onto a screen to display an image. The screen may be located, for example, in the interior of or on the exterior of the electronic device 201. According to an embodiment of the present disclosure, the display 260 may further include a control circuit for controlling the panel 262, the hologram device 264, or the projector 266.

The interface 270 may include, for example, a HDMI 272, an USB 274, an optical interface 276, or a D-subminiature (D-sub) 278. The interface 270 may be included in, for example, the communication interface 170 illustrated in FIG. 1. Additionally or alternatively, the interface 270 may include, for example, a mobile high-definition link (MHL) interface, an SD card/MMC interface, or an infrared data association (IrDA) standard interface.

The audio module 280, for example, may bilaterally convert a sound and an electrical signal. At least some components of the audio module 280 may be included in, for example, the input/output interface 150 illustrated in FIG. 1. The audio module 280 may process voice information input or output through, for example, a speaker 282, a receiver 284, earphones 286, or the microphone 288.

The camera module 291 is, for example, a device which may photograph a still image and a video. According to an embodiment of the present disclosure, the camera module 291 may include one or more image sensors (e.g., a front sensor or a back sensor), a lens, an ISP or a flash (e.g., LED or xenon lamp).

The power management module 295 may manage, for example, power of the electronic device 201. According to an embodiment of the present disclosure, the power management module 295 may include a power management integrated circuit (PMIC), a charger IC, or a battery or fuel gauge. The PMIC may use a wired and/or wireless charging method. Examples of the wireless charging method may include, for example, a magnetic resonance method, a magnetic induction method, an electromagnetic wave method, and the like. Additional circuits (e.g., a coil loop, a resonance circuit, a rectifier, etc.) for wireless charging may be further included. The battery gauge may measure, for example, a residual quantity of the battery 296, and a voltage, a current, or a temperature while charging. The battery 296 may include, for example, a rechargeable battery and/or a solar battery.

The indicator 297 may display a particular state (e.g., a booting state, a message state, a charging state, or the like) of the electronic device 201 or a part (e.g., the processor 210) of the electronic device 201. The motor 298 may convert an electrical signal into a mechanical vibration, and may generate a vibration, a haptic effect, or the like. Although not illustrated, the electronic device 201 may include a processing device (e.g., a GPU) for supporting a mobile TV. The processing device for supporting a mobile TV may process, for example, media data according to a certain standard such as digital multimedia broadcasting (DMB), digital video broadcasting (DVB), or mediaFLO™.

Each of the above-described component elements of hardware according to the present disclosure may be configured with one or more components, and the names of the corresponding component elements may vary based on the type of electronic device. In various embodiments, the electronic device may include at least one of the above-described elements. Some of the above-described elements may be omitted from the electronic device, or the electronic device may further include additional elements. Also, some of the hardware components according to various embodiments may be combined into one entity, which may perform functions identical to those of the relevant components before the combination.

Figure 3:
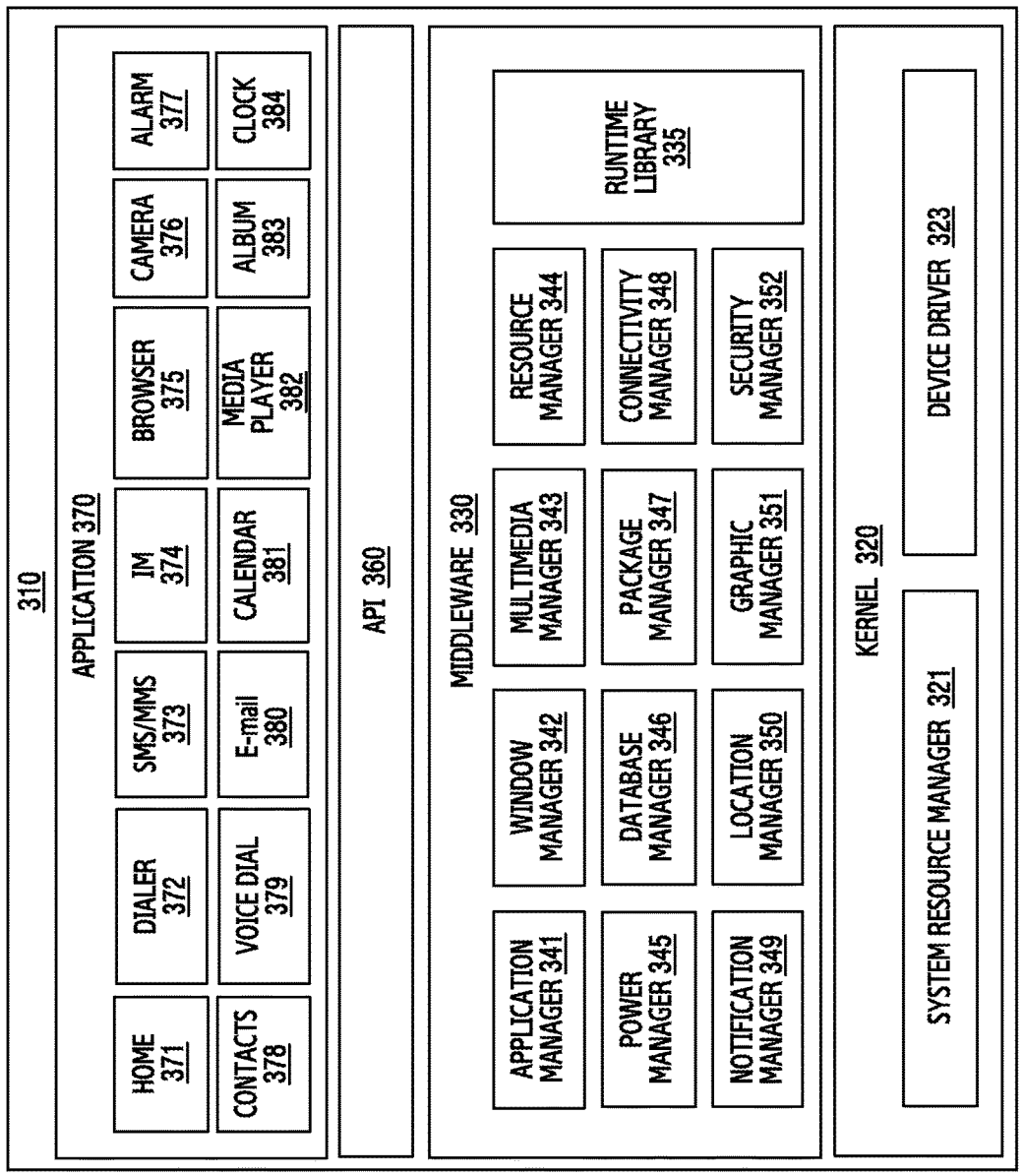
FIG. 3 is a block diagram of a program module according to various embodiments of the present disclosure.

FIG. 3 is a block diagram of a program module according to various embodiments of the present disclosure.

Referring to FIG. 3, the program module 310 (e.g., the program 140) may include an OS for controlling resources related to the electronic device (e.g., the electronic device 101) and/or various applications (e.g., the application programs 147) executed in the OS. The OS may be, for example, Android, iOS, Windows, Symbian, Tizen, Bada, or the like.

The program module 310 may include a kernel 320, middleware 330, an API 360, and/or applications 370. At least some of the program module 310 may be preloaded on an electronic device, or may be downloaded from an external electronic device (e.g., the electronic device 102 or 104, or the server 106).

The kernel 320 (e.g., the kernel 141) may include, for example, a system resource manager 321 and/or a device driver 323. The system resource manager 321 may control, allocate, or collect system resources. According to an embodiment of the present disclosure, the system resource manager 321 may include a process management unit, a memory management unit, a file system management unit, and the like. The device driver 323 may include, for example, a display driver, a camera driver, a BT driver, a shared memory driver, a USB driver, a keypad driver, a Wi-Fi driver, an audio driver, or an inter-process communication (IPC) driver.

The middleware 330 may provide a function required in common by the applications 370, or may provide various functions to the applications 370 through the API 360 so as to enable the applications 370 to efficiently use the limited system resources in the electronic device. According to an embodiment of the present disclosure, the middleware 330 (e.g., the middleware 143) may include at least one of a run time library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include a library module that a compiler uses in order to add a new function through a programming language while an application 370 is being executed. The runtime library 335 may perform input/output management, memory management, the functionality for an arithmetic function, or the like.

The application manager 341 may manage, for example, a life cycle of at least one of the applications 370. The window manager 342 may manage graphical user interface (GUI) resources used by a screen. The multimedia manager 343 may recognize a format required for reproduction of various media files, and may perform encoding or decoding of a media file by using a codec suitable for the corresponding format. The resource manager 344 may manage resources of a source code, a memory, and a storage space of at least one of the applications 370.

The power manager 345 may operate together with, for example, a basic input/output system (BIOS) or the like to manage a battery or power source and may provide power information or the like required for the operations of the electronic device. The database manager 346 may generate, search for, and/or change a database to be used by at least one of the applications 370. The package manager 347 may manage installation or an update of an application distributed in the form of a package file.

For example, the connectivity manager 348 may manage wireless connectivity such as Wi-Fi or BT. The notification manager 349 may display or notify of an event such as an arrival message, promise, proximity notification, and the like in such a way that does not disturb a user. The location manager 350 may manage location information of an electronic device. The graphic manager 351 may manage a graphic effect which will be provided to a user, or a UI related to the graphic effect. The security manager 352 may provide all security functions required for system security, user authentication, or the like. According to an embodiment of the present disclosure, when the electronic device (e.g., the electronic device 101) has a telephone call function, the middleware 330 may further include a telephony manager for managing a voice call function or a video call function of the electronic device.

The middleware 330 may include a middleware module that forms a combination of various functions of the above-described components. The middleware 330 may provide a module specialized for each type of OS in order to provide a differentiated function. Further, the middleware 330 may dynamically remove some of the existing components or add new components.

The API 360 (e.g., the API 145) is, for example, a set of API programming functions, and may be provided with a different configuration according to an OS. For example, in the case of Android or iOS, one API set may be provided for each platform. In the case of Tizen, two or more API sets may be provided for each platform.

The applications 370 (e.g., the application programs 147) may include, for example, one or more applications which may provide functions such as a home 371, a dialer 372, a short message service (SMS)/multimedia message service (MMS) 373, an instant message (IM) 374, a browser 375, a camera 376, an alarm 377, contacts 378, a voice dial 379, an email 380, a calendar 381, a media player 382, an album 383, a clock 384, health care (e.g., measuring exercise quantity or blood sugar), or environment information (e.g., providing atmospheric pressure, humidity, or temperature information).

According to an embodiment of the present disclosure, the applications 370 may include an application (hereinafter, referred to as an "information exchange application" for convenience of description) that supports exchanging information between the electronic device (e.g., the electronic device 101) and an external electronic device (e.g., the electronic device 102 or 104). The information exchange application may include, for example, a notification relay application for transferring specific information to an external electronic device or a device management application for managing an external electronic device.

For example, the notification relay application may include a function of transferring, to the external electronic device (e.g., the electronic device 102 or 104), notification information generated from other applications of the electronic device 101 (e.g., an SMS/MMS application, an e-mail application, a health management application, or an environmental information application). Further, the notification relay application may receive notification information from, for example, an external electronic device and provide the received notification information to a user.

The device management application may manage (e.g., install, delete, or update), for example, at least one function of an external electronic device (e.g., the electronic device 102 or 104) communicating with the electronic device (e.g., a function of turning on/off the external electronic device itself (or some components) or a function of adjusting the brightness (or a resolution) of the display), applications operating in the external electronic device, and services provided by the external electronic device (e.g., a call service or a message service).

According to an embodiment of the present disclosure, the applications 370 may include applications (e.g., a health care application of a mobile medical appliance or the like) designated according to an external electronic device (e.g., attributes of the electronic device 102 or 104). According to an embodiment of the present disclosure, the applications 370 may include an application received from an external electronic device (e.g., the server 106, or the electronic device 102 or 104). According to an embodiment of the present disclosure, the applications 370 may include a preloaded application or a third party application that may be downloaded from a server. The names of the components of the program module 310 of the illustrated embodiment of the present disclosure may change according to the type of OS.

According to various embodiments, at least a part of the programming module 310 may be implemented in software, firmware, hardware, or a combination of two or more thereof. At least some of the program module 310 may be implemented (e.g., executed) by, for example, the processor (e.g., the processor 1410). At least some of the program module 310 may include, for example, a module, a program, a routine, a set of instructions, and/or a process for performing one or more functions.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the present disclosure may include at least one of an application-specific integrated circuit (ASIC) chip, a field-programmable gate arrays (FPGA), and a programmable-logic device for performing operations which has been known or are to be developed hereinafter.

According to various embodiments, at least some of the devices (for example, modules or functions thereof) or the method (for example, operations) according to the present disclosure may be implemented by a command stored in a computer-readable storage medium in a programming module form. The instruction, when executed by a processor (e.g., the processor 120), may cause the one or more processors to execute the function corresponding to the instruction. The computer-readable recoding media may be, for example, the memory 130.

The computer readable recoding medium may include a hard disk, a floppy disk, magnetic media (e.g., a magnetic tape), optical media (e.g., a compact disc ROM (CD-ROM) and a DVD), magneto-optical media (e.g., a floptical disk), a hardware device (e.g., a ROM, a RAM, a flash memory), and the like. In addition, the program instructions may include high class language codes, which can be executed in a computer by using an interpreter, as well as machine codes made by a compiler. The aforementioned hardware device may be configured to operate as one or more software modules in order to perform the operation of the present disclosure, and vice versa.

Any of the modules or programming modules according to various embodiments of the present disclosure may include at least one of the above described elements, exclude some of the elements, or further include other additional elements. The operations performed by the modules, programming module, or other elements according to various embodiments of the present disclosure may be executed in a sequential, parallel, repetitive, or heuristic manner. Further, some operations may be executed according to another order or may be omitted, or other operations may be added. Various embodiments disclosed herein are provided merely to easily describe technical details of the present disclosure and to help the understanding of the present disclosure, and are not intended to limit the scope of the present disclosure. Therefore, it should be construed that all modifications and changes or modified and changed forms based on the technical idea of the present disclosure fall within the scope of the present disclosure.

Various embodiments of the present disclosure relate to an electronic device including a fast wireless charging function and an operation method thereof. According to various embodiments of the present disclosure, there is provided an electronic device and a method thereof, which supports fast wireless charging using a fast charging technology (e.g., adaptive fast charging (AFC) technology). For example, a wireless charging system according to various embodiments of the present disclosure adaptively adjusts an output power of an electronic device (e.g., a wireless power supply device or a power transmitting unit (PTU)), based on the state of a charging power (charging voltage and charging current) of an external electronic device (e.g., a wireless power reception device or a power receiving unit (PRU)), and improves a charging speed.

An electronic device (e.g., a wireless power supply device) according to various embodiments of the present disclosure may detect an external electronic device (e.g., a wireless power reception device) through a wireless power circuit. An electronic device may determine the wireless power information corresponding to the external electronic device. For example, according to various embodiments of the present disclosure, the external electronic device may request a charging power from a wireless power supply device, and the electronic device may determine the wireless power information based on the requested charging power. The electronic device may determine an output power (an output voltage and an output current) which is supportable by the external electronic device, at least partially based on the wireless power information. The electronic device may provide, to the external electronic device through a wireless power circuit, an output power corresponding to the charging power requested by the external electronic device, based on the determined output power.

An electronic device according to various embodiments of the present disclosure may determine whether a requested charging power is supportable when an external electronic device requests changing a charging power. For example, the electronic device may transfer the request for changing the charging power to a power supply device. When the requested charging power is supported, the power supply device may supply, to the electronic device, an output power (hereinafter referred to as a first power) corresponding to the requested charging power. When the requested charging power is not supported, the power supply device may supply a set output power (hereinafter referred to as a second power) to the electronic device. The electronic device may determine whether the requested charging power is supportable based on an output power supplied from the power supply device (e.g., the first power or the second power).

An electronic device according to various embodiments of the present disclosure may omit an operation of determining the wireless power information of an external electronic device, and may adjust an output power to correspond to a charging power supportable by the external electronic device in a manner of providing, to the external electronic device, the maximum output power and gradually reducing an output power when providing an output power in response to a response from the external electronic device.

An electronic device according to various embodiments of the present disclosure may serve as a wireless power supply device or a wireless power reception device based on a role in the wireless charging system.

According to an embodiment of the present disclosure, when an electronic device serves as a wireless power supply device (e.g., a charging pad, a smart phone, a tablet PC, and the like), the electronic device may execute a process to adaptively change and output an output power of a power supply device (e.g., a travel adapter (TA) or a power supply) which supplies power in response to a charging power requested by an external electronic device (a wireless power reception device (e.g., a smart phone, a tablet PC, and the like). For example, the electronic device may receive an output power of the power supply device as an input of an internal charging circuit (wireless power circuit), in response to a charging power (charging voltage and charging current) request of the external electronic device. The electronic device may adjust, through the charging circuit, the output power to correspond to the charging power requested by the external electronic device, and may output the adjusted output power to the external electronic device through the charging circuit.

The power supply device according to various embodiments of the present disclosure may be included in the electronic device, or may separately exist outside and may be connected with the electronic device. The power supply device may output a reference voltage or a voltage (hereinafter, a high voltage) that is higher than the reference voltage, based on the control of the electronic device. According to various embodiments of the present disclosure, an electronic device may be provided with an adjusted output power (e.g., a high voltage) from a power supply device, may adjust a wireless charging current to correspond to the provided output power, and may provide the adjusted wireless charging current to an external electronic device.

According to an embodiment of the present disclosure, when an electronic device serves as a wireless power reception device, the electronic device selectively may receive at least one output power (e.g., current) among a plurality of output powers (e.g., a wireless transmission current) from a wireless power supply device, and may execute charging using the selected output power. For example, the electronic device may transmit wireless power information (e.g., supportable charging power) to the wireless power supply device through a charging circuit (wireless power circuit). The electronic device may execute charging through the charging circuit (wireless power circuit) using an output power that is adjusted and output based on the wireless power information from the wireless power supply device.

An electronic device according to various embodiments of the present disclosure may include a charging circuit (wireless power circuit) for wireless charging. The electronic device may include a wireless power transmission circuit for supplying power and a wireless power reception circuit for receiving power in association with wireless charging, based on a role in the wireless charging. According to various embodiments of the present disclosure, the wireless power transmission circuit and the wireless power reception circuit may be embodied in a separate electronic device. An electronic device according to various embodiments of the present disclosure may include all devices which use one or more processors from among various processors, such as, an AP, a CP, a GPU, a CPU, and the like, such as, all information communication devices that support a function according to various embodiments (e.g., a fast wireless charging function), multimedia devices, wearable devices, charging pads, or application devices thereof.

Hereinafter, a method, device, and system that execute fast wireless charging according to various embodiments of the present disclosure will be described with reference to the drawings. However, various embodiments of the present disclosure may not be limited to the descriptions provided below and thus, it should be construed that the present disclosure may be applied to other embodiments based on the description provided below.

Hereinafter, various embodiments of the present disclosure will be described from the perspective of hardware. However, various embodiments of the present disclosure include a technology that uses both hardware and software and thus, the various embodiments of the present disclosure may not exclude the perspective of software.

Figure 4:
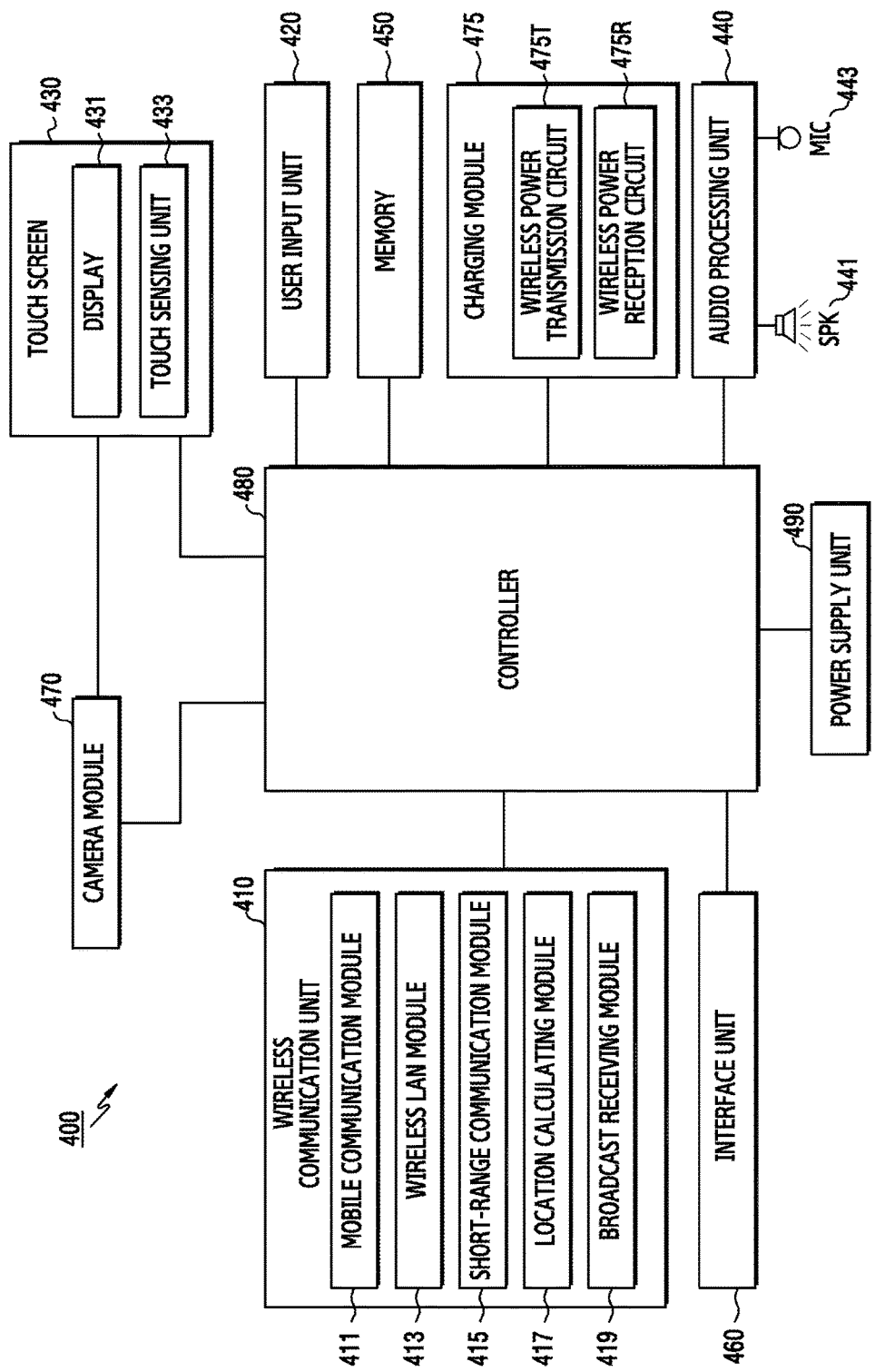
FIG. 4 is a diagram schematically illustrating a configuration of an electronic device according to various embodiments of the present disclosure.

FIG. 4 is a diagram schematically illustrating a configuration of an electronic device according to an embodiment of the present disclosure.

Referring to FIG. 4, an electronic device 400 (e.g., the electronic device 101 or the electronic device 201) according to various embodiments of the present disclosure may include a wireless communication unit 410, a user input unit 420, a touch screen 430, an audio processing unit 440, a memory 450, an interface unit 460, a camera module 470, a charging module 475 (e.g., a charging circuit), a controller 480, and a power supply unit 490. According to various embodiments of the present disclosure, the electronic device 400 may include fewer or more component elements when compared to the component elements of FIG. 4, since the component elements of FIG. 4 are not essential.

The wireless communication unit 410 may include a configuration identical or similar to the communication module 220 of FIG. 2. The wireless communication unit 410 may include one or more modules which enable wireless communication between the electronic device 400 and a wireless communication system (e.g., a base station, an access point, or the like) or enable wireless communication between the electronic device 400 and an external electronic device (e.g., another electronic device 102 or 104, or the server 106). For example, the wireless communication unit 410 may be configured to include a mobile communication module 411, a wireless LAN (WLAN) module 413, a short-range communication module 415, a location calculating module 417, a broadcast receiving module 419, and the like.

The wireless communication unit 411 may include a configuration identical or similar to the cellular module 221 of FIG. 2. The mobile communication module 411 may execute transmission and reception of a wireless signal with at least one of a base station, an external electronic device (e.g., the electronic device 104), and various servers (e.g., an integration server, a provider server, a content server, an internet server, a cloud server, and the like), over a mobile communication network. The wireless signal may include a voice call signal, a video call signal, and data in various forms according to the transmission and reception of text/multimedia messages.

The mobile communication module 411 may receive one or more data (e.g., contents, a message, mail, an image, a video, weather information, location information, time information, and the like). According to an embodiment of the present disclosure, the mobile communication module 411 may obtain (receive) various pieces of data by being connected with at least one of external devices (e.g., the electronic device 104 or the server 106) which are connected with the electronic device 400 over a network (e.g., the mobile communication network). The mobile communication module 411 may transmit various pieces of data required to the operations of the electronic device 400 to the external device (e.g., the server 104, another electronic device 104, or the like), in response to a user's request.

The wireless LAN module 413 may include a configuration identical or similar to the Wi-Fi module 223 of FIG. 2. The wireless LAN module 413 may indicate a module for establishing a wireless Internet access and a wireless LAN link with an external device (e.g., the electronic device 102 or the server 106). The wireless LAN module 413 may be embedded in the electronic device 400 or may separately exist outside the electronic device 400. Wireless Internet technology may include Wi-Fi, Wibro, world interoperability for microwave access (WiMax), high speed downlink packet access (HSDPA), millimeter wave (mmWave), or the like.

The wireless LAN module 413 may transmit or receive one or more data selected by a user to/from the outside. According to an embodiment of the present disclosure, the wireless LAN module 413 works together with at least one of another electronic device and a server which are connected with the electronic device 400 over a network (e.g., a wireless Internet network), and transmit or receive various data of the electronic device 400 to/from the outside (e.g., the other electronic device or the server). The wireless LAN module 413 may always maintain an ON-state, or may be turned on based on settings of the electronic device 400 or a user input. In a wireless charging system according to various embodiments of the present disclosure, depending on a role of the electronic device 400 (e.g., the operations of a wireless power supply device or the operations of a wireless power reception device), the wireless LAN module 413 may transmit or receive data (signal) for detecting the proximity of an external electronic device.

The short-range communication module 415 may be a module for performing short-range communication. The short-range communication technology may include BT, BT low energy (BLE), a radio frequency identification (RFID), IrDA, ultra wideband (UWB), ZigBee, NFC, and the like.

The short-range communication module 415 may receive one or more data. According to an embodiment of the present disclosure, the short-range communication module 415 works together with another electronic device that is connected with the electronic device 400 over a network (e.g., a short-range communication network), and transmits or receives various data of the electronic device 400 to/from the other electronic device. The short-range communication module 415 may always maintain an ON-state, or may be turned on based on settings of the electronic device 400 or a user input. In a wireless charging system according to various embodiments of the present disclosure, depending on a role of the electronic device 400 (e.g., the operations of a wireless power supply device or the operations of a wireless power reception device), the short-range communication module 415 may transmit or receive data (signal) for detecting the proximity of an external electronic device.

The location calculating module 417 may include a configuration identical or similar to the GNSS module 227 of FIG. 2. The location calculating module 417 may be a module for obtaining the location of the electronic device 400, and may include a GPS module as a representative example. The location calculating module 415 may measure the location of the electronic device 400, based on the principal of triangulation.

The broadcast receiving module 419 may receive a broadcast signal (e.g., a TV broadcast signal, a radio broadcast signal, a data broadcast signal, and the like) and/or broadcast related information (e.g., information associated with a broadcast channel, a broadcast program, or a broadcast service provider) from an external broadcast management server through a broadcast channel (e.g., a satellite broadcast channel, a terrestrial broadcast channel, or the like).

The user input unit 420 may generate input data for controlling the operations of the electronic device 400, in response to a user input. The user input unit 420 may include at least one input device for detecting various inputs of the user. For example, the user input unit 420 may include a key pad, a dome switch, a physical button, a touch pad (resistive/capacitive type), jog & shuttle, a sensor (e.g., the sensor module 240), or the like.

A part of the user input unit 420 may be embodied outside of the electronic device 400 in the form of a button, or a part or the whole of the user input unit 420 may be embodied as a touch panel. The user input unit 420 may receive a user input for initiating the operations of the electronic device 400 according to various embodiments of the present disclosure, or may generate an input signal based on a user input. For example, the user input unit 420 may receive various user inputs for executing wireless charging, photographing an image, executing an application, inputting (writing or inserting) data, changing the position of the electronic device 400, displaying contents, connecting a network, transmitting or receiving data, or the like, and may generate an input signal based on the user input.

The touch screen 430 may indicate an input/output means that simultaneously executes an input function and a display function, and may include a display 431 (e.g., the display 160 or 260), and a touch sensing unit 433. The touch screen 430 may provide an input/output interface between the electronic device 400 and the user, may transfer a touch input of the user to the electronic device 400, and may serve as a medium that shows an output from the electronic device 400 to the user. The touch screen 430 may show a visual output to the user. The visual output may be shown in the form of a combination of text, graphics, and videos.

According to various embodiments of the present disclosure, the display 431 may display (output) various information processed in the electronic device 400. For example, the display 431 may display a UI or a GUI associated with an operation executed when the electronic device 400 performs wireless charging (e.g., the operation of a wireless power supply device or a wireless power reception device). The display 431 may display a UI or a GUI associated with a call, when the electronic device 400 is in a call mode. The display 431 may display various application execution screens corresponding to an executed application. The various application execution screens may include various UI-based screens which may be displayed to correspond to an executed application, for example, a wireless charging screen, a messenger screen, a call screen, a game screen, a video reproduction screen, a gallery screen, a webpage screen, a home screen, an electronic device connection screen, or the like.

The display 431 may support displaying a screen based on a landscape mode, displaying a screen based on a portrait mode, or displaying a screen based on a change between the landscape mode and the portrait mode, according to a rotation direction (or an orientation) of the electronic device 400. The display 431 may use various displays (e.g., the display 160).

The touch detecting unit 433 may be mounted on the display 431, and may detect a user input that is in contact with or in proximity to the surface of the touch screen 430. The user input may include a touch event or a proximity event that is input based on at least one of a single-touch, a multi-touch, hovering, and an air gesture. The touch detecting unit 433 may receive a user input for initiating the operations of the electronic device 400 according to various embodiments of the present disclosure, or may generate an input signal based on a user input.

The audio processing unit 440 may include a configuration identical or similar to the audio module 280 of FIG. 2. The audio processing unit 440 may transmit an audio signal received from the controller 480 to a speaker (SPK) 441, and may transfer, to the controller 480, an audio signal such as a voice or the like, which is input from a microphone 443. The audio processing unit 440 may convert voice/sound data into audible sound through the speaker 441 based on the control of the controller 480 and may output the audible sound, and may convert an audio signal such as a voice or the like which is received from the microphone 443 into a digital signal and may transfer the digital signal to the controller 480.

The speaker 441 may output audio data that is received from the wireless communication unit 410 or stored in the memory 450. The speaker 441 may output a sound signal associated with various operations (functions) executed by the electronic device 400. The speaker 441 may be in charge of outputting an audio stream such as a voice recognition function, a digital recording function, and a phone call function.

The microphone 443 may receive an external sound signal and process the same as electrical voice data. The voice data processed through the microphone 443 may be converted into a form that is transmittable to the outside through the mobile communication module 411, when the electronic device 400 is in a call mode. Various noise reduction algorithms may be implemented in the microphone 443 to remove noise generated in the process of receiving an external sound signal. The microphone 443 may be in charge of inputting an audio stream such as a voice command (a voice command for initiating wireless charging), a voice recognition function, a digital recording function, and a phone call function.

The memory 450 (e.g., the memory 130 and 230) may store one or more programs that are executed by the controller 480, and may execute a function for temporarily storing input/output data. The input/output data may include, for example, charged state information (e.g., a quantity of battery charge), contents, messenger data (e.g., conversation data), contact information (e.g., wired or wireless phone number or the like), a message, a media file (e.g., an audio file, a video file, an image file, a photo file, or the like), a memo, or the like.

According to various embodiments of the present disclosure, the memory 450 may store one or more pieces of information (e.g., a reference voltage, a quantity of battery charge, wireless power information (e.g., a supportable charging power (charging voltage and charging current)), and a predetermined period of time), which correspond to a charging operation (e.g., the operation of a wireless power supply device or the operation of a wireless power reception device) of the electronic device 400. For example, the memory 450 may store a reference voltage which is set (agreed) in advance between electronic devices for wireless charging, and wireless power information which is set (agreed) in advance for fast wireless charging. According to various embodiments of the present disclosure, the wireless power information may be set to a voltage higher than the reference voltage, in order to output a voltage that is greater than or equal to the reference voltage. Also, the memory 450 may store a predetermined period of time for waiting for a response from a power supply device (not illustrated) in response to a request for outputting a voltage greater than or equal to the reference voltage.

The memory 450 may store one or more programs and data associated with executing a fast wireless charging function of the electronic device 400. For example, according to various embodiments of the present disclosure, the memory 450 may store one or more programs which process an operation associated with improving a charging speed and stabilizing a circuit by adaptively adjusting an output power based on the state of the charging power when wireless charging is executed between electronic devices, and may store data processed accordingly.

The memory 450 may include one or more application software modules or the like. The application module may include instructions for executing fast wireless charging. For example, the application module may process an operation (function) of improving a charging speed and stabilizing a circuit by adaptively adjusting an output power based on the state of an input power when wireless charging is executed between electronic devices.

The interface unit 460 may include a configuration identical or similar to the interface 270 of FIG. 2. The interface unit 460 may receive data or power from an external electronic device, and may transfer the same to each component element included in the electronic device 400. The interface unit 460 may enable the data inside the electronic device 400 to be transmitted to an external electronic device.

The camera module 470 (e.g., the camera module 291) may indicate a configuration that supports a photographing function of the electronic device 400. The camera module 470 may photograph a subject based on the control of the controller 480, and may transfer the photograph data to the display 431 and the controller 480.

The charging module 475 (e.g., a charging circuit or a wireless power circuit) may have a configuration that is identical or similar to the power management module 295 of FIG. 2. According to various embodiments of the present disclosure, the charging module 475 may be controlled by the controller 480. The charging module 475 may support a charging operation to correspond to a role that the electronic device 400 plays in the wireless charging (e.g., a wireless power supply device (PTU) or a wireless power reception device (PRU)). According to various embodiments of the present disclosure, the charging module 475 may be embodied by using a circuit of an electromagnetic inductive coupling method (wireless power transfer of electromagnetic inductive coupling method) or an electromagnetic resonance method (wireless power transfer of electromagnetic resonance method), but the present disclosure may not be limited thereto.

According to various embodiments of the present disclosure, the charging module 475 may generate a magnetic field based on the control of the controller 480, so as to support wireless charging of an external electronic device (e.g., a wireless power reception device) which receives power and executes charging. The charging module 475 may include a wireless power transmission circuit 475T that supplies a wireless power for wireless charging of an external electronic device (e.g., a wireless power reception device) when the electronic device 400 serves as a wireless power supply device.

According to an embodiment of the present disclosure, the charging module 475 may generate wireless transmission power (charging power) using an output power supplied from a power supply device, and may supply the same to an external electronic device (e.g., a wireless power reception device) through the wireless power transmission circuit 475T (e.g., electromagnetic resonance method or an electromagnetic inductive coupling method). According to an embodiment of the present disclosure, the charging module 475 may include at least one charging region where charging is executed with an external electronic device (e.g., a wireless power reception device). At least a part of the charging region may include at least one coil or a magnetic material. The magnetic material may be formed to have, for example, magnetic reluctance. According to an embodiment of the present disclosure, the at least one coil or the magnetic material may be formed in at least one charging region or at least a part of at least one charging region. According to various embodiments of the present disclosure, the charging module 475 may be embodied to supply energy irrespective of the orientation of a wireless power reception device in a charging region.

According to various embodiments of the present disclosure, when an external electronic device for charging does not exist in a charging region, the charging module 475 may omit a charging operation based on the control of the controller 480 or a circuit that controls the charging module 475. According to various embodiments of the present disclosure, when a wireless power reception device for charging is put on at least a part of a charging region, the charging module 475 may supply, through at least the part where the wireless power reception device is put, current to a valid charging region where the wireless power reception device may be charged, under the control of the controller 480 or the circuit that controls the charging module 475, and may execute charging of the wireless power reception device. According to various embodiments of the present disclosure, when two or more external electronic devices are put on a charging region, the charging module 475 may be embodied to supply current based on a level (e.g., a higher level) which is different from the case where a single external electronic device is put on.

According to various embodiments of the present disclosure, the charging module 475 may induce a magnetic field that is generated in an external electronic device (e.g., a wireless power supply device) which supplies power. When the electronic device 400 serves as a wireless power reception device, the charging module 475 may include the wireless power reception circuit 475R which receives a wireless power supplied from a wireless power transmission device and executes charging.

According to an embodiment of the present disclosure, the charging module 475 may wirelessly receive power generated from a charging module of an external electronic device (e.g., a wireless power supply device) through the wireless power reception circuit 475R. The wireless charging module 475 may provide the received power (charging power) to a battery that is connected with the charging module 475.

According to various embodiments of the present disclosure, the charging module 475 may include a detecting module. For example, the charging module 475 may detect a signal transmitted from an external electronic device (e.g., a wireless power supply device). The charging module 475 may execute an operation (e.g., starting wireless charging, changing a wireless charging current, changing a wireless charging voltage, terminating wireless charging, or the like) corresponding to the signal, in response to the signal transmitted from the external electronic device. According to an embodiment of the present disclosure, in a charging mode for charging an external electronic device, the charging module 475 may detect the proximity of the external electronic device and execute an operation (adjusting a charging power based on the distance between the external electronic device and the electronic device 400, providing guidance of the location of the charging region of the external electronic device, reporting whether charging of the external electronic device is possible, or the like) corresponding to the location of the external electronic device. According to various embodiments of the present disclosure, the operation of detecting an external electronic device may be embodied through the charging module 475, or may be embodied through the short-range communication technology (e.g., BLE, ZigBee, NFC, or the like) using the short-range communication module 415.

The controller 480 may control a general operation of the electronic device 400. According to various embodiments of the present disclosure, the controller 480 may control an operation associated with executing a fast wireless charging function. For example, the controller 480 may control an operation of supplying power in association with the role of a wireless power supply device and an operation of receiving power in association with the role of a wireless power reception device, based on the role that the electronic device 400 plays in the wireless charging operation.

According to various embodiments of the present disclosure, when the electronic device 400 serves as a wireless power supply device, the controller 480 may detect an external electronic device (e.g., a wireless power reception device) through the charging module 475 (e.g., the wireless power transmission circuit 475T) or the short-range communication module 415. According to various embodiments of the present disclosure, the controller 480 may determine wireless power information (e.g., charging power (charging voltage and charging current) corresponding to the external electronic device. According to an embodiment of the present disclosure, the controller 480 may determine a charging power (e.g., a first current or a second current) supported by the external electronic device, at least partially based on the wireless power information. The controller 480 may adjust an output power (e.g., the first current or the second current) to correspond to the charging power that the external electronic device supports. The controller 480 may provide the external electronic device with the adjusted output power (e.g., the first current or the second current) through the charging module 475 (e.g., the wireless power transmission circuit 475T).

According to various embodiments of the present disclosure, adjusting current may be executed by adjusting the current of the charging module 475 in response to a request from an external electronic device (e.g., a wireless power reception device). According to an embodiment of the present disclosure, the controller 480 may determine a feedback (request) from an external electronic device (a wireless power reception device) with respect to an output power that the electronic device 400 provides. The controller 480 may control the charging module 475 (e.g., the wireless power transmission circuit 475T) based on a result of the determination, so as to adjust the output power to correspond to a charging power (e.g., current) requested by the external electronic device. According to various embodiments of the present disclosure, adjusting current may be executed at least partially based on a change in a switching period of the charging module 475 (e.g., the wireless power transmission circuit 475T) or a change in a duty cycle (e.g., a period repeated within a second) of power supplied from the electronic device 400, so that an operating frequency is changed. According to various embodiments of the present disclosure, the duty cycle may indicate a ratio of ON duration to OFF duration in a period, for an electronic device that periodically executes turning on (e.g., supplies power) and off (e.g., suspends supplying power).

According to various embodiments of the present disclosure, adjusting voltage may be executed by a power supply device which is included in the electronic device 400 or is connected with the outside of the electronic device 400. According to various embodiments of the present disclosure, the voltage may be changed when a request for a high voltage is provided from an external electronic device (e.g., a wireless power reception device). For example, when an external electronic device requests a charging power (e.g., a high voltage), the controller 480 may transfer, to a power supply device, a request for changing an output power (e.g., a high voltage) corresponding to the charging power. When the requested output power (e.g., a high voltage) is supported, the power supply device may change the existing output power (e.g., a reference voltage) to the requested output power (e.g., a high voltage), and may provide the same to the charging module 475 (e.g., wireless power transmission circuit 475T). According to various embodiments of the present disclosure, when a separate request is not provided from an external electronic device (e.g., a wireless power reception device), or when a power supply device does not support a charging power (e.g., a high voltage), the power supply device may not change the voltage and may provide a reference voltage.

According to various embodiments of the present disclosure, when the electronic device 400 serves as a wireless power reception device, the controller 480 may execute a process so as to selectively receive at least one charging power among charging powers provided by an external electronic device (e.g., a wireless power supply device). For example, the controller 480 may execute a control to transmit wireless power information (e.g., a charging power (charging voltage and charging current)) corresponding to the electronic device 400, to an external electronic device through the charging module 475 (e.g., the wireless power reception circuit 475R). The controller 480 may control the charging module 475 (e.g., the wireless power reception circuit 475R) to execute charging a battery using a charging power supplied from an external electronic device, based on the wireless power information.

According to various embodiments of the present disclosure, when a voltage (e.g., a high voltage) corresponding to a charging power is not provided during a predetermined period of time after sending a request for the charging power to an external electronic device (e.g., a wireless power supply), the controller 480 may request a reference voltage again, and process a charging operation. According to various embodiments of the present disclosure, the controller 480 may transmit a packet to notify the external electronic device that a voltage that is higher than the reference voltage is needed. According to an embodiment of the present disclosure, the controller 480 may successively transmit a control error packet which has been used in the standards (e.g., wireless power consortium (WPC)), or may define a new packet for use.

According to various embodiments of the present disclosure, a controlling operation of the controller 480 and a charging operation of the charging module 475 (e.g., the wireless power transmission circuit 475T or the wireless power reception circuit 475R), will be described with reference to the following described drawings.

According to various embodiments of the present disclosure, the controller 480 may work together with software modules stored in the memory 450, and execute a wireless charging control operation of the electronic device 400 according to various embodiments of the present disclosure. According to various embodiments of the present disclosure, the controller 480 may be embodied as one or more processors that control the operations of the electronic device 400 according to various embodiments of the present disclosure by executing one or more programs stored in the memory 450.

The power supply unit 490 may receive external power or internal power based on the control of the controller 480, and may supply power required for the operation of each component element. According to various embodiments of the present disclosure, the power supply unit 490 may turn on/off supplying power to the display 431, the camera module 470, the charging module 475, and the like, based on the control of the controller 480.

Various embodiments described in the present disclosure may be implemented in a computer (or similar device)-readable recording medium using software, hardware or a combination thereof. According to various embodiments of the present disclosure, the recording medium may include a computer-readable recording medium that stores a program for implementing an operation of determining information associated with a charging mode that is supported by both a wireless power supply device and a wireless power reception device, which support a plurality of charging modes, an operation of determining a charging mode based on the information, and an operation of executing charging based on the determined charging mode.

Figure 5:
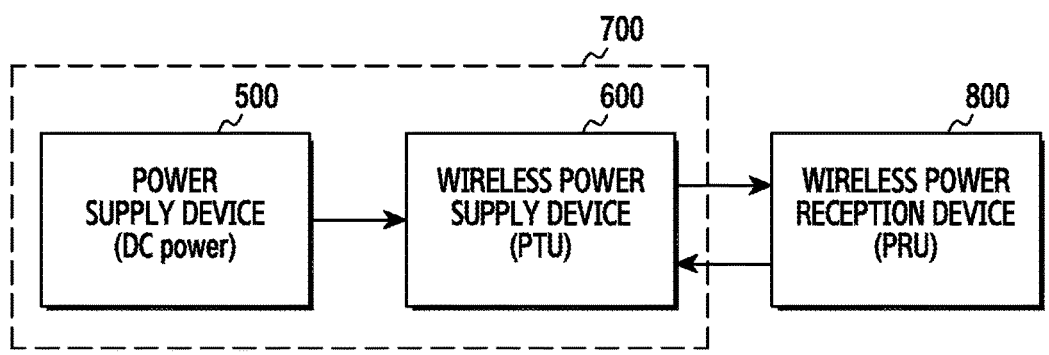
FIG. 5 is a diagram schematically illustrating a wireless charging system and operations thereof according to various embodiments of the present disclosure.

FIG. 5 is a diagram schematically illustrating a wireless charging system and operations thereof according to various embodiments of the present disclosure.

Referring to FIG. 5, a wireless charging system according to various embodiments of the present disclosure may include a power supply device 500 (e.g., a TA or a power supply), a wireless power supply device (PTU) 600 that wirelessly supplies power (power supply), and a wireless power reception device 800 that wirelessly receives power (power supply) and executes charging. According to various embodiments of the present disclosure, the wireless power supply device 600 and the wireless power reception device 800 may include, for example, a part or the whole of the electronic device 400 of FIG. 4. According to an embodiment of the present disclosure, the wireless power reception device 800 may be of a type that is identical to or different from the electronic device 400. According to various embodiments of the present disclosure, the power supply device 500 and the wireless power supply device 600 are embodied in separate devices, or may be embodied as a device 700 that includes the configuration corresponding to the power supply device 500 in the wireless power supply device 600.

In a wireless charging system according to various embodiments of the present disclosure, the power supply device 500 may be a device for supplying an output power (output voltage and output current) to the wireless power supply device 600 in the wireless charging. The power supply device 500 may provide power by converting alternative current (AC) power into direct current (DC) power. The power supply device 500 may provide the power to the wireless power supply device 600 which is physically connected thereto. According to various embodiments of the present disclosure, the power supply device 500 may be included in the device 700 which is an integration with the wireless power supply device 600, or may be embodied as a separate device (e.g., charger).

According to various embodiments of the present disclosure, the power supply device 500 may include an interface (not illustrated) (e.g., a connector or a cable) and a power supply control module (not illustrated) (e.g., a power control circuit). The power supply device 500 according to various embodiments of the present disclosure may support at least one charging mode (e.g., a fast charging mode based on a high voltage or a normal charging mode based on a reference voltage). According to an embodiment of the present disclosure, the power supply device 500 may be connected to an external power supply (e.g., AC power supply). The power supply device 500 may convert power supplied from the external power supply, and provide the same to the wireless power supply device 600 that is connected thereto through an interface. According to various embodiments of the present disclosure, the interface may be connected with an external electronic device (e.g., the wireless power supply device 600), and may supply power to the external electronic device.

According to various embodiments of the present disclosure, the power supply device 500 may communicate with the wireless power supply device 600 through the power supply control module, and control supplying power based on a charging mode of the wireless power supply device 600.

According to various embodiments of the present disclosure, the power supply device 500 may transmit a signal (e.g., signals of D+ line and D− line) having a value (e.g., a voltage value) designated based on whether a fast charging mode is supported. According to an embodiment of the present disclosure, the wireless power supply device 600 may determine whether the power supply device 500 that is connected with the wireless power supply device 600 is a power supply device that supports fast charging or a power supply device that does not support fast charging, based on a signal received from the power supply device 500.

According to various embodiments of the present disclosure, when the fast charging is supported, the power supply device 500 may supply a first voltage (e.g., 5V) to the wireless power supply device 600, or may supply a second voltage (e.g., 10V) which is higher than the first voltage, to the wireless power supply device 600. According to an embodiment of the present disclosure, when the fast charging is supported, the power supply device 500 may control power in order to supply, to the wireless power supply device 600, an output power (e.g., the first voltage or the second voltage) corresponding to a charging power requested by the wireless power supply device 600.

In a wireless charging system according to various embodiments of the present disclosure, when a DC power supply is provided from the power supply device 500, the wireless power supply device 600 may convert the DC power supply into AC power and transmit power through a transmission coil. According to various embodiments of the present disclosure, the wireless power supply device 600 may include a part (e.g., the wireless power transmission circuit 475T of the charging module 475) or the whole of the electronic device 400 of FIG. 4.

According to various embodiments of the present disclosure, the wireless power supply device 600 may execute a control so that the power supply device 500 supplies a first voltage (e.g., a reference voltage of 5V) or a second voltage (e.g., a high voltage of 10V) which is higher than the first voltage (e.g., a reference voltage of 5V). For example, when the wireless power supply device 600 detects a connection of the power supply device 500, the wireless power supply device 600 may control the power supply device 500 to output the first voltage, and subsequently, may control the power supply device 500 to output the second voltage in response to a request from the wireless power reception device 800.

According to various embodiments of the present disclosure, the wireless power supply device 600 may execute a control so that the power supply device 500 supplies power by gradually lowering voltage from the maximum voltage. For example, when the wireless power supply device 600 detects a connection of the power supply device 500, the wireless power supply device 600 may control the power supply device 500 to output the second voltage (e.g., a maximum voltage of 10V), and subsequently, may control the power supply device 500 to output a third voltage (e.g., 7V) which is lower than the second voltage in response to a request from the wireless power reception device 800. According to various embodiments of the present disclosure, the third voltage may be a voltage greater than the first voltage and less than the second voltage.

According to various embodiments of the present disclosure, the wireless power supply device 600 may control an output power of the power supply device 500 based on information (e.g., wireless power information) associated with a charging power (charging voltage and charging current) requested by an external electronic device (e.g., the wireless power reception device 800).

According to various embodiments of the present disclosure, the wireless power supply device 600 may set a fast charging mode or a normal charging mode based on whether the power supply device 500 supports fast charging. According to an embodiment of the present disclosure, the wireless power supply device 600 may receive various information associated with an ID, a type, or a model of the power supply device 500 from the power supply device 500. The wireless power supply device 600 may determine whether the power supply device 500 supports a fast charging mode based on the received information. The wireless power supply device 600 may set the charging mode to a fast charging mode when the power supply device 500 supports the fast charging mode.

For example, the wireless power supply device 600 may determine whether the power supply device 500 supports fast charging based on a signal (e.g., signals of D+ line and D− line) received from the power supply device 500. According to an embodiment of the present disclosure, the power supply device 500 may transmit a signal (e.g., signals of D+ line and D− line) having a value (e.g., a voltage value) designated to be different based on whether a fast charging mode is supported. The wireless power supply device 600 may determine whether the connected power supply device 500 is a power supply device that supports fast charging or a power supply device that does not support fast charging, based on a signal of D+ line and a signal of D− line received from the power supply device 500.

According to various embodiments of the present disclosure, the wireless power supply device 600 may set the charging mode of the power supply device 500 to a fast charging mode when receiving a charging power for fast charging of an external electronic device (e.g., the wireless power reception device 800). For example, the wireless power supply device 600 may transmit a signal corresponding to the charging power of an external electronic device to the power supply device 500, and may receive, from the power supply device 500, a signal identical to the transmitted signal as a confirmation message. The wireless power supply device 600 may determine that the power supply device 500 supports a fast charging mode through the confirmation message, and the power supply device 500 supplies power (output power) corresponding to the transmitted charging power.

According to various embodiments of the present disclosure, the wireless power supply device 600 may set a charging power corresponding to an output power supplied from the power supply device 500, and transmit the set charging power to an external electronic device (e.g., the wireless power reception device 800).

According to various embodiments of the present disclosure, the wireless power supply device 600 may receive a request for a second charging power which is greater than a first charging power, through communication with the wireless power reception device 800. According to an embodiment of the present disclosure, the wireless power supply device 600 may transfer the second charging power to the power supply device 500 through the communication with the power supply device 500, and may control the power supply device 500 to supply power corresponding to the second charging power. For example, the wireless power supply device 600 may request, from the power supply device 500, an output voltage that is higher than the voltage of normal charging with respect to the wireless power reception device 800, and may execute a control to receive an output voltage higher than normal charging from the power supply device 500.

According to various embodiments of the present disclosure, the wireless power supply device 600 may determine whether an output voltage is supplied from the power supply device 500. According to an embodiment of the present disclosure, the wireless power supply device 600 may provide the wireless power reception device 800 with a second voltage (e.g., 10V) supplied from the power supply device 500. According to an embodiment of the present disclosure, the wireless power supply device 600 may provide the wireless power reception device 800 with a first voltage (e.g., 5V) supplied from the power supply device 500.

Hereinafter, although it is described that the wireless power supply device 600 controls power through communication with the power supply device 500 or the wireless power reception device 800, the present disclosure may not be limited thereto. The configuration and operations of the wireless power supply device 600 according to various embodiments of the present disclosure will be described with reference to FIGS. 6 and 7.

In a wireless charging system according to various embodiments of the present disclosure, the wireless power reception device 800 may receive, through a reception coil, AC power transmitted from a transmission coil of the wireless power supply device 600, and convert the AC power into DC power, and generate (rectify) power as a DC power supply of a predetermined size. According to various embodiments of the present disclosure, the wireless power reception device 800 may include a part (e.g., the wireless power reception circuit 475R of the charging module 475) or the whole of the electronic device 400 of FIG. 4. The wireless power reception device 800 may charge an internal device (e.g., a battery) or an external device (e.g., another electronic device) based on the generated (rectified) DC power supply.

According to various embodiments of the present disclosure, the wireless power reception device 800 may exchange information (wireless power information) associated with a charging power (charging voltage and charging current), through the communication with the wireless power supply device 600. For example, the wireless power supply device 600 and the wireless power reception device 800 may execute communication for the transmission/reception of the information through each coil (e.g., a transmission coil or a reception coil). Alternatively, the wireless power supply device 600 and the wireless power reception device 800 may execute communication for the transmission/reception of the information through short-range communication (e.g., BLE, ZigBee, NFC, and the like).

According to various embodiments of the present disclosure, the wireless power reception device 800 may selectively receive at least one charging power among a plurality of charging powers provided from the wireless power supply device 600. The wireless power reception device 800 may process charging a battery using the at least one selected charging power.

According to various embodiments of the present disclosure, the wireless power reception device 800 may receive a first charging power which is provided from the wireless power supply device 600, and execute charging based on the first charging power. According to various embodiments of the present disclosure, the wireless power reception device 800 may request, from the wireless power supply device 600, a second charging power which is greater than the first charging power which is used for normal charging through the communication with the wireless power supply device 600. Accordingly, the wireless power reception device 800 may receive power corresponding to the second charging power, from the wireless power supply device 600.

According to various embodiments of the present disclosure, the wireless power reception device 800 may execute charging using power corresponding to the requested second charging power, which is received from the wireless power supply device 600. According to an embodiment of the present disclosure, when power corresponding to the second charging power is supplied, the wireless power reception device 800 may execute fast charging using the power (e.g., the second charging power) supplied from the wireless power supply device 600. According to an embodiment of the present disclosure, when power corresponding to the requested second charging power is not supplied, the wireless power reception device 800 may execute normal charging using power (e.g., the first charging power) supplied from the wireless power supply device 600.

According to various embodiments of the present disclosure, the wireless power reception device 800 may include a PMIC and a charger IC. For example, the PMIC may be mounted on an integrated circuit or an SoC semiconductor. According to an embodiment of the present disclosure, the PMIC may include the charger IC. According to various embodiments of the present disclosure, the charger IC may include a charger IC for a wireless charging scheme. According to various embodiments of the present disclosure, wireless charging may include, for example, electromagnetic resonance charging, magnetic inductive charging, and electromagnetic wave charging, and the like, and an additional circuit for wireless charging such as a coil loop, a resonance circuit, a rectifier or the like, may be added.

According to various embodiments of the present disclosure, the wireless power reception device 800 may control the power supplied from the wireless power supply device 600 or the power input or output to/from the battery.

Hereinafter, although it is described that the wireless power reception device 800 controls power through communication with the wireless power supply device 600, the present disclosure may not be limited thereto. The configuration and operations of the wireless power reception device 800 according to various embodiments of the present disclosure will be described with reference to FIG. 10.

Figure 6:
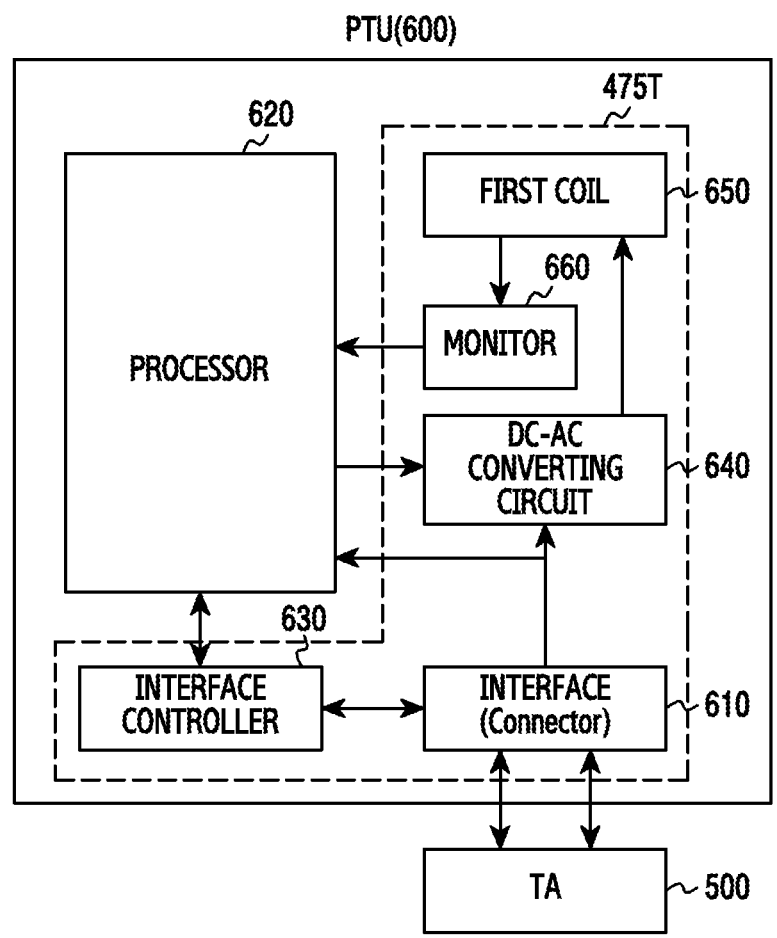
FIG. 6 is a diagram schematically illustrating a configuration of an electronic device that wirelessly supplies power in a wireless charging system according to various embodiments of the present disclosure.

FIG. 6 is a diagram schematically illustrating a configuration of a wireless power supply device in a wireless charging system according to various embodiments of the present disclosure.

FIG. 6 illustrates the configuration and operations of a wireless power supply device when the electronic device 400 serves as the wireless power supply device 600 (e.g., the wireless power transmission circuit 475T of the charging module 475) that supplies power, or when a separate wireless power supply device is used. For example, FIG. 6 illustrates an example of various devices that supply power to a wireless power reception device.

Referring to FIG. 6, the wireless power supply device (PTU) 600 may include a processor 620 and the wireless power transmission circuit 475T. According to various embodiments of the present disclosure, the wireless power transmission circuit 475T may be configured to include an interface (I/F) 610 (e.g., a connector or a cable), an I/F controller 630, a DC-AC converting circuit 640 (e.g., a DC-AC inverter), a first coil 650, a monitor 660, and the like.

According to various embodiments of the present disclosure, the processor 620 may control each part of the wireless power supply device 600. According to various embodiments of the present disclosure, the processor 620 may be of a type that is identical to or different from the controller 480 of the electronic device 400. According to various embodiments of the present disclosure, the processor 620 may determine a feedback (request) with respect to power supplied to an external electronic device (e.g., the wireless power reception device 800). According to an embodiment of the present disclosure, the processor 620 may be functionally connected with the wireless power transmission circuit 475T, and may detect an external electronic device based on the wireless power transmission circuit 475T. The processor 620 may determine wireless power information received from the external electronic device, and may determine a charging power (charging voltage and charging current) supported by the external electronic device based on the wireless power information. According to an embodiment of the present disclosure, the processor 620 may determine whether the external electronic device supports a first charging power or a second charging power which is higher than the first charging power, at least partially based on the wireless power information.

According to various embodiments of the present disclosure, the processor 620 may determine the first charging power or the second charging power to correspond to the wireless power information, and execute a control to receive power corresponding to the corresponding charging power from the power supply device 500 at least partially based on the determination. According to various embodiments of the present disclosure, the processor 620 may control switching of the DC-AC converting circuit 640 so as to enable the power supplied from the power supply device 500 to correspond to the charging power requested by the external electronic device. For example, the processor 620 may change a switching period of the DC-AC converting circuit 640 or change a duty cycle of the DC-AC converting circuit 640, so as to change an operating frequency.

According to various embodiments of the present disclosure, when a request for the second charging power (e.g., a high voltage) is transmitted from an external electronic device, the processor 620 may execute a control to request the power supply device 500 to supply power corresponding to the second charging power. According to an embodiment of the present disclosure, when power (e.g., a high voltage) corresponding to the second charging power is supported, the power supply device 500 supplies power by changing the power into power (e.g., a high voltage) corresponding to the second charging power.

According to various embodiments of the present disclosure, the I/F 610 may be a connection part that is connected to the power supply device 500 (e.g., a TA), or may include a power line and a data line. According to various embodiments of the present disclosure, the I/F 610 may be connected with the power supply device 500. According to an embodiment of the present disclosure, the I/F 610 may transfer the power input from the power supply device 500 to the processor 620 and the DC-AC converting circuit 640. According to various embodiments of the present disclosure, the I/F 610 may include, for example, a HDMI, a USB, an MHL interface, or an SD card/MMC interface.

According to various embodiments of the present disclosure, the I/F controller 630 may indicate a communication interface for determining whether the power supply device 500 supports the power corresponding to the second charging power. According to various embodiments of the present disclosure, the I/F controller 630 may be electrically connected with the processor 620 and the I/F 610. According to an embodiment of the present disclosure, the I/F controller 630 may be functionally connected with the power supply device 500, and may receive required power (e.g., the first charging power or the second charging power) through the I/F 610. According to various embodiments of the present disclosure, the I/F controller 630 may be embodied to be included in the processor 620. According to various embodiments of the present disclosure, at least some functions of the I/F controller 630 may be included in the processor 620.

According to various embodiments of the present disclosure, the DC-AC converting circuit 640 may switch the DC power supply of the power supply device 500 into AC power. For example, the DC-AC converting circuit 640 may include an inverter that converts DC power into AC power. According to various embodiments of the present disclosure, the wireless power supply device 600 may change, through the DC-AC converting circuit 640, the voltage received from the power supply device 500 into the power or voltage that the wireless power reception device 800 supports (requests). According to various embodiments of the present disclosure, the operations of the DC-AC converting circuit 640 based on the conversion of a voltage will be described in detail with reference to FIG. 7.

According to various embodiments of the present disclosure, the first coil 650 indicates a transmission coil in various embodiments, and may be in charge of transferring AC voltage to the wireless power reception device 800.

According to various embodiments of the present disclosure, the monitor 660 may sense the voltage or current on the first coil 650. According to various embodiments of the present disclosure, the monitor 660 may detect the proximity of an external electronic device (e.g., the wireless power reception device 800), at least partially based on a result of sensing the voltage or current on the first coil 650. According to various embodiments of the present disclosure, the monitor 660 may execute communication through the first coil 650, and receive information (e.g., wireless power information) associated with fast charging.

According to various embodiments of the present disclosure, the wireless power supply device 600 or the wireless power transmission circuit 475T may include a wireless communication module (e.g., BLE, ZigBee, NFC, antenna, or the like) for exchanging wireless power information with the external electronic device (e.g., wireless power reception device 800) or detecting the proximity of the external electronic device.

Figure 7:
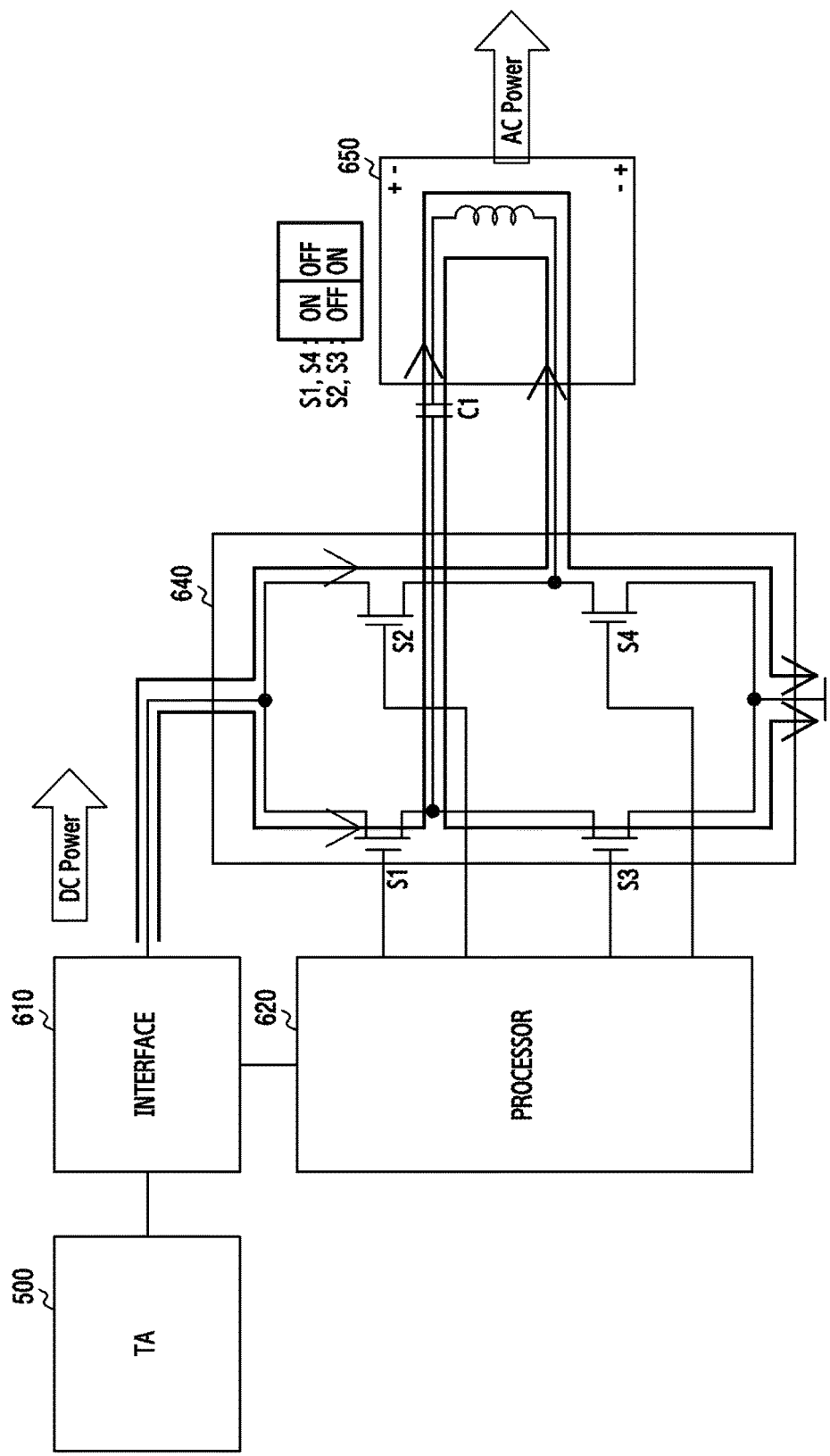
FIG. 7 is a diagram illustrating an operation of adjusting a charging power in an electronic device according to various embodiments of the present disclosure.

FIG. 7 is a diagram illustrating an operation of adjusting a charging power in a wireless power supply device according to various embodiments of the present disclosure.

Referring to FIGS. 6 and 7, in various embodiments of the present disclosure, the DC-AC converting circuit 640 may equally execute an operation of changing DC into AC based on the control of the processor 620 without changing a basic operation, when executing wireless charging using a reference voltage (e.g., the power corresponding to the first charging voltage) or execute wireless charging using a high voltage that is higher than the reference voltage (e.g., the power corresponding to the second charging power).

For example, when the DC-AC converting circuit 640 operates based on the reference voltage or a high voltage, the voltage that may be supplied from the power supply device 500 may control a switch (e.g., S1, S2, S3, and S4) of the DC-AC converting circuit 640 through the processor 620 of the wireless power supply device 600. According to an embodiment of the present disclosure, as illustrated in FIG. 7, an operation that changes DC of the power supply device 500 which is transferred through the I/F 610 into AC may be executed.

According to various embodiments of the present disclosure, the DC power may be changed into AC power through switching of the switch (e.g., S1, S2, S3, and S4) of the DC-AC converting circuit 640, and switching of the switch may be adjusted through the processor 620. In various embodiments of the present disclosure, although the DC-AC converting circuit 640 is illustrated as an N-channel metal oxide semiconductor (N-MOS), the present disclosure may not be limited thereto, and the DC-AC converting circuit 640 may be embodied as a P-channel MOS (P-MOS).

According to various embodiments of the present disclosure, when the wireless power supply device 600 executes charging using the reference voltage, the power supply device 500 may fix the reference voltage as a voltage irrespective of whether a high voltage is supported, change the current through the processor 620 of the wireless power supply device 600, and adjust power that is supplied to an external electronic device (e.g., the wireless power reception device 800). According to various embodiments of the present disclosure, the supplied power may be changed based on a disposition of devices, a level of battery charge, a state of an external electronic device, or the like, and the power may be adjusted accordingly.

According to various embodiments of the present disclosure, the DC-AC converting circuit 640 may convert DC power supplied from the power supply device 500 which is (functionally) connected through the I/F 610, into AC power, and provide the same to the coil 650. The coil 650 may transmit the AC power to an external electronic device (e.g., the wireless power reception device 800).

According to various embodiments of the present disclosure, when an external electronic device (e.g., the wireless power reception device 800) requests a high voltage and the power supply device 500 supports the high voltage, the power supply device 500 may fix the high voltage as a voltage, change the current through the processor 620 of the wireless power supply device 600, and adjust power supplied to the external electronic device (e.g., the wireless power reception device 800). According to various embodiments of the present disclosure, the supplied power may be changed based on a disposition of devices, a level of battery charge, a state of an external electronic device, or the like, and the power may be adjusted accordingly.

According to various embodiments of the present disclosure, the processor 620 may determine whether the external electronic device requests a high voltage. According to various embodiments of the present disclosure, the processor 620 may determine the state of an external electronic device, and may adjust a voltage level or a current intensity to correspond to a charging power requested by the external electronic device based on a result of the determination. According to various embodiments of the present disclosure, the processor 620 may adjust a switching frequency (e.g., a wireless charging operating frequency) of the DC-AC converting circuit 640 or a duty cycle, so as to change the output voltage or current. According to an embodiment of the present disclosure, the processor 620 may lower the supplied power by increasing the switching frequency of the DC-AC converting circuit 640 from a fixed voltage, or may increase the supplied power by decreasing the switching frequency of the DC-AC converting circuit 640. According to an embodiment of the present disclosure, the processor 620 may increase the supplied power by increasing the duty cycle of the DC-AC converting circuit 640 or decrease the supplied power by decreasing the duty cycle.

As described above, an electronic device according to various embodiments of the present disclosure may include a wireless power circuit, and one or more processors which are functionally connected with the wireless power circuit, wherein the one or more processors are configured to execute detecting an external electronic device through the wireless power circuit; determining wireless power information corresponding to the external electronic device, determining whether the external electronic device supports a first charging power or a second charging power, at least partially based on the wireless power information, providing the first charging power to the external electronic device through the wireless power circuit, at least partially based on the determination that the external electronic device supports the first charging power, and providing the second charging power to the external electronic device through the wireless power circuit, at least partially based on the determination that the external electronic device supports the second charging power.

Figure 8:
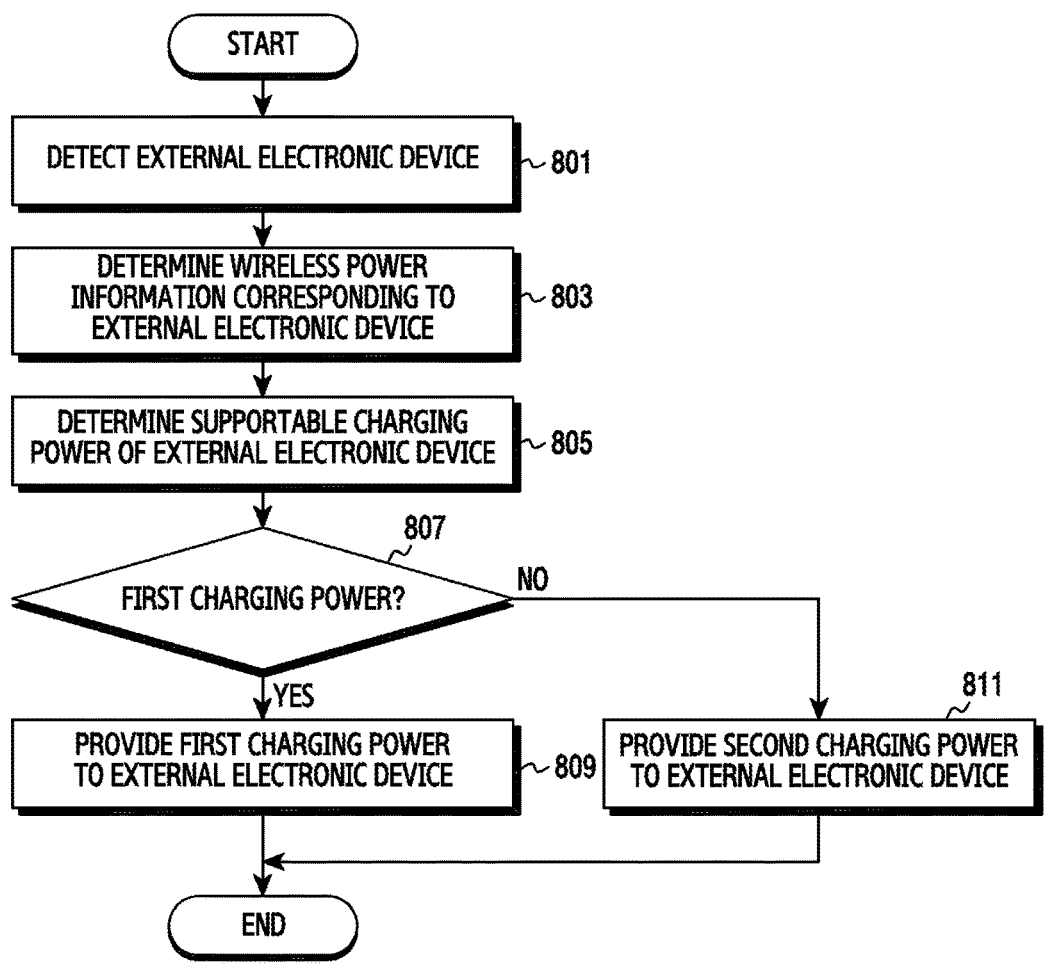
FIG. 8 is a flowchart illustrating an operation of wirelessly supplying power in an electronic device according to various embodiments of the present disclosure.

FIG. 8 is a flowchart illustrating an operation of supplying a wireless power in an electronic device according to various embodiments of the present disclosure.

Referring to FIG. 8, an example is provided in which the electronic device 400 is the wireless power supply device 600, or the electronic device 400 serves as the wireless power supply device 600 and supports wireless charging.

Referring to FIG. 8, the electronic device 400 (e.g., the wireless power supply device 600) detects the proximity of an external electronic device (e.g., the wireless power reception device 800) in operation 801. For example, the electronic device 400 may detect an external electronic device that enters a wireless charging-enabled range through the short-range communication module 415 or the charging module 475 (e.g., the wireless power transmission circuit 475T) for detecting the external electronic device.

In operation 803, the electronic device 400 determines wireless power information corresponding to the external electronic device. For example, the external electronic device may provide wireless power information to the electronic device 400, and the electronic device 400 may determine the wireless power information received from the external electronic device.

In operation 805, the electronic device 400 determines a charging power (e.g., a first charging power or a second charging power) supported by the external electronic device, at least partially based on the determined wireless power information.

In operation 807, the electronic device 400 determines whether the external electronic device supports the first charging power or the second charging power that is higher than the first charging power for fast wireless charging, based on a result of the determination.

When the electronic device 400 determines that the external electronic device supports the first charging power in operation 807 (i.e., YES in operation 807), the electronic device 400 provides the first charging power to the external electronic device in operation 809. For example, the electronic device 400 may control the charging module 475 to enable the power supply device 500 to supply power (e.g., a reference voltage) corresponding to the first charging power. When the power supply device 500 supplies power (e.g., the reference voltage), the electronic device 400 may adjust the current to correspond to the first charging power (e.g., a first current) based on the power (e.g., the reference voltage). According to an embodiment of the present disclosure, the electronic device 400 may adjust an output power to correspond to the first charging power supplied to the external electronic device, based on the first current. The electronic device 400 may provide the adjusted output power (for example, the first charging power) to the external electronic device through the charging module 475.

When the electronic device 400 determines that the external electronic device supports the second charging power in operation 807 (i.e., NO in operation 807), the electronic device 400 provides the second charging power to the external electronic device in operation 811. For example, the electronic device 400 may control the charging module 475 to enable the power supply device 500 to supply power (e.g., a high voltage) corresponding to the second charging power. When the power supply device 500 supplies power (e.g., a high voltage), the electronic device 400 may adjust the current to correspond to the second charging power (e.g., a second current) based on the power (e.g., a high voltage). According to an embodiment of the present disclosure, the electronic device 400 may adjust an output power to correspond to the second charging power supplied to the external electronic device, based on the second current. The electronic device 400 may provide the adjusted output power (for example, the second charging power) to the external electronic device through the charging module 475.

According to various embodiments of the present disclosure, the electronic device 400 may process charging of the external electronic device based on the first charging power or the second charging power. Subsequently, the electronic device 400 may execute a charging operation based on detection of various states of the external electronic device. According to an embodiment of the present disclosure, the electronic device 400 may detect the charged state of the external electronic device, and may suspend or initiate the charging operation based on whether the external electronic device is fully charged. According to an embodiment of the present disclosure, the electronic device 400 may detect whether the external electronic device leaves the wireless charging-enabled range while executing the charging operation with respect to the external electronic device, and may suspend the charging operation based on a result of the detection. According to an embodiment of the present disclosure, when the electronic device 400 detects a change to the first charging power with respect to the external electronic device while executing the charging operation using the second charging power, the electronic device 400 may execute a process to change the second charging power into the first charging power, and may execute the charging operation using the first charging power.

Figure 9:
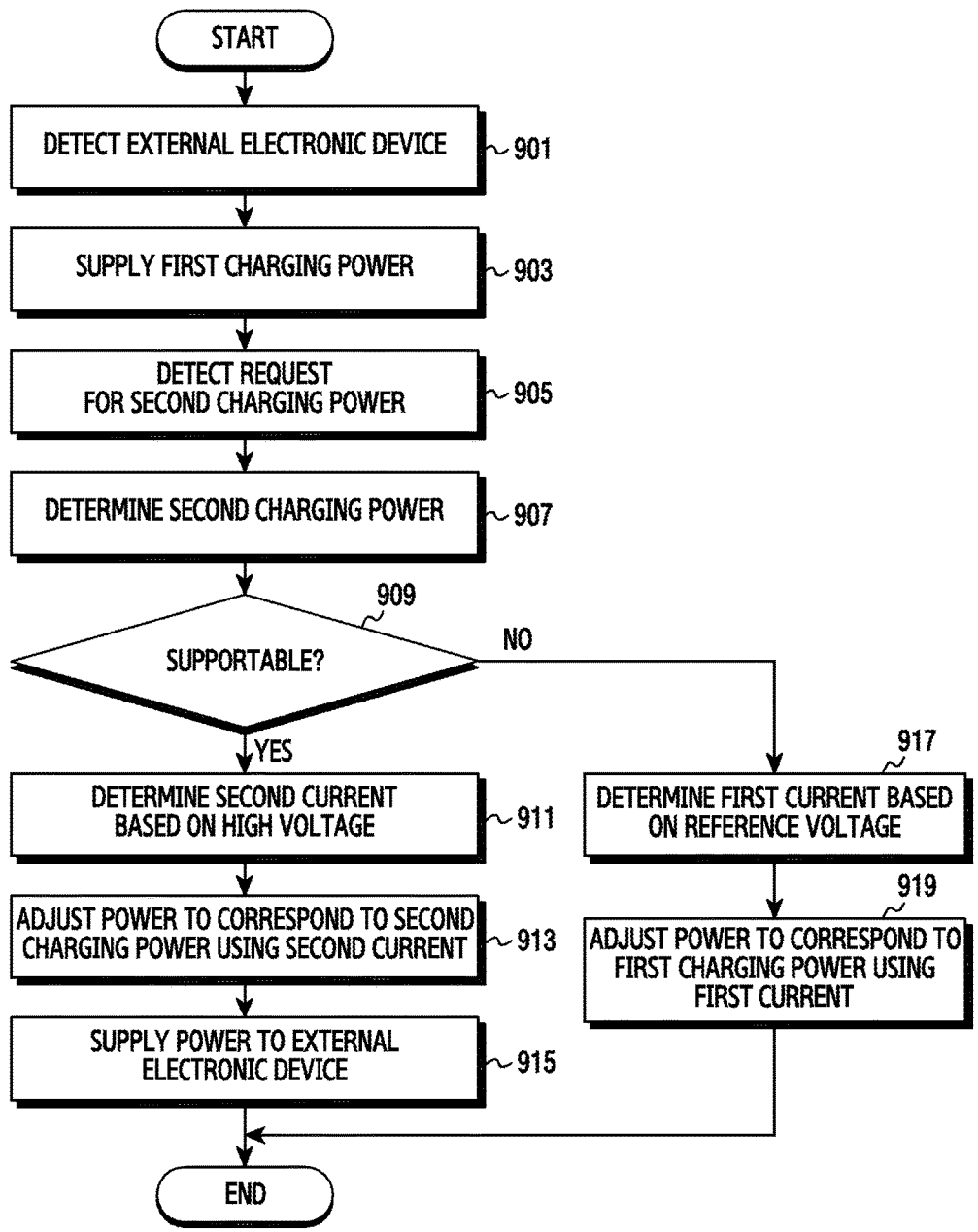
FIG. 9 is a flowchart illustrating an operation of wirelessly supplying power in an electronic device according to various embodiments of the present disclosure.

FIG. 9 is a flowchart illustrating an operation of supplying a wireless power in an electronic device according to various embodiments of the present disclosure.

Referring to FIG. 9, the electronic device 400 (e.g., the wireless power supply device 600) detects the proximity of an external electronic device (e.g., the wireless power reception device 800) in operation 901.

In operation 903, the electronic device 400 supplies a first charging power to the external electronic device based on a reference voltage supplied from the power supply device 500. For example, the electronic device 400 may supply the first charging power based on the reference voltage of the power supply device 500 to a reception coil of the external electronic device through a transmission coil 650 when the electronic device 400 initiates a wireless charging operation with respect to the external electronic device in response to the detection of the proximity of the external electronic device. According to an embodiment of the present disclosure, the electronic device 400 may be in a standby state based on the reference voltage (e.g., 5V) supplied from the power supply device 500 (e.g., a TA). The electronic device 400 may initiate a charging operation using the reference voltage when the electronic device 400, in the standby state, determines that the external electronic device is proximate. According to an embodiment of the present disclosure, when the external electronic device is proximate, the voltage or the current on the first coil 650 of the electronic device 400 may vary. The electronic device 400 may detect the proximity of the external electronic device by monitoring the change through the monitor 660.

In operation 905, the electronic device 400 may detect a request for the second charging power that is higher than the first charging power, from the external electronic device. For example, the electronic device 400 may determine the wireless power information received from the external electronic device, and may determine whether the second charging power is requested based on the wireless power information. According to an embodiment of the present disclosure, the controller 480 (e.g., the processor 620) may demodulate a signal (e.g., wireless power information) received from the external electronic device. The controller 480 may determine the contents of the request (e.g., a charging power) from the external electronic device, based on the demodulated signal. According to various embodiments of the present disclosure, when the external electronic device requests the first charging power, the controller 480 (e.g., the processor 620) may control the DC-AC converting circuit 640 and supply power corresponding to the first charging power requested by the external electronic device without changing the reference voltage to another voltage (e.g., a high voltage).

The electronic device 400 determines the second charging power requested by the external electronic device in operation 907, and may determine whether the second charging power is supportable in operation 909. For example, the electronic device 400 may determine whether the power supply device 500 supports the second charging power in response to the second charging power request from the external electronic device. According to various embodiments of the present disclosure, when the power supply device 500 supports a voltage for the second charging power which is higher than the reference voltage, the power supply device 500 may change the reference voltage to the high voltage and provide the same to the electronic device 400 based on the control of the electronic device 400. According to various embodiments of the present disclosure, when the power supply device 500 does not support the high voltage for the second charging power, the power supply device 500 may supply the reference voltage corresponding to the first charging power to the electronic device 400 based on the control of the electronic device 400. The electronic device 400 may determine whether the second charging power is supportable based on the voltage supplied from the power supply device 500.

When the electronic device 400 determines that the second charging power is included in the range of supportable power in operation 909 (i.e., YES in operation 909), the electronic device 400 may determine a second current based on the high voltage supplied from the power supply device 500 in operation 911. According to an embodiment of the present disclosure, when the external electronic device requests an output that is greater than or equal to the reference voltage, the electronic device 400 may transfer, to the power supply device 500 (e.g., a TA), a command to change the reference voltage to the high voltage. When the high voltage is supplied from the power supply device 500, the electronic device 400 may determine the current (e.g., the second current) for the second charging power based on the high voltage.

In operation 913, the electronic device 400 adjusts the power to correspond to the second charging power, using the determined second current. According to an embodiment of the present disclosure, the electronic device 400 may adjust the current to the second current, so as to correspond to the second charging power, and may adjust the power supplied to the external electronic device to correspond to the second charging power based on the second current.

In operation 915, the electronic device 400 may provide the adjusted power (for example, the second charging power) to the external electronic device through the charging module 475.

When the electronic device 400 determines that the second charging power is out of the range of supportable power in operation 909 (i.e., NO in operation 909), the electronic device 400 may determine a first current based on the reference voltage supplied from the power supply device 500 in operation 917. According to an embodiment of the present disclosure, when the electronic device 400 requests an output that is greater than or equal to the reference voltage from the external electronic device, but the power supply device 500 does not support the second charging power, the electronic device 400 may control the power supply device 500 to supply the reference voltage. When the reference voltage is supplied from the power supply device 500, the electronic device 400 may determine the current (e.g., the first current) for the first charging power based on the reference voltage.

In operation 919, the electronic device 400 adjusts the power to correspond to the first charging power, using the determined first current. According to an embodiment of the present disclosure, the electronic device 400 may adjust the current to the first current, so as to correspond to the first charging power, and may adjust the power supplied to the external electronic device to correspond to the first charging power based on the first current.

In operation 915, the electronic device 400 may supply the adjusted power (for example, the first charging power) to the external electronic device through the charging module 475.

According to various embodiments of the present disclosure, the electronic device 400 may process the charging operation based on the detection of various states of the electronic device, after operation 915 or 919. According to an embodiment of the present disclosure, the electronic device 400 may detect the charged state of the external electronic device, and may suspend or initiate the charging operation based on whether the external electronic device is fully charged. According to an embodiment of the present disclosure, the electronic device 400 may detect whether the external electronic device leaves the wireless charging-enabled range while executing the charging operation with respect to the external electronic device, and may suspend the charging operation based on a result of the detection. According to an embodiment of the present disclosure, when the electronic device 400 detects a change to the first charging power with respect to the external electronic device while executing the charging operation using the second charging power, the electronic device 400 may change the second charging power into the first charging power, and may execute the charging operation using the first charging power. According to various embodiments of the present disclosure, when the electronic device 400 detects a change to the second charging power with respect to the external electronic device while executing the charging operation using the first charging power, the electronic device 400 may change the first charging power into the second charging power, and may execute the charging operation using the second charging power.

According to various embodiments of the present disclosure, there is provided a method of providing wireless charging in an electronic device, the method including detecting an external electronic device; determining wireless power information corresponding to the external electronic device, determining whether the external electronic device supports a first charging power or a second charging power, at least partially based on the wireless power information, providing the first charging power to the external electronic device at least partially based on the determination that the external electronic device supports the first charging power, and providing the second charging power to the external electronic device at least partially based on the determination that the external electronic device supports the second charging power.

Figure 10:
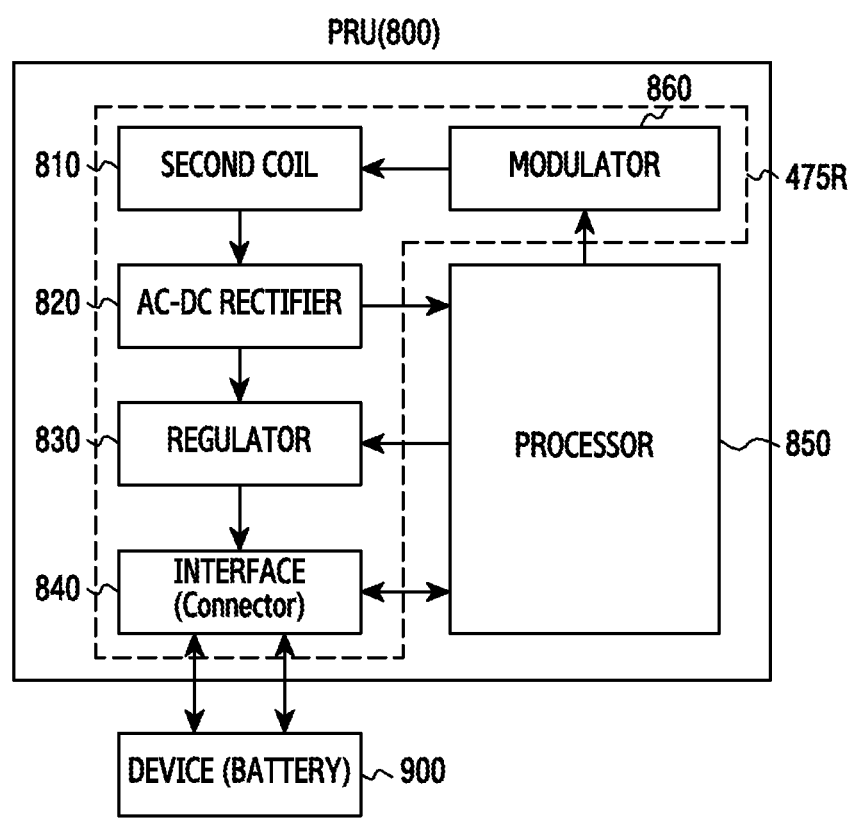
FIG. 10 is a diagram schematically illustrating a configuration of an electronic device that wirelessly receives power in a wireless charging system according to various embodiments of the present disclosure.

FIG. 10 is a diagram schematically illustrating a configuration of a wireless power reception device in a wireless charging system according to various embodiments of the present disclosure.

FIG. 10 illustrates the configuration and operations of a wireless power reception device when the electronic device 400 serves as the wireless power reception device 800 (e.g., the wireless power reception circuit 475R of the charging module 475) that receives power, or when a separate wireless power reception device is used. For example, FIG. 10 illustrates an example of various devices that supply (charge) a device 900 (e.g., a battery) with power supplied from a wireless power supply device.

Referring to FIG. 10, the wireless power reception device (PRU) 800 may include a processor 850 and the wireless power reception circuit 475R. According to various embodiments of the present disclosure, the wireless power reception circuit 475R may be configured to include a second coil 810, an AC-DC converting circuit (e.g., AC-DC rectifier) 820, a regulator 830, an interface 840, a modulator 860, the device 900, and the like.

According to various embodiments of the present disclosure, the processor 850 may control each part of the wireless power reception device 800, and determine the state of the device 900. According to various embodiments of the present disclosure, the processor 850 may be of a type that is identical to or different from the controller 480 of the electronic device 400. According to various embodiments of the present disclosure, the processor 850 may determine a feedback (request) with respect to power supplied to the wireless power reception device 800. According to an embodiment of the present disclosure, the processor 850 may be functionally connected with the wireless power reception circuit 475R, and may detect an external electronic device (e.g., the wireless power supply device 600) based on the wireless power reception circuit 475R. The processor 850 may determine the power supplied from the external electronic device, and may determine a charging power supplied to the wireless power reception device 800 based on the power.

According to various embodiments of the present disclosure, the processor 850 may determine whether the wireless power reception device 800 supports a first charging power or a second charging power which is higher than the first charging power. According to various embodiments of the present disclosure, the processor 850 may control the transmission of information (e.g., wireless power information) for receiving the determined power from the external electronic device (e.g., the wireless power supply device 600) based on the determined charging power (e.g., the first charging power or the second charging power). According to an embodiment of the present disclosure, when the wireless power reception device 800 supports the first charging power, the processor 850 may execute a control to request the external electronic device to supply power corresponding to the first charging power (to transmit wireless power information). According to an embodiment of the present disclosure, when the wireless power reception device 800 supports the second charging power, the processor 850 may execute a control to request the external electronic device to supply power corresponding to the second charging power (to transmit wireless power information).

According to various embodiments of the present disclosure, the second coil 810 indicates a reception coil, and is in charge of receiving power from the first coil 650 of the wireless power supply device 600.

According to various embodiments of the present disclosure, the AC-DC converting circuit 820 may rectify the AC power on the second coil 810 into DC power. For example, the AC-DC converting circuit 820 may indicate an electric circuit device or apparatus for obtaining DC power from AC power, and may have a function of passing the current in only one direction.

According to various embodiments of the present disclosure, the regulator 830 may serve as a switch in various embodiments, and may change or switch a DC voltage to be appropriate for a voltage requested by the device 900 (e.g., a battery or the like). For example, the regulator 830 may include a function (e.g., a PMIC) of generating a voltage used by the device 900. According to an embodiment of the present disclosure, the device 900 may require only a voltage, for example, a voltage in a range of 2.8 V to 4.2 V, which is set in the device 900. Therefore, the regulator 830 may output the determined voltage (e.g., 2.8 V to 4.2 V) through switching, despite what voltage (e.g., 5V) is supplied.

According to various embodiments of the present disclosure, the interface 840 may be a connection part that is connected to device 900, or may include a power line and a data line. According to various embodiments of the present disclosure, the interface 840 may be connected with the device 900, and may transfer, to the device 900, the power supplied through the regulator 830.

According to various embodiments of the present disclosure, the modulator 860 may generate a signal for transferring, to the second coil 810, the state of the device 900 which is obtained through the processor 850, or the like. For example, the modulator 860 is a device that receives an electrical pulse signal or bit generated from the processor 850, and converts the signal or bit into an electric signal. According to an embodiment of the present disclosure, the modulator 860 is a device for converting, into an analog signal, a digital signal that is processed in the wireless power reception device 800. According to various embodiments of the present disclosure, the wireless power reception device 800 transmits information associated with power (e.g., wireless power information) to the external electronic device, based on the information generated from the modulator 860.

According to various embodiments of the present disclosure, the device 900 may receive power through the wireless power reception device 800 and execute charging, and may feedback various states (e.g., a charged state or the like) corresponding thereto.

According to various embodiments of the present disclosure, the wireless power reception device 800 or the wireless power reception circuit 475R may include a wireless communication module (for example, BLE, ZigBee, NFC, antenna, or the like) for exchanging wireless power information with the external electronic device (for example, wireless power supply device 600) or detecting the proximity of the external electronic device.

As described above, there is provided an electronic device according to various embodiments of the present disclosure, the electronic device including a wireless power circuit, and one or more processors which are functionally connected with the wireless power circuit, wherein the one or more processors are configured to execute: determining a supportable charging power, requesting the charging power from an external electronic device, determining whether the external electronic device supports the charging power, when the external electronic device supports the charging power, receiving the charging power from the external electronic device, and executing charging, and when the external electronic device does not support the charging power, receiving another charging power and executing charging based on the other charging power.

As described above, there is provided an electronic device according to various embodiments of the present disclosure, the electronic device including a wireless power circuit, and one or more processors which are functionally connected with the wireless power circuit, wherein the one or more processors are configured to execute: detecting provision of a supply voltage from the external electronic device, determining whether the supply voltage provided from the external electronic device is within a designated range, executing charging based on the supply voltage when the supply voltage is within the designated range, and executing charging based on another voltage provided from the external electronic device when the supply voltage is out of the designated range.

Figure 11:
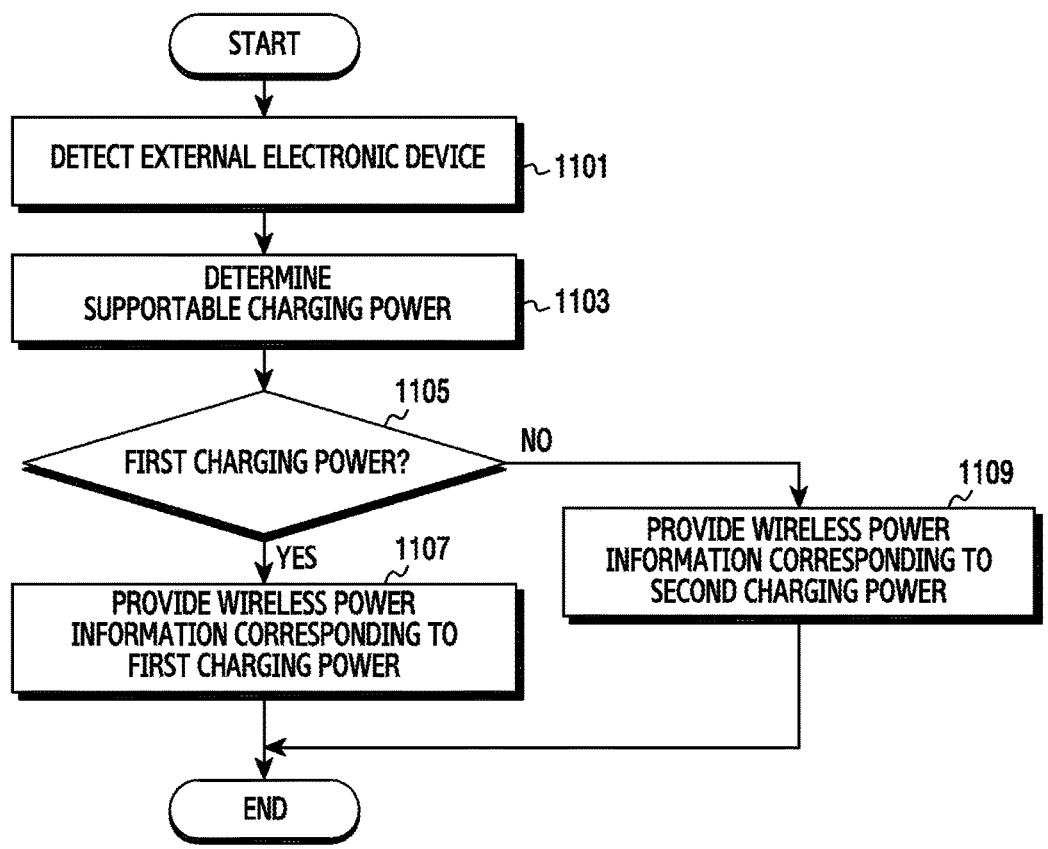
FIG. 11 is a flowchart illustrating an operation for wireless charging in an electronic device according to various embodiments of the present disclosure.

FIG. 11 is a flowchart illustrating an operation for wireless charging in an electronic device according to various embodiments of the present disclosure.

Referring to FIG. 11, an example is provided in which the electronic device 400 is the wireless power reception device 800, or the electronic device 400 serves as the wireless power reception device 800 and supports wireless charging.

Referring to FIG. 11, the electronic device 400 (e.g., the wireless power reception device 800) detects the proximity of an external electronic device (e.g., the wireless power supply device 600) in operation 1101. For example, the electronic device 400 may detect an external electronic device that enters a wireless charging-enabled range, through the short-range communication module 415 or the charging module 475 (e.g., the wireless power reception circuit 475R) for detecting the external electronic device.

In operation 1103, the electronic device 400 determines a supportable charging power (e.g., a first charging power or a second charging power).

In operation 1105, the electronic device 400 determines, based on a result of the determination, whether the first charging power is supported or the second charging power that is higher than the first charging power for fast wireless charging is supported.

When the electronic device 400 determines that the first charging power is supported in operation 1105 (i.e., YES in operation 1105), the electronic device 400 provides wireless power information corresponding to the first charging power to the external electronic device in operation 1107.

When the electronic device 400 determines that the second charging power is supported in operation 1105 (i.e., NO in operation 1105), the electronic device 400 provides wireless power information corresponding to the second charging power to the external electronic device in operation 1109.

According to various embodiments of the present disclosure, the electronic device 400 may provide the wireless power information corresponding to the first charging power or the second charging power to the external electronic device, and may initiate a charging operation based on the charging power supplied accordingly (e.g., the first charging power or the second charging power). According to various embodiments of the present disclosure, the electronic device 400 may determine a charged state while executing the charging operation based on the first charging power or the second charging power, and may process the charging operation based on a result of the determination. According to an embodiment of the present disclosure, the electronic device 400 may repeatedly suspend or initiate the charging operation based on whether charging is fully executed. According to an embodiment of the present disclosure, the electronic device 400 may suspend the charging operation when the battery is fully charged and may resume the charging operation when detecting that the charged state of the battery is less than or equal to a predetermined level (e.g., under 95% of the capacity of the battery). According to an embodiment of the present disclosure, the electronic device 400 may transmit, to the external electronic device, the charged state information for resuming the charging operation, and in response thereto, the external electronic device may initiate the charging operation based on the first charging power or the second charging power. According to an embodiment of the present disclosure, the electronic device 400 may operate to maintain a fully charged state based on the charging power supplied from the external electronic device when it reaches a predetermined standard set for maintaining the fully charged state within the wireless charging-enabled range of the external electronic device.

Figure 12:
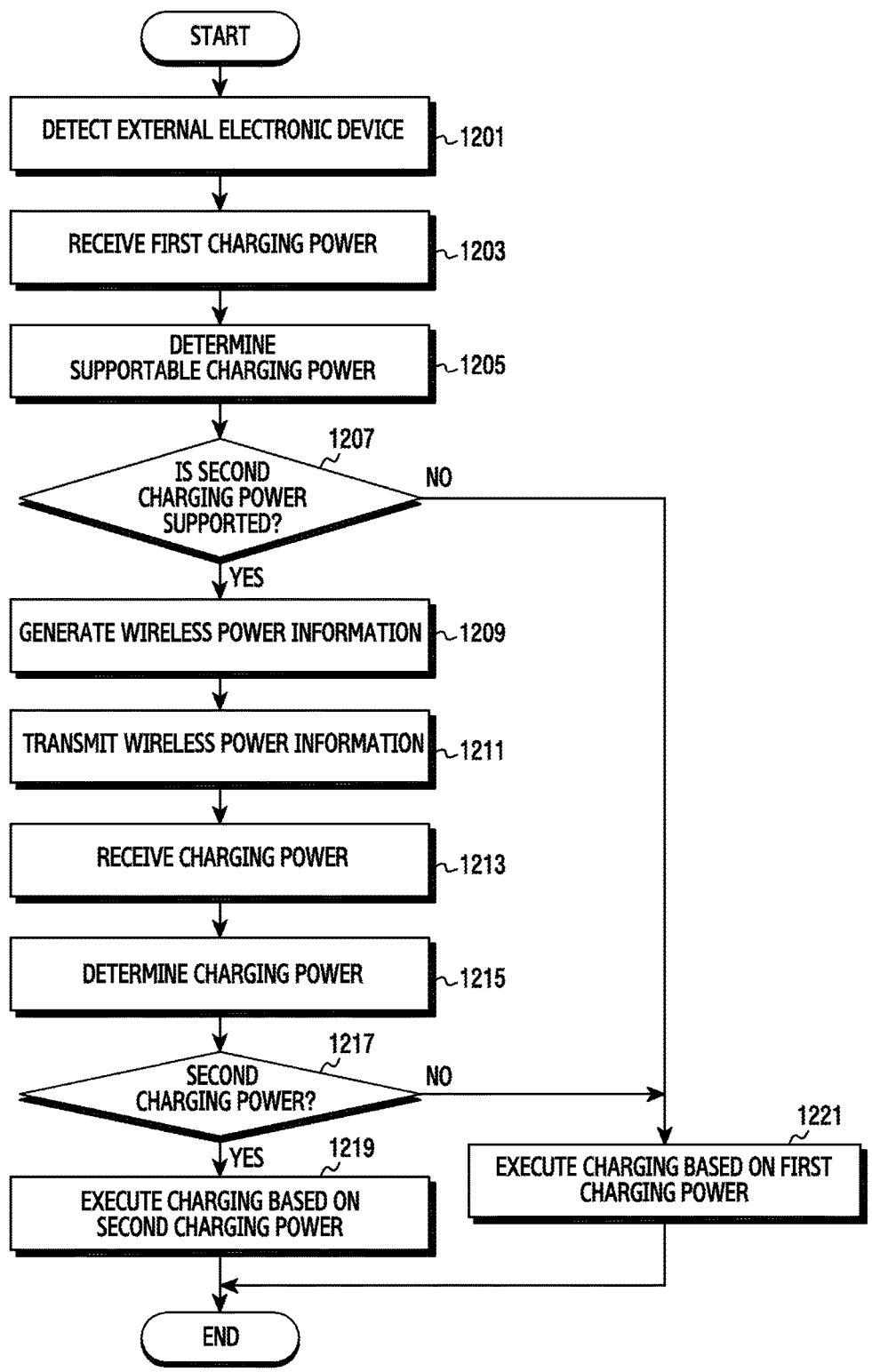
FIG. 12 is a flowchart illustrating an operation of executing wireless charging in an electronic device according to various embodiments of the present disclosure.

FIG. 12 is a flowchart illustrating an operation of executing wireless charging in an electronic device according to various embodiments of the present disclosure.

Referring to FIG. 12, the electronic device 400 (e.g., the wireless power reception device 800) detects the proximity of an external electronic device (e.g., the wireless power supply device 600) in operation 1201.

In operation 1203, the electronic device 400 receives a first charging power supplied from the external electronic device. According to an embodiment of the present disclosure, the electronic device may supply the first charging power to the electronic device 400 based on a reference voltage supplied from the power supply device 500.

The electronic device 400 determines a charging power that the electronic device 400 may support in operation 1205, and determines whether the electronic device 400 supports a second charging power in operation 1207. For example, when a charging operation is initiated, the electronic device 400 may determine whether the electronic device 400 or the device 900 connected with the electronic device 400 supports the second charging power (e.g., fast wireless charging power) that is higher than the first charging power, for fast wireless charging. According to an embodiment of the present disclosure, the electronic device 400 may execute the determination based on a fast wireless charging power set in advance in the internal device 900 (e.g., a battery). According to an embodiment of the present disclosure, when the electronic device 400 serves as an intermediary that supports charging the connected device 900 existing in the outside, the electronic device 400 may request a fast wireless charging power from the device 900, and may execute the determination based on a corresponding response.

When the electronic device 400 determines that the second charging power is not supported in operation 1207 (i.e., NO in operation 1207), the electronic device 400 executes the charging operation based on the first charging power in operation 1221.

When the electronic device 400 determines that the second charging power is supported in operation 1207 (i.e., YES in operation 1207), the electronic device 400 generates wireless power information in operation 1209. For example, the electronic device 400 generates the wireless power information including the second charging power for requesting the second charging power that is higher than the first charging power, based on a result of the determination.

In operation 1211, the electronic device 400 transmits wireless power information to the external electronic device. For example, the electronic device 400 modulates a voltage change request signal corresponding to the second charging power, and may transmit the modulated signal to the external electronic device. According to an embodiment of the present disclosure, the electronic device 400 may adjust the modulator 860 through the controller 480 (e.g., the processor 850), may generate a voltage change signal that requests changing a voltage corresponding to a higher voltage that is higher than the reference voltage from the reference voltage, and may transfer the voltage change signal to the external electronic device through the second coil 810.

In operation 1213, the electronic device 400 receives a charging power supplied from the external electronic device in response to the request.

The electronic device 400 determines a charging power received from the external electronic device in operation 1215, and determines whether the received charging power corresponds to the requested second charging power in operation 1217.

When the electronic device 400 determines that the charging power supplied from the external electronic device corresponds to the second charging power in operation 1217 (i.e., YES in operation 1217), the electronic device 400 executes the charging operation based on the second charging power supplied from the external electronic device in operation 1219.

When the electronic device 400 determines that the charging power supplied from the external electronic device does not correspond to the second charging power in operation 1217 (i.e., NO in operation 1217), the electronic device 400 executes the charging operation based on the first charging power in operation 1221. According to an embodiment of the present disclosure, the electronic device 400 may request the external electronic device to request supplying power based on the first charging power corresponding to the reference voltage. According to an embodiment of the present disclosure, the electronic device 400 may adjust the modulator 860 through the controller 480 (e.g., the processor 850), may generate a state change signal that requests changing the previously requested voltage to the reference voltage again, and may transfer the state change signal to the external electronic device through the second coil 810. The electronic device 400 receives the first charging power corresponding to the reference voltage from the external electronic device, and executes the charging operation.

According to various embodiments of the present disclosure, the electronic device 400 may request the first charging power corresponding to the reference voltage again when the second charging power or another charging power is not provided within a predetermined period time after requesting the second charging power from the external electronic device. According to various embodiments of the present disclosure, when the electronic device 400 transmits, to the external electronic device, wireless power information associated with a request for changing a voltage, for example, a request for a high voltage that is greater than or equal to the reference voltage, the electronic device 400 may successively transmit a control error packet which has been used in the standard (e.g., WPC) for reporting the information, or newly define a packet corresponding to the control error packet for use.

According to various embodiments of the present disclosure, the electronic device 400 determines a charged state after operation 1219 or operation 1221, and processes the charging operation based on a result of the determination. According to an embodiment of the present disclosure, the electronic device 400 may repeatedly suspend or initiate the charging operation based on whether charging is fully executed. According to an embodiment of the present disclosure, the electronic device 400 may suspend the charging operation when the battery is fully charged and may resume the charging operation when detecting that the charged state of the battery is less than or equal to a predetermined level (e.g., under 95% of the capacity of the battery). According to an embodiment of the present disclosure, the electronic device 400 may transmit, to the external electronic device, the charged state information for resuming the charging operation, and in response thereto, the external electronic device may initiate the charging operation based on the first charging power or the second charging power. According to an embodiment of the present disclosure, the electronic device 400 may operate to maintain a fully charged state based on the charging power supplied from the external electronic device when it reaches a predetermined standard set for maintaining the fully charged state within the wireless charging-enabled range of the external electronic device.

Figure 13:
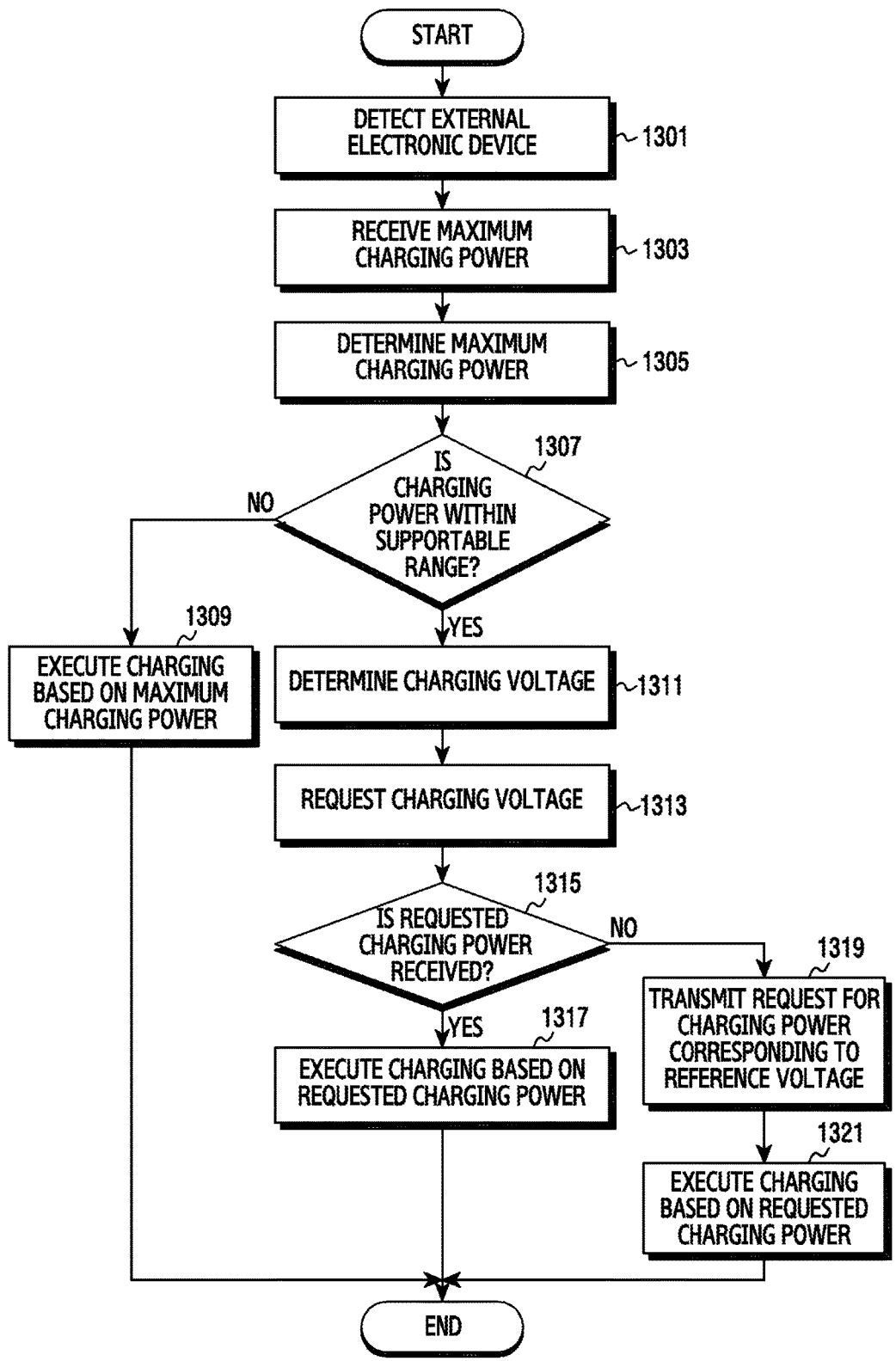
FIG. 13 is a flowchart illustrating another operation that supports wireless charging in an electronic device according to various embodiments of the present disclosure.

FIG. 13 is a flowchart illustrating another operation that supports wireless charging in an electronic device according to various embodiments of the present disclosure.

Referring to FIG. 13, the electronic device 400 (e.g., the wireless power reception device 800) detects an external electronic device (e.g., the wireless power supply device 600) in operation 1301, and receives the maximum charging power (e.g., a supply voltage) supplied from the wireless power supply device 600 in operation 1303. According to various embodiments of the present disclosure, the supply power may indicate the maximum voltage that the external electronic device may support. According to an embodiment of the present disclosure, the external electronic device may supply a charging power from the maximum supportable voltage when wireless charging is initiated, and provides a charging power by gradually reducing the voltage from the maximum voltage to a requested voltage based on a requested charging power (voltage) of the electronic device (e.g., the wireless power reception device 800).

The electronic device 400 determines the maximum charging power when the maximum charging power (e.g., a supply voltage) is provided in operation 1305, and determines whether the maximum charging power is a charging power within a supportable range in operation 1307. For example, the electronic device 400 may determine whether the voltage corresponding to the maximum charging power is a voltage included in a range set in the electronic device 400, based on a result of the determination of the maximum charging power.

When the electronic device 400 determines that the maximum charging power is included in the supportable range in operation 1307 (i.e., YES in operation 1307), the electronic device 400 executes a charging operation based on the maximum charging power in operation 1309.

When the electronic device 400 determines that the maximum charging power is out of the supportable range in operation 1307 (i.e., NO in operation 1307), the electronic device 400 determines a charging power in operation 1311. For example, the electronic device 400 may determine the maximum chargeable voltage, and may determine a charging power (e.g., a charging voltage) corresponding to the maximum voltage. Alternatively, the electronic device 400 may determine a charging power sequentially from the maximum chargeable voltage to the smallest voltage, and may determine an optimal charging power by determining whether a charging voltage drops in the charging power.

In operation 1313, the electronic device 400 transmits, to the external electronic device, a request for supplying the charging power (a charging power change request) based on a result of the determination. For example, the electronic device 400 may modulate a voltage change request signal corresponding to the determined charging power, and may transfer the modulated signal to the external electronic device. According to various embodiments of the present disclosure, the external electronic device changes the supply voltage to the charging voltage in response to the voltage change request signal, and supplies the corresponding charging power to the electronic device 400.

In operation 1315, the electronic device 400 determines whether the requested charging power is provided (e.g., whether the requested voltage is provided) from the external electronic device.

When the requested charging power is provided from the external electronic device in operation 1315 (i.e., YES in operation 1315), the electronic device 400 receives the charging power supplied from the external electronic device and executes charging based on the corresponding charging voltage in operation 1317.

When the requested charging power is not provided from the external electronic device in operation 1315 (i.e., NO in operation 1315), the electronic device 400 may request the external electronic device to supply a charging power corresponding to the reference voltage in operation 1319. For example, the electronic device 400 may request the reference voltage again from the external electronic device when the requested charging voltage is not provided within a predetermined period of time. According to an embodiment of the present disclosure, the electronic device 400 may adjust the modulator 860 through the controller 480 (e.g., the processor 850), may generate a state change signal that requests changing the previously requested voltage to the reference voltage again, and may transfer the state change signal to the external electronic device through the second coil 810.

In operation 1321, the electronic device 400 receives the charging power corresponding to the reference voltage supplied from the external electronic device, and executes the charging operation.

According to various embodiments of the present disclosure, the electronic device 400 determines a charged state after operation 1309, operation 1317, or operation 1321, and processes the charging operation based on a result of the determination. According to an embodiment of the present disclosure, the electronic device 400 may repeatedly suspend or initiate the charging operation based on whether charging is fully executed. According to an embodiment of the present disclosure, the electronic device 400 may suspend the charging operation when the battery is fully charged and may resume the charging operation when detecting that the charged state of the battery is less than or equal to a predetermined level (e.g., under 95% of the capacity of the battery). According to an embodiment of the present disclosure, the electronic device 400 may operate to maintain a fully charged state based on the charging power supplied from the external electronic device when it reaches a predetermined standard set for maintaining the fully charged state within the wireless charging-enabled range of the external electronic device.

Figure 14:
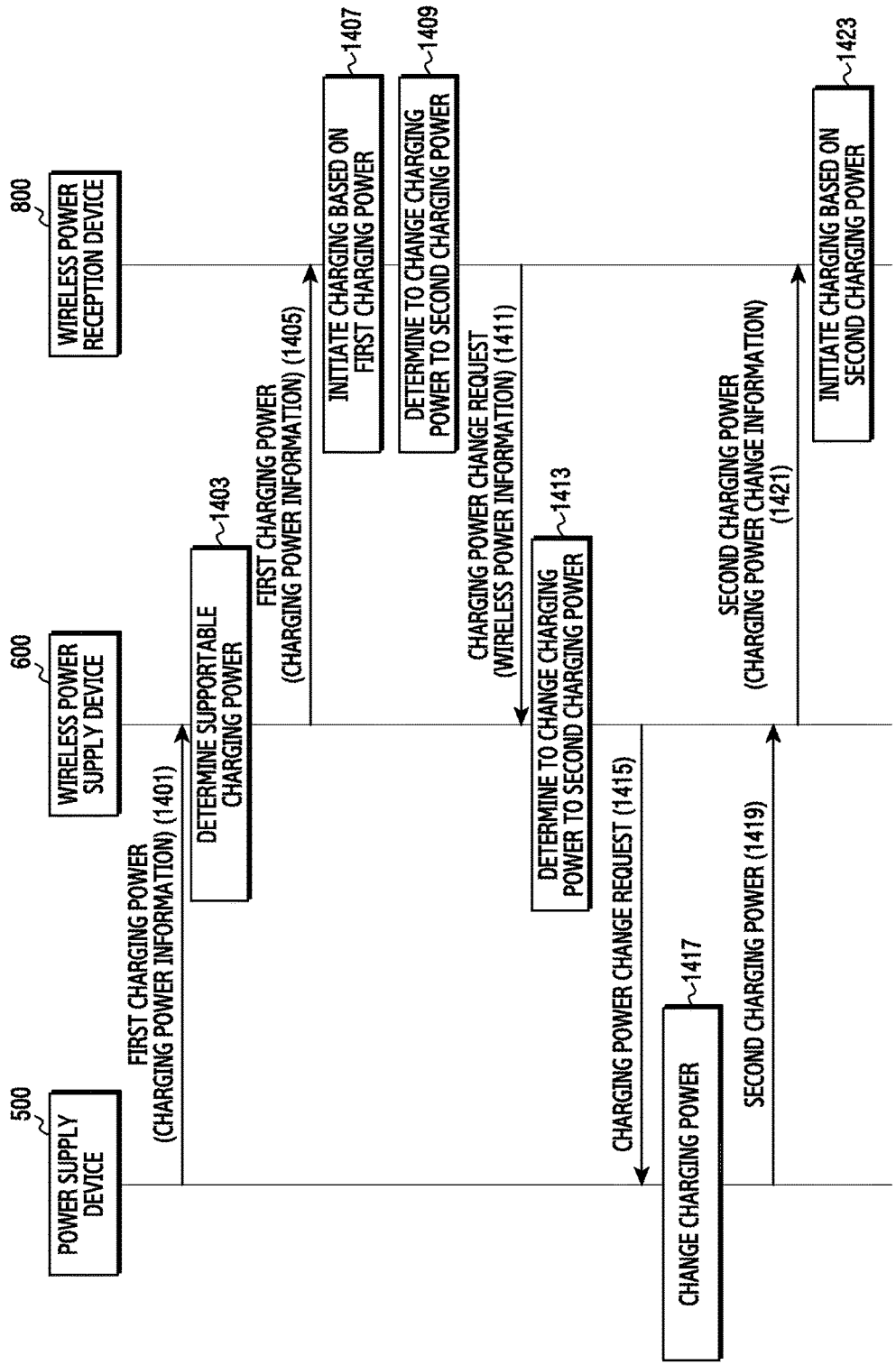
FIGS. 14 and 15 are diagrams illustrating a charging operation in a wireless charging system according to various embodiments of the present disclosure.

FIG. 14 is a diagram illustrating a charging operation in a wireless charging system according to various embodiments of the present disclosure.

As described in the descriptions with reference to FIG. 5, a wireless charging system according to various embodiments of the present disclosure may include the power supply device 500 (e.g., a TA or a power supply), the wireless power supply device (PTU) 600 that supplies a wireless power (a power supply), and the wireless power reception device 800 that receives a wireless power (a power supply) and executes charging.

Referring to FIG. 14, the power supply device 500 may provide the connected wireless power supply device 600 with a first charging power (e.g., a reference voltage, 5V, or the like) in operation 1401. According to various embodiments of the present disclosure, the power supply device 500 may be connected to the wireless power supply device 600 through a set interface (e.g., a wired interface). When the power supply device 500 is initially connected with the wireless power supply device 600, the power supply device 500 may provide the wireless power supply device 600 with charging power information together with the first charging power. According to an embodiment of the present disclosure, the power supply device 500 may transmit a signal (for example, signals of D+ line and D− line) having a value (for example, a voltage value) designated based on whether a fast charging mode or a normal charging mode is supported.

In operation 1403, when the wireless power supply device 600 receives the first charging power and the charging power information from the connected power supply device 500, the wireless power supply device 600 determines a charging power supported by the power supply device 500. According to an embodiment of the present disclosure, the wireless power supply device 600 may determine whether the power supply device 500 that is connected with the wireless power supply device 600 is a power supply device that supports fast charging or a power supply device that does not support fast charging, based on a signal received from the power supply device 500.

In operation 1405, the wireless power supply device 600 provides the first charging power to the wireless power reception device 800. When the wireless power supply device 600 detects the proximity of the wireless power reception device 800, the wireless power supply device 600 may provide the first charging power received from the power supply device 500 to the wireless power reception device 800. According to various embodiments of the present disclosure, when a DC power supply is provided from the power supply device 500, the wireless power supply device 600 converts the DC power supply into AC power and transmits power through a transmission coil.

According to various embodiments of the present disclosure, the wireless power supply device 600 may include a part (for example, the wireless power transmission circuit 475T of the charging module 475) or the whole of the electronic device 400 of FIG. 4. According to various embodiments of the present disclosure, the wireless power supply device 600 provides the charging power information together with the first charging power to the wireless power reception device 800. According to an embodiment of the present disclosure, the wireless power supply device 600 may control the power supply device 500 to supply the first voltage (e.g., a reference voltage of 5V). According to an embodiment of the present disclosure, the wireless power supply device 600 may transfer the charging power information that reports a charging power supported by the power supply device 500. According to various embodiments of the present disclosure, the wireless power supply device 600 and the wireless power reception device 800 may execute communication for the transmission/reception of the information through each coil (for example, a transmission coil or a reception coil). Alternatively, the wireless power supply device 600 and the wireless power reception device 800 may execute communication for the transmission/reception of the information through short-range communication (for example, BLE, ZigBee, NFC, and the like).

In operation 1407, the wireless power reception device 800 may initiate charging based on the first charging power provided from the wireless power supply device 600. According to various embodiments of the present disclosure, the wireless power reception device 800 may receive, through a reception coil, AC power transmitted from a transmission coil of the wireless power supply device 600, and may convert the AC power into DC power, and generate (rectify) power as a DC power supply of a predetermined size. According to various embodiments of the present disclosure, the wireless power reception device 800 may include a part (for example, the wireless power reception circuit 475R of the charging module 475) or the whole of the electronic device 400 of FIG. 4. The wireless power reception device 800 may charge an internal device (for example, a battery) or an external device (for example, another electronic device) based on the generated (rectified) DC power supply.

In operation 1409, the wireless power reception device 800 determines whether to change the charging power into a second charging power. According to various embodiments of the present disclosure, the wireless power reception device 800 may determine whether fast charging by the power supply device 500 is possible based on the charging power information. When it is determined that fast charging is possible based on the charging power information, the wireless power reception device 800 may determine to change the charging power. According to an embodiment of the present disclosure, the wireless power reception device 800 initiates charging using the first charging power (e.g., charging using the reference voltage (e.g., 5V)) at the initial stage, and determines to change the charging power into the second charging power when it is determined that fast charging is possible (e.g., to change the reference voltage to a voltage (e.g., 10V) that is higher than the reference voltage).

In operation 1411, the wireless power reception device 800 requests the wireless power supply device 600 to change the charging power in response to the determination to change the charging power. According to various embodiments of the present disclosure, the wireless power reception device 800 may provide wireless power information to the wireless power supply device 600. According to various embodiments of the present disclosure, the wireless power reception device 800 may request, from the wireless power supply device 600, the second charging power which is greater than the first charging power used for normal charging, through the communication with the wireless power supply device 600. According to an embodiment of the present disclosure, the wireless power reception device 800 may change a charging setting from charging using the reference voltage (e.g., 5V) to charging using a voltage (e.g., 10V) that is higher than the reference voltage, based on the charging power information of the power supply device 500, and may transfer the information (e.g., a set value which indicates wireless power information) associated with a corresponding charging power (e.g., at least a part of charging voltage and charging current) through the communication with the wireless power supply device 600. According to various embodiments of the present disclosure, the wireless power supply device 600 and the wireless power reception device 800 may execute communication for the transmission/reception of the information through each coil (for example, a transmission coil or a reception coil). Alternatively, the wireless power supply device 600 and the wireless power reception device 800 may execute communication for the transmission/reception of the information through short-range communication (for example, BLE, ZigBee, NFC, and the like).

In operation 1413, the wireless power supply device 600 determines to change the charging power to the second charging power in response to the charging power change request from the wireless power reception device 800.

According to an embodiment of the present disclosure, the wireless power supply device 600 may determine that the wireless power reception device 800 is set to the state for fast charging, based on the wireless power information received from the wireless power reception device 800, and may determine a charging power supply request for fast charging (e.g., a request for the second charging power which is greater than the first charging power) based on a result of the determination.

In operation 1415, the wireless power supply device 600 requests the power supply device 500 to change the charging power in response to the determination to change to the second charging power. According to various embodiments of the present disclosure, the wireless power supply device 600 may request, from the power supply device 500, an output voltage that is higher than normal charging with respect to the wireless power reception device 800. According to an embodiment of the present disclosure, the wireless power supply device 600 may execute a control to set a charging mode of the power supply device 500 to a fast charging mode.

In operation 1417, the power supply device 500 may change the charging power. According to various embodiments of the present disclosure, the power supply device 500 may change the currently supplied first charging power to the second charging power which is greater than the first charging power. According to an embodiment of the present disclosure, the power supply device 500 may change a charging power (e.g., the first charging power) based on the reference voltage (e.g., 5V) to a charging power (e.g., the second charging power) based on a voltage (e.g., 10V) that is higher than the reference voltage.

In operation 1419, the power supply device 500 provides the wireless power supply device 600 with the second charging power.

In operation 1421, the wireless power supply device 600 provides the second charging power supplied from the power supply device 500 to the wireless power reception device 800. According to various embodiments of the present disclosure, the wireless power supply device 600 receives a voltage (e.g., 10V) that is higher than normal charging from the power supply device 500, and in response thereto, provides a charging power (e.g., the second charging power) for charging the wireless power reception device 800.

In operation 1423, the wireless power reception device 800 may initiate charging based on the second charging power provided from the wireless power supply device 600.

Figure 15:
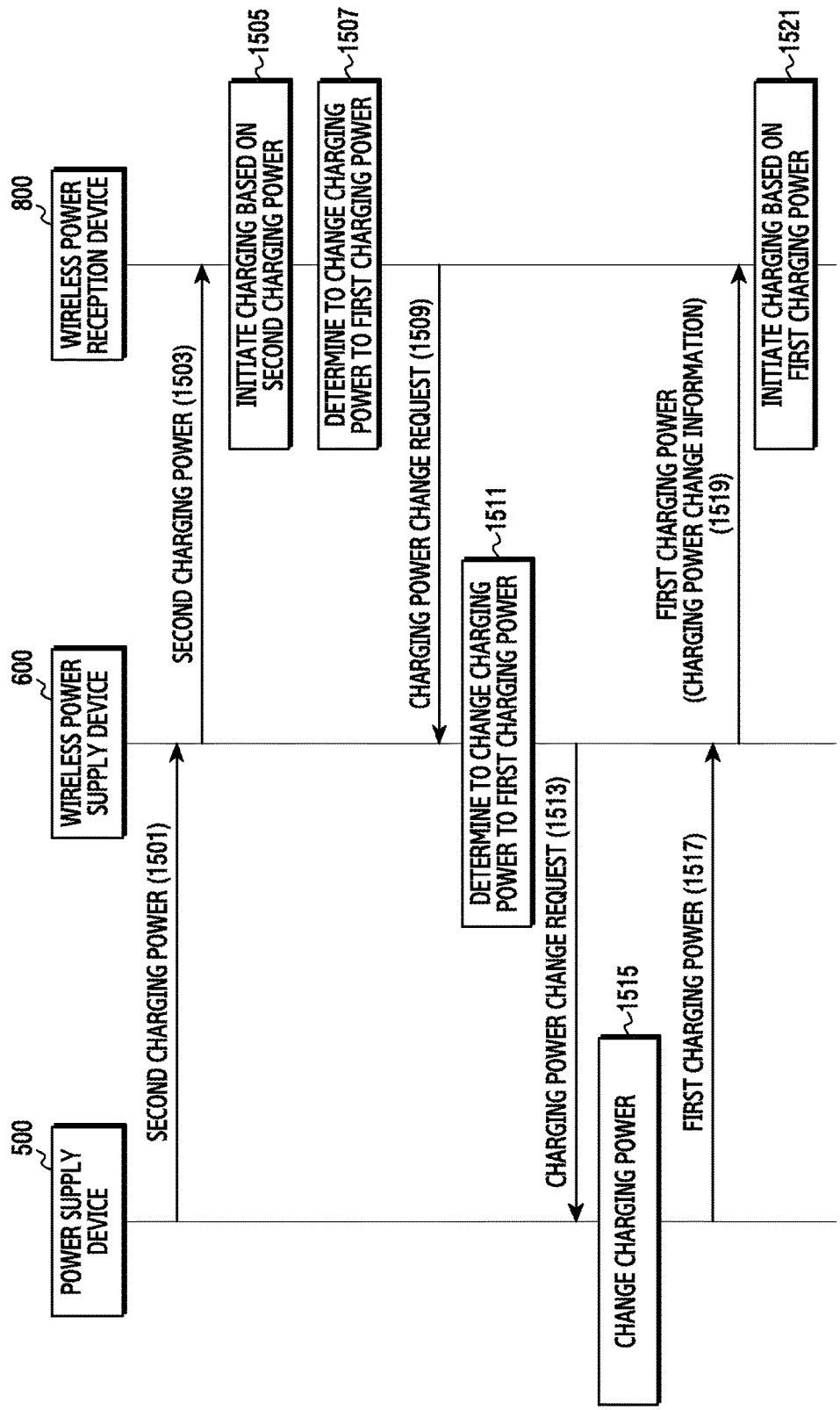

FIG. 15 is a diagram illustrating a charging operation in a wireless charging system according to various embodiments of the present disclosure.

Referring to FIG. 15, the power supply device 500 transfers the second charging power to the wireless power supply device 600 in operation 1501.

According to various embodiments of the present disclosure, FIG. 15 is a diagram illustrating an example in which a second charging power is changed into a first charging power by the wireless power reception device 800 while the power supply device 500, the wireless power supply device 600, and the wireless power reception device 800 execute a charging procedure based on the second charging power, as described in the descriptions with reference to FIG. 14.

In operation 1503, the wireless power supply device 600 transmits, to the wireless power reception device 800, the second charging power supplied from the power supply device 500.

In operation 1505, the wireless power reception device 800 may initiate charging based on the second charging power provided from the wireless power supply device 600.

In operation 1507, the wireless power reception device 800 determines whether to change the charging power into the first charging power. According to various embodiments of the present disclosure, the wireless power reception device 800 may check a charged state, and may determine to execute charging based on the first charging power which is smaller than the second charging power when the wireless power reception device 800 detects that it is charged more than a predetermined level (e.g., approximately 90% of the capacity of the battery). Alternatively, the wireless power reception device 800 may determine to execute charging using the first charging power that is smaller than the second charging power when the wireless power reception device 800 detects a user input (e.g., a motion, a touch gesture, a voice command or the like, which is an input set for changing a charging power). Alternatively, the wireless power reception device 800 may determine to execute charging based on the first charging power that is smaller than the second charging power when the wireless power reception device 800 checks a heat radiating state of the device or the battery, and senses a temperature that is greater than or equal to a predetermined degree. According to various embodiments of the present disclosure, changing of the charging power to the first charging power that is smaller than the second charging power while fast charging is executed based on the second charging power may not be limited thereto, and may be executed based on various other conditions.

In operation 1509, the wireless power reception device 800 requests the wireless power supply device 600 to change the charging power in response to the determination to change the charging power. According to various embodiments of the present disclosure, the wireless power reception device 800 may provide wireless power information to the wireless power supply device 600. According to various embodiments of the present disclosure, the wireless power reception device 800 may request, from the wireless power supply device 600, the first charging power which is smaller than the second charging power used for fast charging, through the communication with the wireless power supply device 600. According to an embodiment of the present disclosure, the wireless power reception device 800 may change a charging setting from charging using a second voltage (e.g., 10V) to charging using a first voltage (e.g., reference voltage of 5V) that is smaller than the second voltage, based on the determination to change a charging power, and may transfer the information (e.g., a set value which is wireless power information) associated with a corresponding charging power (e.g., at least a part of charging voltage and charging current) through the communication with the wireless power supply device 600. According to various embodiments of the present disclosure, the wireless power supply device 600 and the wireless power reception device 800 may execute communication for the transmission/reception of the information through each coil (for example, a transmission coil or a reception coil), or through short-range communication (e.g., BLE, Zigbee, NFC, or the like).

In operation 1511, the wireless power supply device 600 determines to change the charging power to the first charging power in response to the charging power change request from the wireless power reception device 800. According to an embodiment of the present disclosure, the wireless power supply device 600 may determine that the wireless power reception device 800 is set to the state for normal charging, based on the wireless power information received from the wireless power reception device 800, and may determine a charging power supply request for normal charging (e.g., a request for the first charging power which is smaller than the second charging power) based on a result of the determination.

In operation 1513, the wireless power supply device 600 requests the power supply device 500 to change the charging power in response to the determination to change to the first charging power. According to various embodiments of the present disclosure, the wireless power supply device 600 may request, from the power supply device 500, an output voltage that is smaller than fast charging with respect to the wireless power reception device 800. According to an embodiment of the present disclosure, the wireless power supply device 600 may execute a control to set a charging mode of the power supply device 500 to a normal charging mode.

In operation 1515, the power supply device 500 may change the charging power. According to various embodiments of the present disclosure, the power supply device 500 may change the currently supplied second charging power to the first charging power which is smaller than the second charging power. According to an embodiment of the present disclosure, the power supply device 500 may change a charging power (e.g., the second charging power) based on the second voltage (e.g., 10V) for fast charging into a charging power (e.g., the first charging power) based on a first voltage (e.g., the reference voltage of 5V) that is lower than the second voltage.

In operation 1517, the power supply device 500 provides the wireless power supply device 600 with the first charging power.

In operation 1519, the wireless power supply device 600 transmits, to the wireless power reception device 800, the first charging power supplied from the power supply device 500. According to various embodiments of the present disclosure, the wireless power supply device 600 receives a voltage (e.g., 5V) that is lower than the fast charging from the power supply device 500, and in response thereto, provides a charging power (e.g., the first charging power) for charging the wireless power reception device 800.

In operation 1521, the wireless power reception device 800 may initiate charging based on the first charging power provided from the wireless power supply device 600.

Figure 16:
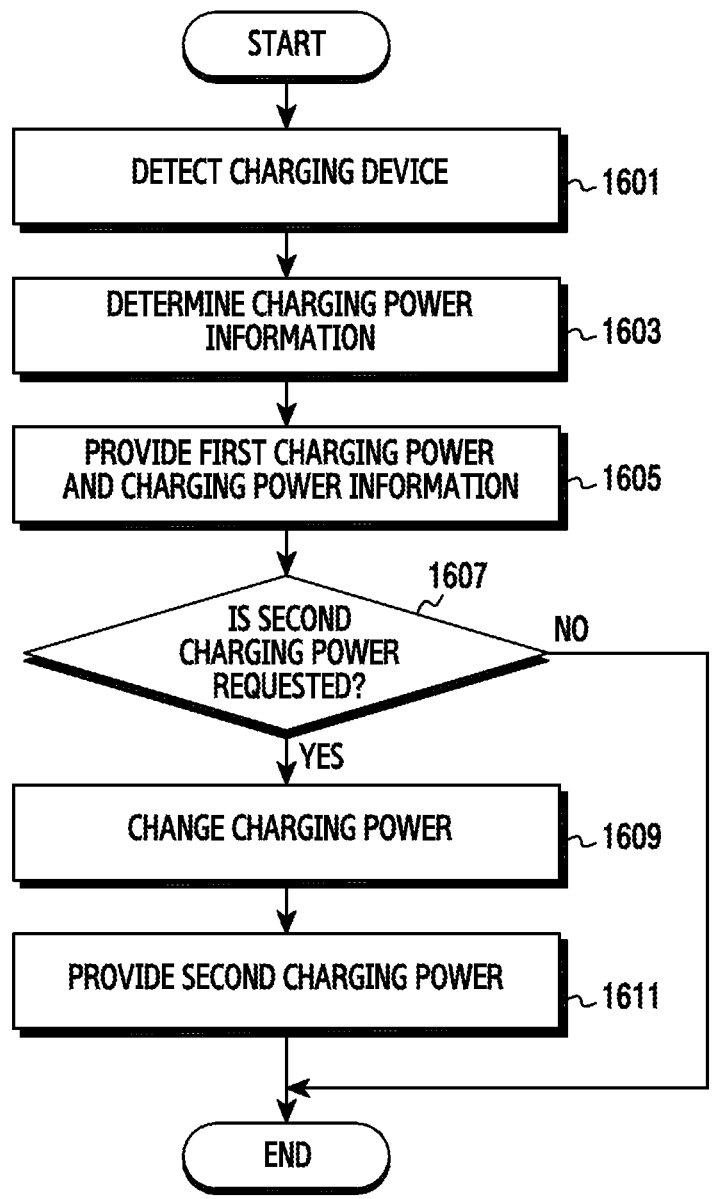
FIG. 16 is a flowchart illustrating an operation of wirelessly supplying power in an electronic device according to various embodiments of the present disclosure.

FIG. 16 is a flowchart illustrating an operation of supplying a wireless power in an electronic device according to various embodiments of the present disclosure.

Referring to FIG. 16, an example is provided in which the electronic device 400 is the wireless power supply device 600, or the electronic device 400 serves as the power supply device 600 and supports wireless charging.

Referring to FIG. 16, the electronic device 400 (e.g., the wireless power supply device 600) detects a connection with a charging device (e.g., the power supply device 500) in operation 1601. For example, the electronic device 400 may detect power input from the charging device through a processor (e.g., the processor 620 of FIG. 6), based on a wired interface (e.g., the I/F 610 of FIG. 6).

In operation 1603, the electronic device 400 determines charging power information corresponding to the charging device. According to various embodiments of the present disclosure, the charging device may provide the electronic device 400 with charging power information together with a first charging power, when the charging device is connected with the electronic device 400. According to an embodiment of the present disclosure, the charging device may transmit a signal (for example, signals of D+ line and D− line) having a value (for example, a voltage value) designated based on whether fast charging or normal charging is supported. The electronic device 400 may determine whether the charging device supports fast charging based on the signal transferred from the charging device.

In operation 1605, the electronic device 400 provides an external electronic device (e.g., the wireless power reception device 800) with the charging power information and the first charging power supplied from the charging device. According to various embodiments of the present disclosure, the electronic device 400 provides the first charging power received from the charging device to the external electronic device when detecting the proximity of the external electronic device. According to various embodiments of the present disclosure, when a DC power supply is supplied from the charging device, the electronic device 400 may convert the DC power supply into AC power and may provide the power to the external electronic device through a transmission coil. According to an embodiment of the present disclosure, the electronic device 400 and the external electronic device may execute communication for the transmission/reception of the information through each coil (for example, a transmission coil or a reception coil), or through short-range communication (e.g., BLE, ZigBee, NFC, or the like).

In operation 1607, the electronic device 400 determines whether the external electronic device requests a second charging power. According to an embodiment of the present disclosure, the electronic device 400 may determine whether the external electronic device requests changing a charging power while a charging operation is executed based on the first charging power. According to various embodiments of the present disclosure, the external electronic device may request, from the electronic device 400, the second charging power that is higher than the first charging power used for normal charging, through the communication with the electronic device 400. According to an embodiment of the present disclosure, the external electronic device may change charging based on the reference voltage (e.g., 5V) to charging based on a voltage (e.g., 10V) that is higher than the reference voltage, and may transfer corresponding wireless power information (e.g., a set value) through the communication with the electronic device 400. According to various embodiments of the present disclosure, the electronic device 400 and the external electronic device may execute communication for the transmission/reception of the information through each coil (for example, a transmission coil or a reception coil), or through short-range communication (e.g., BLE, ZigBee, NFC, or the like).

According to various embodiments of the present disclosure, the external electronic device may initiate a charging operation based on the first charging power, and may transfer a request in association with a change in the setting, to the electronic device 400 within a predetermined period of time (e.g., within 100 ms from a point when charging based on the first charging power is initiated) set when it is determined to change the charging power. The electronic device 400 may execute a control to supply, to the external electronic device, the second charging power according to changing of the charging power, within a predetermined period of time (within 250 ms from a point when the charging power change request is received) set in response to the request from the external electronic device.

When it is determined that the request for second charging power does not exist in operation 1607 (i.e., NO in operation 1607), the electronic device 400 continuously processes charging the external electronic device.

When it is determined that the request for second charging power exists in operation 1607 (i.e., YES in operation 1607), the electronic device 400 executes a related operation to process charging of the external electronic device in operation 1609. According to various embodiments of the present disclosure, the electronic device 400 may determine to change the charging power into the second charging power in response to the charging power change request received from the external electronic device. According to an embodiment of the present disclosure, the electronic device 400 may determine that the external electronic device is set to the state for fast charging, based on the wireless power information received from the external electronic device, and may determine a charging power supply request for fast charging (e.g., a request for the second charging power which is greater than the first charging power) based on a result of the determination. The electronic device 400 may request the charging device to change the charging power (e.g., request an output voltage that is higher than the normal charging), in response to the determination to change to the second charging power. For example, the electronic device 400 may execute a control to set the charging mode of the charging device to the fast charging mode.

In operation 1611, the electronic device 400 provides the external electronic device with the second charging power supplied from the charging device. According to various embodiments of the present disclosure, the electronic device 400 transmits, to the external electronic device, the second charging power which is supplied from the charging device and is higher than the first charging power. According to various embodiments of the present disclosure, the electronic device 400 may receive an output voltage (e.g., 10V) that is higher than the normal charging from the charging device, and in response thereto, may provide a charging power (e.g., the second charging power) for charging the external electronic device.

According to various embodiments of the present disclosure, the electronic device 400 may process charging of the external electronic device based on the second charging power supplied from the charging device. Subsequently, the electronic device 400 may execute a charging operation based on detection of various states of the external electronic device. According to an embodiment of the present disclosure, the electronic device 400 may detect the charged state of the external electronic device, and may repeatedly suspend or initiate the charging operation based on whether the external electronic device is fully charged. According to an embodiment of the present disclosure, the electronic device 400 may detect whether the external electronic device leaves a wireless charging-enabled range while executing the charging operation with respect to the external electronic device, and may suspend the charging operation based on a result of the detection. According to an embodiment of the present disclosure, when the electronic device 400 detects a change to the first charging power with respect to the external electronic device while executing the charging operation using the second charging power, the electronic device 400 may change the second charging power into the first charging power, and may execute the charging operation using the first charging power.

Figure 17:
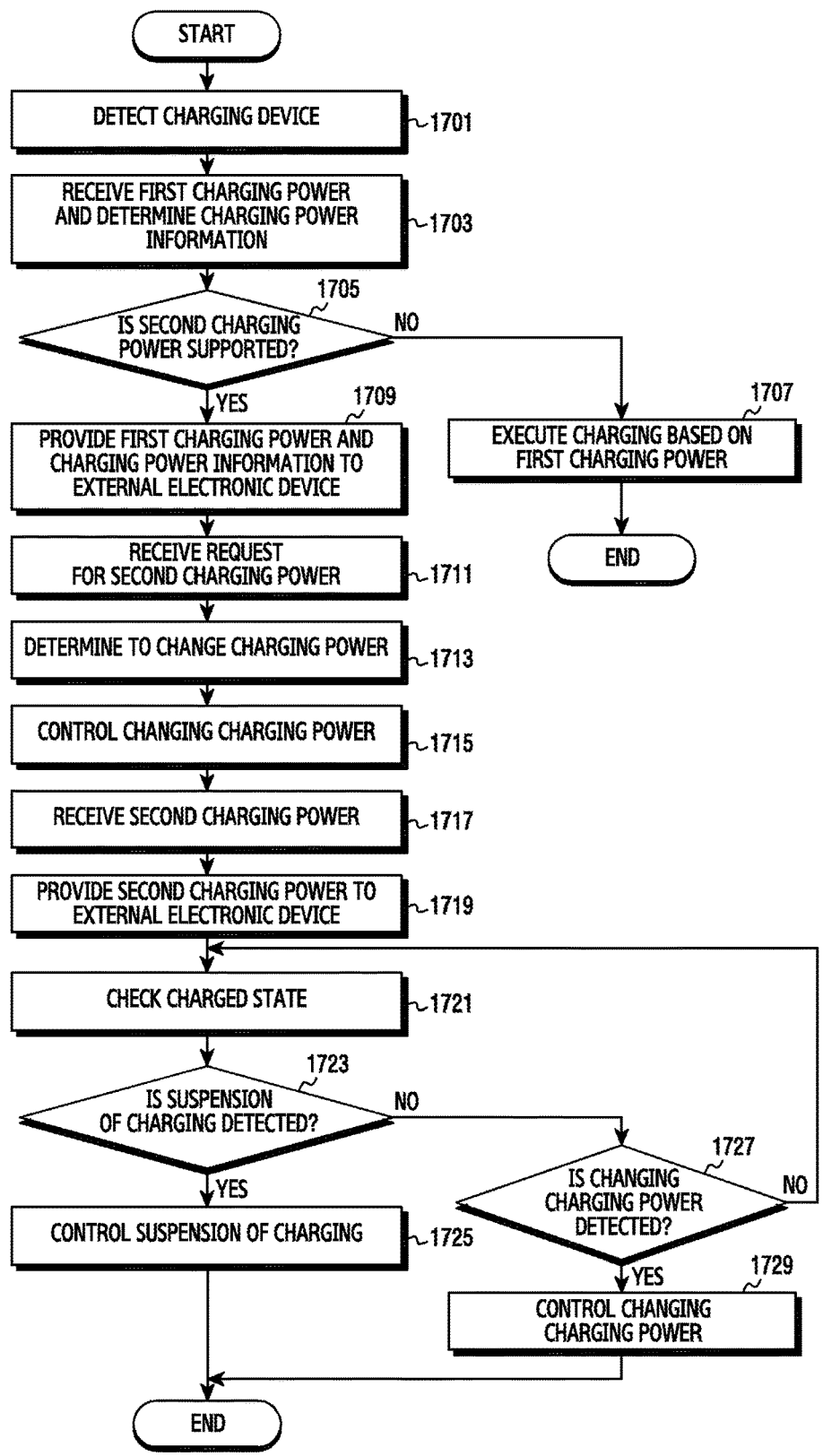
FIG. 17 is a flowchart illustrating an operation of wirelessly supplying power in an electronic device according to various embodiments of the present disclosure.

FIG. 17 is a flowchart illustrating an operation of supplying a wireless power in an electronic device according to various embodiments of the present disclosure.

Referring to FIG. 17, the electronic device 400 (e.g., the wireless power supply device 600) detects a connection with a charging device (e.g., the power supply device 500) in operation 1701.

In operation 1703, the electronic device 400 receives a first charging power and charging power information from the charging device, and determines the charging power information of the charging device.

In operation 1705, the electronic device 400 determines whether the charging device supports the first charging power for normal charging and a second charging power for fast charging, based on the charging power information.

When the electronic device 400 determines that the charging device does not support the second charging power in operation 1705 (i.e., NO in operation 1705), the electronic device 400 executes a charging operation based on the first charging power in operation 1707. According to an embodiment of the present disclosure, when the electronic device 400 determines that the charging device supports only the first charging power for normal charging based on the charging power information, the electronic device 400 may execute a normal wireless charging operation with respect to an external electronic device (e.g., the wireless power reception device 800).

When the electronic device 400 determines that the charging device supports the second charging power in operation 1705 (i.e., YES in operation 1705), the electronic device 400 provides the external electronic device with the charging power information and the first charging power supplied from the charging device in operation 1709.

In operation 1711, the electronic device 400 receives a request for the second charging power from the external electronic device while providing the first charging power to the external electronic device. According to an embodiment of the present disclosure, the external electronic device may initiate a charging operation based on the first charging power, and may transfer a request in association with a change in the setting, to the electronic device 400 within a predetermined period of time (e.g., within 100 ms from a point when charging based on the first charging power is initiated) set when it is determined to change the charging power. The electronic device 400 may receive the request for the second charging power within the predetermined period of time (e.g., 100 ms) from the point when charging based on the first charging power is initiated.

In operation 1713, the electronic device 400 determines to change the charging power in response to the request for second charging power received from the external electronic device.

In operation 1715, the electronic device 400 executes a related operation to process a charging operation with respect to the external electronic device, in response to the determination to change the charging power. According to an embodiment of the present disclosure, the electronic device 400 may determine that the external electronic device is set to the state for fast charging, based on the wireless power information received from the external electronic device, and may determine a charging power supply request for fast charging (e.g., a request for the second charging power which is greater than the first charging power) based on a result of the determination. The electronic device 400 may request the charging device to change the charging power (e.g., request an output voltage that is higher than the normal charging), in response to the determination to change to the second charging power.

In operation 1717, the electronic device 400 receives the second charging power from the charging device.

In operation 1719, the electronic device 400 provides the external electronic device with the second charging power supplied from the charging device. According to various embodiments of the present disclosure, the electronic device 400 transmits, to the external electronic device, the second charging power which is supplied from the charging device and is higher than the first charging power.

In operation 1721, the electronic device 400 checks a charged state while processing the operation related to charging the external electronic device based on the second charging power. For example, the electronic device 400 may determine whether suspension of charging is detected from the external electronic device or whether changing of the charging power is detected from the external electronic device.

In operation 1723, the electronic device 400 determines whether the suspension of charging the external electronic device is detected in response to checking the charged state. According to various embodiments of the present disclosure, the suspension of charging the external electronic device may be detected when the external electronic device is fully charged, when the external electronic device is out of the wireless charging-enabled range, or the like.

In operation 1725, the electronic device 400 processes an operation related to suspending the charging operation with respect to the external electronic device when the suspension of charging is detected in operation 1723 (i.e., YES in operation 1723). According to an embodiment of the present disclosure, the electronic device 400 may control the charging device to suspend supplying power in response to the detection of suspending charging. The electronic device 400 may determine whether an external electronic device that enters the wireless charging-enabled range exists while processing the operation related to the suspension of charging.

When the suspension of charging is not detected in operation 1723 (i.e., NO in operation 1723), the electronic device 400 determines whether a change of the charging power is detected in operation 1727. For example, the electronic device 400 may determine whether changing of the charging to the charging based on the first charging power is requested while charging is executed using the second charging power, as illustrated in the above.

When changing of the charging power is not detected in operation 1727 (i.e., NO in operation 1727), the electronic device 400 proceeds with operation 1721 and processes operations after operation 1721.

When changing of the charging power is detected in operation 1727 (i.e., YES in operation 1727), the electronic device 400 processes an operation related to controlling the change of the charging power in operation 1729. For example, the electronic device 400 may process executing an operation related to changing of the charging power from the second charging power for fast charging to the first charging power for normal charging, as described in the descriptions with reference to FIG. 15.

According to various embodiments of the present disclosure, the order of operation 1723 and operation 1727 is not limited to the above described order, operation 1723 and operation 1727 may be performed sequentially or in parallel. For example, operation 1727 may be performed before operation 1723, or operation 1723 and operation 1727 may be performed in parallel.

According to various embodiments of the present disclosure, the electronic device 400 may process the charging operation based on the detection of various states of the external electronic device, after operation 1725 or 1729.

According to an embodiment of the present disclosure, the electronic device 400 may detect the charged state of the external electronic device, and may repeatedly suspend or initiate the charging operation based on whether the external electronic device is fully charged. According to an embodiment of the present disclosure, the electronic device 400 may detect whether the external electronic device leaves a wireless charging-enabled range while executing the charging operation with respect to the external electronic device, and may suspend the charging operation based on a result of the detection. According to an embodiment of the present disclosure, when the electronic device 400 detects a change to the first charging power with respect to the external electronic device while executing the charging operation using the second charging power, the electronic device 400 may change the second charging power into the first charging power, and may execute the charging operation using the first charging power. According to various embodiments of the present disclosure, when the electronic device 400 detects a change to the second charging power with respect to the external electronic device while executing the charging operation using the first charging power, the electronic device 400 may change the first charging power into the second charging power, and may execute the charging operation using the second charging power.

Figure 18:
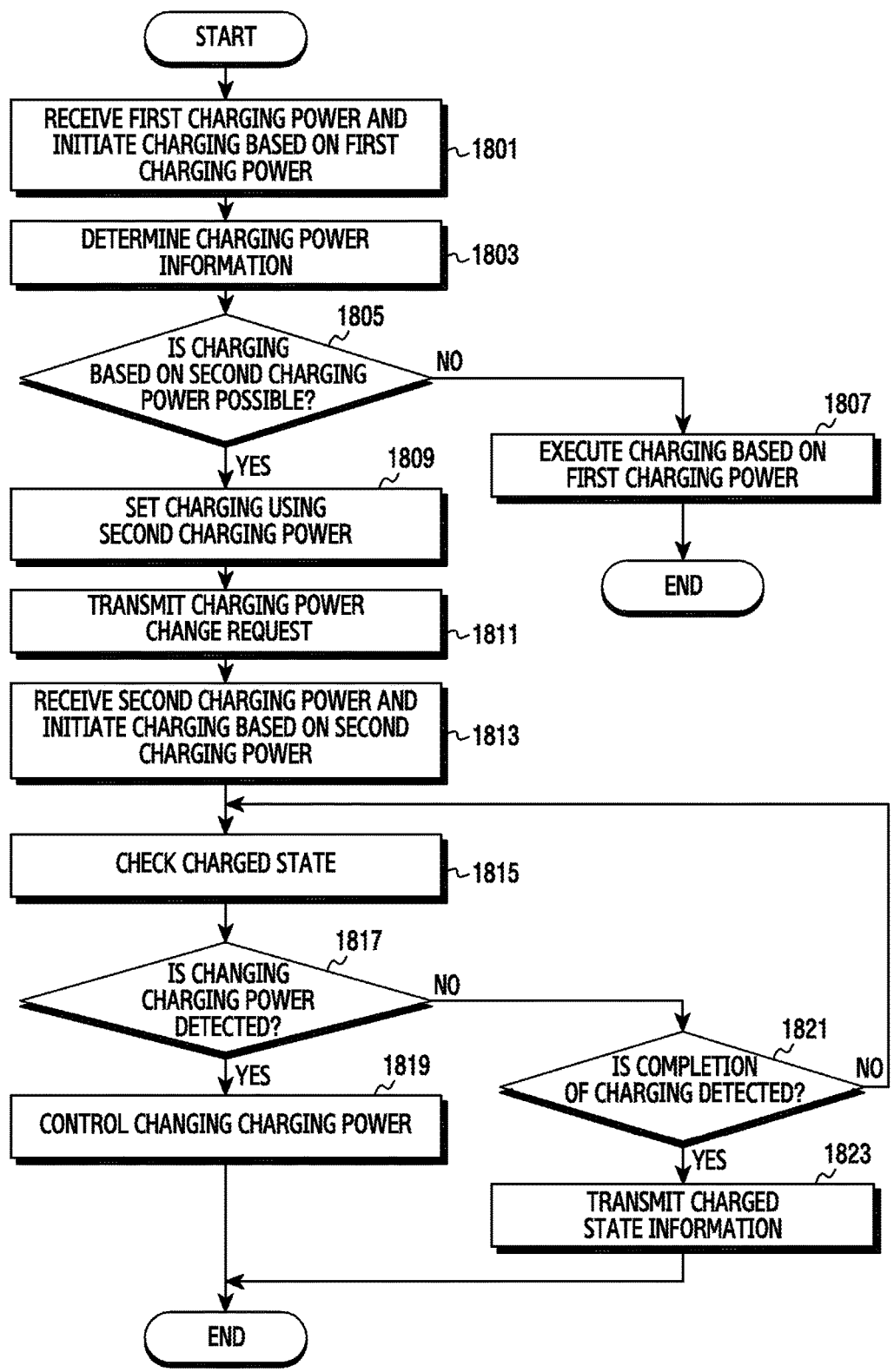
FIG. 18 is a flowchart illustrating an operation of executing wireless charging in an electronic device according to various embodiments of the present disclosure.

FIG. 18 is a flowchart illustrating an operation of executing wireless charging in an electronic device according to various embodiments of the present disclosure.

Referring to FIG. 18, FIG. 18 illustrates an example in which the electronic device 400 is the wireless power reception device 800, or the electronic device 400 serves as the wireless power reception device 800 and supports wireless charging.

Referring to FIG. 18, in operation 1801, the electronic device 400 (e.g., the wireless power reception device 800) receives a first charging power from an external electronic device (e.g., the wireless power supply device 600) and initiates charging using the first charging power. According to various embodiments of the present disclosure, the electronic device 400 may detect an external electronic device that enters a wireless charging-enabled range through the short-range communication module 415 or the charging module 475 (e.g., the wireless power reception circuit 475R) for detecting the external electronic device. According to various embodiments of the present disclosure, the electronic device 400 may receive, through a reception coil, AC power transmitted from a transmission coil of the wireless external electronic device, convert the AC power into DC power, and generate (rectify) power as a DC power supply of a predetermined size. According to various embodiments of the present disclosure, the electronic device 400 may include a part (for example, the wireless power reception circuit 475R of the charging module 475) or the whole of the electronic device 400 of FIG. 4. The electronic device 400 may charge an internal device (for example, battery) or an external device (for example, another electronic device) based on the generated (rectified) DC power supply.

In operation 1803, the electronic device 400 determines charging power information. According to various embodiments of the present disclosure, the electronic device 400 may receive the first charging power provided from the external electronic device and charging power information of a charging device (e.g., the power supply device 500) in parallel or sequentially. According to an embodiment of the present disclosure, the electronic device 400 and the external electronic device may execute communication for the transmission/reception of the information through each coil (for example, a transmission coil or a reception coil), or through short-range communication (e.g., BLE, Zigbee, NFC, or the like).

In operation 1805, the electronic device 400 determines whether charging using a second charging power is possible. According to various embodiments of the present disclosure, the electronic device 400 may determine whether fast charging is possible based on the received charging power information. According to various embodiments of the present disclosure, the electronic device 400 may determine whether charging using the second charging power from the external electronic device is possible based on the charging power information. According to various embodiments of the present disclosure, the external electronic device may inform the electronic device 400 of whether fast charging or normal charging is supported based on the charging power information, and the electronic device 400 may determine fast charging or normal charging by the external electronic device based on the charging power information.

When it is determined that charging using the second charging power is not allowed in operation 1805 (i.e., NO in operation 1805), the electronic device 400 processes a charging operation using the first charging power in operation 1807. According to an embodiment of the present disclosure, when the electronic device 400 determines that the charging device supports only the first charging power for normal charging based on the charging power information, the electronic device 400 processes a normal wireless charging operation.

When it is determined that charging using the second charging power is possible in operation 1805 (i.e., YES in operation 1805), the electronic device 400 sets charging using the second charging power in operation 1809. According to an embodiment of the present disclosure, when it is determined that fast charging is possible based on the charging power information, the electronic device 400 may determine to change the charging power. According to an embodiment of the present disclosure, the electronic device 400 initiates charging using the first charging power (e.g., charging using the reference voltage (e.g., 5V)) at the initial stage, and determines to change the charging power when it is determined that fast charging is possible (e.g., to change the reference voltage to a voltage (e.g., 10V) that is higher than the reference voltage).

In operation 1811, the electronic device 400 transmits a request for changing the charging power to the external electronic device. According to various embodiments of the present disclosure, the electronic device 400 may provide the external electronic device with wireless power information in response to the determination to change the charging power. According to various embodiments of the present disclosure, the electronic device 400 may request, from the external electronic device, the second charging power that is higher than the first charging power used for normal charging, through the communication with the external electronic device. According to an embodiment of the present disclosure, the electronic device 400 may change charging based on the reference voltage (e.g., 5V) to charging based on a voltage (e.g., 10V) that is higher than the reference voltage, and may transfer corresponding wireless power information (e.g., a set value) through the communication with the external electronic device. According to various embodiments of the present disclosure, the electronic device 400 and the external electronic device may execute communication for the transmission/reception of the information through each coil (for example, a transmission coil or a reception coil), or through short-range communication (e.g., BLE, ZigBee, NFC, or the like).

In operation 1813, the electronic device 400 receives the second charging power from the external electronic device and initiates charging using the second charging power. According to various embodiments of the present disclosure, the electronic device 400 may receive an output voltage (e.g., 10V) that is higher than normal charging from the external electronic device, and may execute fast charging accordingly.

In operation 1815, the electronic device 400 checks a charged state. According to various embodiments of the present disclosure, the electronic device 400 may check the charged state while executing the charging operation using the second charging power. According to an embodiment of the present disclosure, the electronic device 400 may determine whether full charging is detected, or whether changing of the charging power is detected.

In operation 1817, the electronic device 400 determines whether changing of the charging power is detected. For example, the electronic device 400 may determine whether a charging mode is changed to the normal charging based on the first charging power while charging is executed using the second charging power. According to various embodiments of the present disclosure, the electronic device 400 may check a charged state, and may determine to execute charging based on the first charging power which is smaller than the second charging power when the electronic device 400 detects that it is charged more than a predetermined level (e.g., approximately 90% of the capacity of the battery). Alternatively, the electronic device 400 may determine to execute charging based on the first charging power that is smaller than the second charging power when the electronic device 400 detects a user input (e.g., a motion, a touch gesture, a voice command or the like, which is an input set for changing a charging power). Alternatively, the electronic device 400 may determine to execute charging based on the first charging power that is smaller than the second charging power when the electronic device 400 checks a heat radiating state of the device or the battery, and senses a temperature that is greater than or equal to a predetermined degree. According to various embodiments of the present disclosure, changing of the charging power to the first charging power that is smaller than the second charging power while fast charging is executed based on the second charging power may not be limited thereto, and may be executed based on various other conditions.

When changing of the charging power is detected in operation 1817 (i.e., YES in operation 1817), the electronic device 400 processes an operation related to controlling the change of the charging power in operation 1819. For example, the electronic device 400 may process executing an operation related to changing of the charging power from the second charging power for fast charging to the first charging power for normal charging, as described in the descriptions with reference to FIG. 16. According to various embodiments of the present disclosure, the electronic device 400 may execute an operation based on the determination on whether charging is fully executed in operation 1821, while executing charging based on the first charging power after changing the charging power into the first charging power in operation 1819. According to various embodiments of the present disclosure, even after operation 1819, the electronic device 400 may change the charging power from the first charging power to the second charging power in response to checking the charging state, and may execute charging based on the second charging power again.

When changing of the charging power is not detected in operation 1817 (i.e., NO in operation 1817), the electronic device 400 determines whether charging is completed in operation 1821. According to an embodiment of the present disclosure, the electronic device 400 may determine whether an internal device (e.g., a battery) or an external device (e.g., another electronic device) is fully charged.

When the completion of charging is not detected in operation 1821 (i.e., NO in operation 1821), the electronic device 400 proceeds with operation 1815 and processes operations after operation 1815.

When the completion of charging is detected in operation 1821 (i.e., YES in operation 1821), the electronic device 400 transmits charged state information to the external electronic device in operation 1823. According to an embodiment of the present disclosure, the electronic device 400 may provide the external electronic device with information for suspending supplying power in response to the full charge. According to various embodiments of the present disclosure, the electronic device 400 determines a charged state or whether charging is completed even after transmitting the charged state information, and processes a charging operation based on a result of the determination. According to an embodiment of the present disclosure, after transmitting the charged state information associated with the full charge, when the electronic device 400 detects that the charged state of the battery is less than or equal to a predetermined level (under 95% of the capacity of the battery), the electronic device 400 resumes the charging operation. According to an embodiment of the present disclosure, the electronic device 400 may transmit, to the external electronic device, the charged state information for resuming the charging operation, and in response thereto, the external electronic device may initiate the charging operation based on the first charging power or the second charging power. According to an embodiment of the present disclosure, the electronic device 400 may operate to maintain a fully charged state based on the charging power supplied from the external electronic device when it reaches a predetermined standard set for maintaining the fully charged state within the wireless charging-enabled range of the external electronic device.

According to various embodiments of the present disclosure, the order of operation 1817 and operation 1821 is not limited to the above described order, operation 1817 and operation 1821 may be performed sequentially or in parallel. For example, operation 1821 may be performed before operation 1817, or operation 1817 and operation 1821 may be performed in parallel.

As described above, according to various embodiments of the present disclosure, there is provided a method of providing wireless charging in an electronic device, the method including determining a supportable charging power, determining whether the electronic device supports a first charging power or a second charging power based on a result of the determination, providing wireless power information corresponding to the first charging power to an external electronic device, at least partially based on the determination that the first charging power is supported, and providing wireless power information corresponding to the second charging power to the external electronic device, at least partially based on the determination that the second charging power is supported.

As described above, according to various embodiments of the present disclosure, there is provided a method of providing wireless charging in an electronic device, the method including detecting a provision of a supply voltage from the external electronic device, determining whether the supply voltage provided from the external electronic device is within a designated range, executing charging based on the supply voltage when the supply voltage is within the designated range, and executing charging based on another voltage provided from the external electronic device when the supply voltage is out of the designated range.

To address the above described problems or other problems, there are provided an electronic device and a method according to various embodiments of the present disclosure, which support fast wireless charging using an AFC technology. According to various embodiments of the present disclosure, a wireless charging system adaptively adjusts an output power (output voltage and output current) of a wireless power supply device based on the state of a charging power (charging voltage and charging current) of a wireless power reception device, thereby embodying a fast charging speed.

According to an electronic device and a method of various embodiments of the present disclosure, a wireless power supply device that supplies power may adaptively change and output an output power in response to a request from a wireless power reception device that receives power, and the charging power of a second electronic device is adaptively increased and thus, fast charging and stabilization of a circuit may be provided. For example, according to an electronic device and a method of various embodiments of the present disclosure, when a wireless power reception device requests changing a charging power, a wireless power supply device determines whether the requested charging power is supportable, and controls switching of a charging circuit (e.g., a converging circuit) to correspond to the same, so as to adjust current to correspond to the charging power requested by the wireless power reception device. An electronic device and a method according to various embodiments of the present disclosure may maintain the compatibility with an existing power supply device or wireless charging system, and may induce a decrease in an output current that responds to an output power so as to reduce heat generated from a circuit part of an electronic device.

An electronic device and a method according to various embodiments of the present disclosure may provide an apparatus for supporting fast wireless charging, and may improve a user's convenience and improve the usability and convenience of the electronic device.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A wireless power supply device comprising:
a wireless charging circuit; and
one or more processors operatively connected with the wireless charging circuit,
wherein the one or more processors are configured to:
receive, from a wireless power reception device, a first signal to request wireless charging information related to the wireless power supply device using the wireless charging circuit,
in response to the receiving of the first signal, transmit, through the wireless charging circuit to the wireless power reception device, information indicating at least one charging voltage that is supportable by the wireless power supply device, as at least part of the wireless charging information, receive, from the wireless power reception device, a second signal including information indicating a first charging voltage of the at least one charging voltage using the wireless charging circuit, and based at least in part on the receiving of the second signal, provide, to the wireless power reception device, the first charging voltage through the wireless charging circuit, wherein the one or more processors are further configured to:

perform the receiving of the first signal while providing another power corresponding to a second charging voltage through the wireless charging circuit, and as at least part of the providing of the first charging voltage, change a charging voltage to be provided with respect to the wireless power reception device from the second charging voltage to the first charging voltage, and wherein the first charging voltage is greater than the second charging voltage.

2. The wireless power supply device of claim 1, further comprising:

a wired connector to connect with a power supply device, wherein the one or more processors are further configured to:

in response to the receiving of the second signal, transmit, to the power supply device, a third signal to request a third charging voltage via the wired connector, the third charging voltage determined at least in part on the first charging voltage, receive, from the power supply device, a power corresponding to the third charging voltage via the wired connector, and perform the providing of the first charging voltage based at least in part on the third charging voltage.

3. The wireless power supply device of claim 2, wherein the third charging voltage is determined as substantially identical or similar to the first charging voltage.

4. The wireless power supply device of claim 1, wherein the one or more processors are further configured to:

provide the other power to the wireless power reception device, based at least in part on detecting a presence of the wireless power reception device.

5. The wireless power supply device of claim 1, wherein the one or more processors are further configured to:

receive, from the wireless power reception device, a fourth signal to request the second charging voltage while providing the first charging voltage to the wireless power reception device, and based at least in part on the receiving of the fourth signal, provide the second charging voltage to the wireless power reception device, the providing of the second charging voltage including changing a charging voltage to be provided with respect to the wireless power reception device from the second charging voltage to the first charging voltage.

6. The wireless power supply device of claim 5, further comprising a wired connector to connect with a power supply device, wherein the one or more processors are further configured to:

transmit, to the power supply device, a signal to request a fourth charging voltage via wired connector, the fourth charging voltage determined at least in part on the second charging voltage, receive, from the power supply device, a power corresponding to the fourth charging voltage via the wired connector, and perform the providing of the second charging voltage based at least in part on the fourth charging voltage.

7. A wireless power reception device comprising:

a battery;

a wireless charging circuit; and one or more processors operatively connected with the wireless charging circuit, wherein the one or more processors are configured to:

transmit, to a wireless power supply device, a first signal to request wireless charging information with respect to the wireless power supply device using the wireless charging circuit, receive, from the wireless power supply device, information indicating at least one charging voltage that is supportable by the wireless power supply device using the wireless charging circuit, transmit, to the wireless power supply device, a second signal including information indicating a first charging voltage of the at least one charging voltage, based at least in part on the received information, after the transmitting of the second signal, receive, from the wireless power supply device, a power corresponding to the first charging voltage using the wireless charging circuit, charge the battery based on the received power, wherein the one or more processors are further configured to:

based at least in part on a presence of the wireless power supply device, receive, from the wireless power supply device, another power corresponding to a second charging voltage, and initiate a battery charging operation using the second charging voltage before transmitting the first signal, and wherein the first charging voltage is greater than the second charging voltage.

8. The wireless power reception device of claim 7, wherein the one or more processors are further configured to change, based on the received information, a charging mode from a second charging mode to a first charging mode, wherein the first charging mode corresponds to the first charging voltage, and wherein the second charging mode corresponds to the second charging voltage different from the first charging voltage.

9. The wireless power reception device of claim 7, wherein the one or more processors are further configured to:

transmit, to the wireless power supply device, the signal requesting the first charging voltage while receiving the other power from the wireless power supply device.

10. The wireless power reception device of claim 7, wherein the one or more processors are further configured to:

transmit, to the wireless power supply device, a third signal to request the second charging voltage at least temporarily while receiving the power corresponding to the first charging voltage from the wireless power supply device, receive, from the wireless power supply device, the other power corresponding to the second charging voltage, and charge the battery based on the received other power corresponding to the second charging voltage.

11. A method for operating a wireless power supply device, method comprising:

receiving, from a wireless power reception device, a first signal to request wireless charging information related to the wireless power supply device using a wireless charging circuit;

in response to the receiving of the first signal, transmitting, through the wireless charging circuit to the wireless power reception device, information indicating at least one charging voltage that is supportable by the wireless power supply device, as at least part of the wireless charging information;

receiving, from the wireless power reception device, a second signal including information indicating a first charging voltage of the at least one charging voltage using the wireless charging circuit;

based at least in part on the receiving of the second signal, providing, to the wireless power reception device, the first charging voltage through the wireless charging circuit;

wherein the first signal is received while providing another power corresponding to a second charging voltage through the wireless charging circuit, wherein the providing of the first charging voltage comprises changing a charging voltage to be provided with respect to the wireless power reception device from the second charging voltage to the first charging voltage, and wherein the first charging voltage is greater than the second charging voltage.

12. The method of claim 11, further comprising:
in response to the receiving of the second signal, transmitting, to a power supply device which is connected to the wireless power supply device via a wired connector, a third signal to request a third charging voltage via the wired connector, the third charging voltage determined at least in part on the first charging voltage;

receiving, from the power supply device, a power corresponding to the third charging voltage via the wired connector; and performing the providing of the first charging voltage based at least in part on the third charging voltage.

13. The method of claim 12, wherein the third charging voltage is determined as substantially identical or similar to the first charging voltage.

14. The method of claim 11, further comprising:
providing the other power to the wireless power reception device, based at least in part on detecting a presence of the wireless power reception device.

15. The method of claim 11, further comprising:
receiving, from the wireless power reception device, a fourth signal to request the second charging voltage while providing the first charging voltage to the wireless power reception device; and based at least in part on the receiving of the fourth signal, providing the second charging voltage to the wireless power reception device, the providing of the second charging voltage including changing a charging voltage to be provided with respect to the wireless power reception device from the second charging voltage to the first charging voltage.

16. The method of claim 15, wherein the providing of the second charging voltage comprises:
transmitting, to a power supply device which is connected to the wireless power supply device via a wired connector, a signal to request a fourth charging voltage via the wired connector, the fourth charging voltage determined at least in part on the second charging voltage;

receiving, from the power supply device, a power corresponding to the fourth charging voltage via the wired connector; and performing the providing of the second charging voltage based at least in part on the fourth charging voltage.

17. A method for operating a wireless power reception device, the method comprising:
transmitting, to a wireless power supply device, a first signal to request wireless charging information with respect to the wireless power supply device using a wireless charging circuit;

receiving, from the wireless power supply device, information indicating at least one charging voltage that is supportable by the wireless power supply device using the wireless charging circuit;

transmitting, to the wireless power supply device, a second signal including information indicating a first charging voltage of the at least one charging voltage, based at least in part on the received information;

after the transmitting of the second signal, receiving, from the wireless power supply device, a power corresponding to the first charging voltage using the wireless charging circuit; and charging a battery based on the received power;

wherein the method further comprises:
based at least in part on a presence of the wireless power supply device, receiving, from the wireless power supply device, another power corresponding to a second charging voltage, and initiating a battery charging operation using the second charging voltage before transmitting the first signal, and wherein the first charging voltage is greater than the second charging voltage.

18. The method of claim 17, further comprising:
changing, based on the received information, a charging mode from a second charging mode to a first charging mode, wherein the first charging mode corresponds to the first charging voltage, and wherein the second charging mode corresponds to the second charging voltage different from the first charging voltage.

19. The method of claim 17, further comprising:
transmitting, to the wireless power supply device, the signal requesting the first charging voltage while receiving the other power from the wireless power supply device.

20. The method of claim 17, further comprising:
transmitting, to the wireless power supply device, a third signal to request the second charging voltage at least temporarily while receiving the power corresponding to the first charging voltage from the wireless power supply device;

receiving, from the wireless power supply device, the other power corresponding to the second charging voltage; and charging the battery based on the received other power corresponding to the second charging voltage.

21. A wireless power supply device comprising:
a wireless charging circuit comprising a wireless charging coil; and one or more processors operatively connected with the wireless charging circuit, wherein the one or more processors are configured to:

generate a first power to wirelessly charge a wireless power reception device by providing a first charging voltage to the wireless charging coil, transmit, through the wireless charging circuit, to the wireless power reception device, information indicating a second charging voltage that is supportable by the wireless power supply device, after the transmitting of the information, receive, from the wireless power reception device, a power change request signal through the wireless charging circuit, and in response to receiving the power change request signal, generate a second power to wirelessly charge the wireless power reception device by providing the second charging voltage to the wireless charging coil, and wherein the second charging voltage is greater than the first charging voltage.

22. The wireless power supply device of claim 21, wherein the power change request signal comprises information on the second charging voltage.

23. The wireless power supply device of claim 21, wherein the power change request signal comprises information requesting a change of charging voltage.

24. The wireless power supply device of claim 21, wherein the one or more processors are further configured to:

in response to receiving the power change request signal, transmit, to a power supply device, a signal requesting a change of a provision power, receive, from the power supply device, a changed power related to the signal, and provide, to the wireless charging circuit, the second charging voltage based at least in part on the changed power.

25. A wireless power reception device comprising:
a battery;
a wireless charging circuit comprising a wireless charging coil; and
one or more processors operatively connected with the wireless charging circuit, wherein the one or more processors are configured to:
obtain, based on a first power received from a wireless power supply device through the wireless charging coil, a first charging voltage to charge the battery, receive, through the wireless charging circuit from the wireless power supply device, information indicating a second charging voltage that is supportable by the wireless power supply device, after the receiving of the information, transmit, through the wireless charging circuit to the wireless power supply device, a power change request signal, and after the transmitting of the power change request signal, obtain, based on a second power received from the wireless power supply device through the wireless charging coil, the second charging voltage to charge the battery, and wherein the second charging voltage is greater than the first charging voltage.

26. The wireless power reception device of claim 25, wherein the power change request signal comprises information on the second charging voltage.

27. The wireless power reception device of claim 25, wherein the power change request signal comprises information requesting a change of charging voltage.

28. The wireless power reception device of claim 25, wherein the one or more processors are further configured to, after the transmitting of the power change request signal, change a charging mode from a first power mode to a second power mode, wherein the first power mode corresponds to the first charging voltage, and wherein the second power mode corresponds to the second charging voltage different from the first charging voltage.

* * * * *